(12) United States Patent
Miyaoku et al.

(10) Patent No.: US 7,712,123 B2
(45) Date of Patent: May 4, 2010

(54) METHOD, SYSTEM, AND APPARATUS FOR ACQUIRING INFORMATION CONCERNING BROADCAST INFORMATION

(75) Inventors: Kento Miyaoku, Yokosuka (JP); Akihito Akutsu, Yokosuka (JP); Yoshinobu Tonomura, Yokohama (JP); Hiroki Shigeyoshi, Yokohama (JP); Kiyoshi Tanaka, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1863 days.

(21) Appl. No.: 10/257,471

(22) PCT Filed: Apr. 12, 2001

(86) PCT No.: PCT/JP01/03161
§ 371 (c)(1),
(2), (4) Date: Oct. 15, 2002

(87) PCT Pub. No.: WO01/80553
PCT Pub. Date: Oct. 25, 2001

(65) Prior Publication Data
US 2003/0051252 A1    Mar. 13, 2003

(30) Foreign Application Priority Data

| Apr. 14, 2000 | (JP) | 2000-112805 |
| Sep. 29, 2000 | (JP) | 2000-297846 |
| Sep. 29, 2000 | (JP) | 2000-298179 |
| Sep. 29, 2000 | (JP) | 2000-299714 |
| Nov. 9, 2000 | (JP) | 2000-342032 |

(51) Int. Cl.
*H04N 7/173* (2006.01)
*H04B 1/20* (2006.01)

(52) U.S. Cl. .............. 725/109; 725/110; 725/116; 369/2

(58) Field of Classification Search .............. None
See application file for complete search history.

(56) References Cited

U.S. PATENT DOCUMENTS 4,739,398 A * 4/1988 Thomas et al. ............ 725/22

(Continued)

FOREIGN PATENT DOCUMENTS

JP    7-107454    4/1995

(Continued)

OTHER PUBLICATIONS

Nevenka Dimitrova, et al., "On Selective Video Content Analysis and Filtering", Proceedings of the SPIE, Conference on Storage and Retrieval for Media Databases 2000, XP009002896, vol. 3972, Jan. 2000, pp. 359-368.

(Continued)

*Primary Examiner*—Joseph P Hirl
*Assistant Examiner*—Mushfikh Alam
(74) *Attorney, Agent, or Firm*—Oblon, Spivak, McClelland, Maier & Neustadt, L.L.P.

(57) ABSTRACT

A technology is provided for a viewer of broadcast information or recorded information to easily obtain information related to the broadcast information or recorded information from a server, in which, in a system in which a viewer apparatus and a content providing server for providing content information related to video or voice are connected via a network, the viewer apparatus obtains related information necessary for obtaining the content information; sends the related information to the content providing server so as to request the content providing server to send the content information; and obtains the content information sent from the content providing server.

10 Claims, 41 Drawing Sheets

U.S. PATENT DOCUMENTS

| | | | | |
|---|---|---|---|---|
| 4,849,811 | A | * | 7/1989 | Kleinerman ........... 375/240.01 |
| 5,710,815 | A | * | 1/1998 | Ming et al. ................. 380/241 |
| 5,721,584 | A | * | 2/1998 | Yoshinobu et al. .......... 725/114 |
| 5,929,849 | A | | 7/1999 | Kikinis |
| 6,353,930 | B1 | | 3/2002 | Shimoji et al. |
| 6,698,020 | B1 | * | 2/2004 | Zigmond et al. ............... 725/34 |
| 2004/0148634 | A1 | * | 7/2004 | Arsenault et al. ............. 725/89 |

FOREIGN PATENT DOCUMENTS

| | | |
|---|---|---|
| JP | 7-321748 | 12/1995 |
| JP | 9-55806 | 2/1997 |
| JP | 9-224230 | 8/1997 |
| JP | 9-274554 | 10/1997 |
| JP | 10-56632 | 2/1998 |
| JP | 10-126759 | 5/1998 |
| JP | 10-136318 | 5/1998 |
| JP | 10-177532 | 6/1998 |
| JP | 10-243374 | 9/1998 |
| JP | 10-271019 | 10/1998 |
| JP | 10-285460 | 10/1998 |
| JP | 11-177842 | 7/1999 |
| JP | 11-510978 | 9/1999 |
| JP | 11-327717 | 11/1999 |
| JP | 11-353325 | 12/1999 |
| JP | 11-355732 | 12/1999 |
| KR | 1998-018482 | 6/1998 |
| KR | 1999-0063934 | 7/1999 |
| KR | 2000-0017754 | 4/2000 |
| WO | WO 97/13368 | 4/1997 |
| WO | WO 99/66722 | 12/1999 |
| WO | WO 99/66726 | 12/1999 |
| WO | WO 00/08855 | 2/2000 |
| WO | WO 00/36775 | 6/2000 |
| WO | WO 01/35658 A1 | 5/2001 |

OTHER PUBLICATIONS

Rainer Lienhart, et al., "On the Detection and Recognition of Television Commercials", IEEE, XP010239226, 1997, pp. 509-516.

Kento Miyaoku, et al., "A Proposal of Data Transmission Method for Using Video Content Description, Study on information distribution method suitable for use of image added information", IEICE Communications Society Conference collected papers 2, Sep. 7, 2000, p. 210.

* cited by examiner

FIG.9

NOTIFICATION SETTING                                                                    ☒

NOTIFICATION METHOD
  MODE
    ○ BLINKING SOUND
    ◉ BLINKING
    ○ SOUND
    ○ NO NOTIFICATION

☑ VIDEO AUTOMATIC LAUNCH

*LiveWatch*
*Version 1.0 RC3*

1999 SUMMER KOUSHIEN

NOTIFICATION TIMING
  ☑ SCORE ☐ HR
  [3 ▾] inning

ADVANCE

TEAM AT BAT
☐ ○○ HIGH SCOOL    ☑ △△ SCOOL

BATTER
| | |
|---|---|
| ☐ 19 宮奥 健人 | ☐ 18 森西 優次 |
| ☐ 39 藤田 悦郎 | ☐ 27 福田 浩司 |
| ☐ 42 井上 聡 | ☐ 10 平田 寛将 |
| ☐ 6 宮崎 泰彦 | ☐ 40 西川 嘉樹 |
| ☑ 31 田中 清 | ☐ 3 高森 覚 |
| ☐ 7 阿久津 明 | ☐ 7 谷口 智久 |
| ☐ 5 安部 伸治 | ☐ 53 加藤 陽一 |
| ☐ 32 宮本 信夫 | ☐ 27 泰泉寺 浩 |
| ☐ 54 外村 佳伸 | ☐ 75 端山 聡 |

OK   |   Cancel   |   Reset

WARNING: APPLET WINDOW

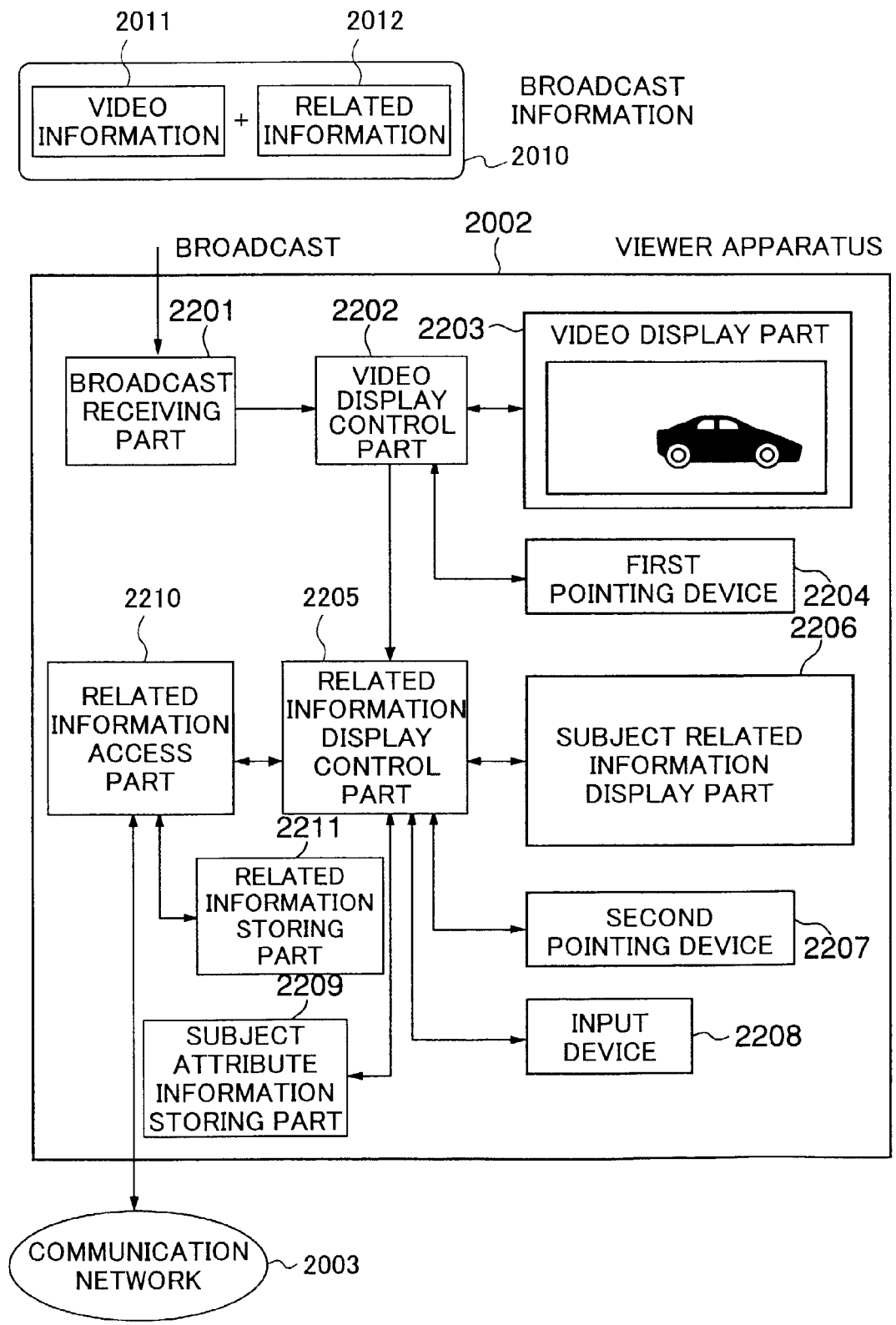

| | 2121 | 2122 | 2123 | 2124 |
|---|---|---|---|---|
| 2012 | FRAME NUMBER | SUBJECT COORDINATES | SUBJECT ATTRIBUTE INFORMATION | URI INFORMATION |
| | N | (XA,YA) | OB-A | URI-A |
| | | (XB,YB) | OB-B | URI-B |
| | | ... | ... | ... |
| | | ... | ... | ... |

- 2203 VIDEO DISPLAY PART
- SUBJECT REPRESENTATION FIGURE AND THE LIKE 2042
- 2041 SUBJECT
- 2206 SUBJECT RELATED INFORMATION DISPLAY PART

FIG.21

| EFFECTIVE TERM | XXXX~YYYY |
|---|---|
| EVENT IDENTIFIER | ACTION CONTENT INFORMATION |
| event_id0 | action_description_0; |
| event_id1 | action_description_1; |
| event_id2 | action_description_2; |
| ⋮ | ⋮ |

FIG.22

| CLIENT IDENTIFIER | XXXXXXXX |
|---|---|
| TIME | OCCURRING EVENT |
| 0000 | event_idA |
| 1000 | event_idB |
| 2000 | event_idC |
| 3000 | event_idD |
| ⋮ | ⋮ |

FIG.23

| EFFECTIVE TERM 0~999 ||
|---|---|
| EVENT IDENTIFIER | ACTION CONTENT INFORMATION |
| [(0,499),(0,0)] | add icon_A; |
| [(0,499),(1,0)] | add icon_B; |
| [(0,499),(2,0)] | add icon_C; |
| [(500,999),(0,0)] | add icon_D; |
| [(500,999),(1,0)] | add icon_E; |
| [(500,999),(2,0)] | add icon_F; |
| ⋮ | ⋮ |

FIG.24

| EFFECTIVE TERM 1000~1999 ||
|---|---|
| EVENT IDENTIFIER | ACTION CONTENT INFORMATION |
| [(1000,1499),(0,0)] | add icon_G; |
| [(1000,1499),(1,0)] | add icon_H; |
| [(1000,1499),(2,0)] | add icon_I; |
| [(1500,1999),(0,0)] | add icon_J; |
| [(1500,1999),(1,0)] | add icon_K; |
| [(1500,1999),(2,0)] | add icon_L; |
| ⋮ | ⋮ |

FIG.25

| EFFECTIVE TERM 1000~1999 ||
|---|---|
| EVENT IDENTIFIER | ACTION CONTENT INFORMATION |
| [(1000,1499),(0,0)] | add icon_A; |
| [(1000,1499),(1,0)] | add icon_G; |
| [(1000,1499),(2,0)] | add icon_C; |
| [(1500,1999),(0,0)] | add icon_D; |
| [(1500,1999),(1,0)] | add icon_E; |
| [(1500,1999),(2,0)] | add icon_F; |
| ⋮ | ⋮ |

FIG.26

| EFFECTIVE TERM 1000~1999 ||
|---|---|
| EVENT IDENTIFIER | ACTION CONTENT INFORMATION |
| [(1000,1499),(0,0)] | add icon_G; |
| [(1000,1499),(1,0)] | add icon_B; |
| [(1000,1499),(2,0)] | add icon_C; |
| [(1500,1999),(0,0)] | add icon_D; |
| [(1500,1999),(1,0)] | add icon_E; |
| [(1500,1999),(2,0)] | add icon_F; |
| ⋮ | ⋮ |

FIG.27

| EFFECTIVE TERM 00/09/04/19:00:00~00/09/04/19:15:00 ||
|---|---|
| EVENT IDENTIFIER | ACTION CONTENT INFORMATION |
| [00/09/04/19:00:00] | open http://page1; |
| [00/09/04/19:04:00] | open http://page2; |
| [00/09/04/19:09:15] | open http://page3; |
| [00/09/04/19:12:50] | open http://page4; |
| [00/09/04/19:13:00] | open http://page5; |
| [00/09/04/19:14:30] | open http://page6; |
| ⋮ | ⋮ |

FIG.30

| EFFECTIVE TERM 0~999 ||
|---|---|
| EVENT IDENTIFIER | ACTION CONTENT INFORMATION |
| [(0,299),(100,100)]−(200,200)] | add icon_A; |
| [(0,299),(300,300)]−(400,400)] | add icon_B; |
| [(300,599),(200,100)]−(300,200)] | add icon_A; |
| [(300,599),(200,300)]−(300,400)] | add icon_B; |
| [(600,999),(300,100)]−(400,200)] | add icon_A; |
| [(600,999),(100,300)]−(200,300)] | add icon_B; |
| ⋮ | ⋮ |

FIG.34

| BROADCAST INFORMATION IDENTIFYING INFORMATION | RELATED INFORMATION (URL) |
|---|---|
| ⋮ | ⋮ |
| FILE NAME; Video01<br>FRAME NUMBER: 001 | http: //www.xxx.co.jp/products.html |
| FILE NAME; Video01<br>FRAME NUMBER: 002 | http: //www.aaa.co.jp/program_information.html |
| ⋮ | ⋮ |
| FILE NAME; Video02<br>FRAME NUMBER: 001 | http: //www.bbb.co.jp/music_information.html |
| FILE NAME; Video02<br>FRAME NUMBER: 002 | http: //www.ccc.co.jp/cm_information.html<br>http: //www.ddd.co.jp/bgm_information.html<br>http: //www.eee.co.jp/price.html |
| ⋮ | ⋮ |

FIG.43

| PROCESS STEP | CHANNEL ID | IMAGE FRAME ID |
|---|---|---|
| step1 | a | 1000 |
| step2 | UNKNOWN | UNKNOWN |
| step3 | UNKNOWN | UNKNOWN |
| step4 | a | 1003 |
| step5 | a | 1004 |
| step6 | b | 400 |
| ⋮ | ⋮ | ⋮ |

FIG.44

| PROCESS STEP | LAST CH ID | LAST FRAME ID | CH ID | FRAME ID |
|---|---|---|---|---|
| step1 | z | 0 | a | 1000 |
| step2 | a | 1000 | a | 1001 |
| step3 | a | 1001 | a | 1002 |
| step4 | a | 1002 | a | 1003 |
| step5 | a | 1003 | a | 1004 |
| step6 | b | 1004 | b | 400 |
| ... | | 400 | ... | ... |

METHOD, SYSTEM, AND APPARATUS FOR ACQUIRING INFORMATION CONCERNING BROADCAST INFORMATION

TECHNICAL FIELD

The present invention relates to a technology by which a viewer obtains information related to broadcast information or related to recorded information from a server and the like connected to a network.

BACKGROUND ART

Digital satellite broadcasting and data broadcasting have started, and expectations are running high for these services as new mass media in addition to various broadcasting services. In a field of communication, many access systems such as ISDN, DSL, FTTL and IMT-2000 and the like have been built, IP flat-rate unlimited access service is started, and, broadband communication networks have become available. Thus, it is expected that the Internet becomes widespread more rapidly. The Internet has possibility that it develops as mass media. In the near future, it is expected that digital broadcasting and broadband communication are closely integrated, so that more diversified and interactive services are provided.

The greatest benefit obtained from the interactivity for the viewer is that the viewer can obtain personal information. Terminals for receiving information have become diversified to conform to types and amount of receiving information, purposes, environment, and operability on the information and the like.

Under these circumstances, conventional technologies and the problems will be described from the following three viewpoints.

(1) Since information such as TV and radio information sent from one direction can be obtained without any positive operation, no one feel inconvenience. However, such media have physical limitation for information conveyed by the media. If the viewer is satisfied with the information that is selected and modified by an information provider, there is no problem. When a viewer feels dissatisfaction for lack of information amount, for information providing method such as broadcast time and for broadcasting area and the like, this dissatisfaction can not be solved only by analog media such as conventional analog TV and analog radio. Even if the broadcasting media is digitized for physically increasing information amount, and even if pseudo interactivity is provided to the viewer by using information distribution of a carousel method, the dissatisfaction is not actually solved.

Although a service is started by using the Internet, in which information which can not be conveyed by the broadcasting media is provided, or in which information related to the broadcasting information is provided, since information is provided simply by a plurality of media (multimedia), the problem for providing synchronization and cooperation between items of information provided different media is not solved with the viewpoint of user interface.

Inventions disclosed in Japanese laid-open patent application No.9-160852 and Japanese laid-open patent application No.2000-183835 provide apparatuses for easily obtaining music and video broadcasted by radio and TV. These inventions solve problems on inconvenience for the viewers to obtain broadcast pieces of music and broadcast video after the viewers listened and viewed the pieces of music and images. According to the inventions, additional information (related information) corresponding to the music and the video is sent to the viewer over the media with the music and video, and the additional information is recorded when a request is input to a receiving apparatus when a desired music or image is distributed. Then, the desired music or video is identified via the network by using the recorded additional information, so that the information is obtained.

However, the above-mentioned inventions principally can not fully achieve an object to provide various services for providing related content that is desired by each individual viewer in synchronization with and in cooperation with broadcast content, based on the premise of current various communication access systems and terminals. In addition, the above-mentioned inventions principally can not fully achieve an object that the content provider impartiality provides the services.

That is, according to the conventional technologies, following problems have not been solved. There is no content delivering apparatus that can provide various services. It is not realized to deliver related content in consideration of receiving environment (terminal specification and the like) of the viewer. Status of access systems can not be grasped when delivering.

In addition, according to the conventional technology, the service can be provided only when the viewer inputs a request (record of related information necessary for receiving the service) when a piece of music or an image is delivered. Therefore, reservation or notification of service in synchronization with broadcast content can not be performed. When the viewer wants to obtain the desired service without leaving out any service, it becomes necessary that the viewer incessantly records related information according to the conventional apparatus.

(2) As to digital broadcast such as BS digital broadcast, CS digital broadcast and the like, various items of related information are provided with video and voice, and the items of related information can be referred to while the viewer is watching the video.

However, as for a television receiver which is generally used as a digital broadcast receiving apparatus, when a viewer watches related information, the related information is displayed on a part of a video display part, or the related information is displayed on the whole of the video display part. Therefore, when the related information is displayed, the video image may be reduced, a part of the image may be hidden, or it may be necessary to interrupt watching the video temporarily. When the amount of related information is large, it is difficult to fully grasp the related information simultaneously with viewing the video itself. Thus, it is desirable that the viewer can watch only related information when the viewer wants to do so after the program ends. In addition, since the conventional digital broadcast receiving apparatus displays every received related information, related information that the viewer is not interested in may be displayed.

It is studied to automatically select a broadcast program or related information that the viewer is interested in and to store the selected information by using related information and EPG (Electric Program Guide) information while the viewer does not watch television broadcast. In this case, it is a problem to be solved to obtain information that the viewer is interested in. Conventionally, some methods are proposed, in which the viewer directly inputs a interested keyword to obtain interest information, or interest information is estimated from related information of a program that the viewer watched.

A following document discloses the method for automatically selecting a broadcast program that is a subject of interest of the viewer, (Reference document): Yuichi Yagawa et al.

"Study of agent for automatically editing television program corresponding to individual taste" IEICE AI98-55, PP.9-16, December 1998.

In addition, Japanese laid-open patent application No.11-134345 (preference information selection apparatus) discloses a method for estimating interest information from related information of a program that the viewer watched.

However, it is not easy for the viewer to consider and input a keyword indicating information that the viewer is interested in. In addition, the method for estimating related information from interest information of the program has the same problem as the before-mentioned problem that even related information that is not interested in by the viewer is displayed.

(3) As mentioned above, it is possible to multiplex data signals as related information into digital broadcast such as television broadcast or radio broadcast. Therefore, in a digital broadcast receiving apparatus or a terminal connected to the receiving apparatus, processes synchronized with broadcast content can be performed by using the data signal multiplexed in the broadcast. For example, it is possible to deliver related information on a broadcasted television program or a radio program at the same time with the program.

Also in analog television broadcast, it is possible to multiplex data signals in television image signals by a method defined in ARIB STD-B5 "Data Multiplex Broadcasting System For The Conventional Television Using The Vertical Blanking Interval". Especially, in systems such as one called "Bit Cast" (which can be referred to in Nikkei multimedia, No.28, 1997.10,P.52-P.57), functions are realized such as displaying related information in synchronization with broadcast content by using data signals multiplexed in analog television image signal.

In WWW (World Wide Web), content in a home page is updated in synchronization with broadcast content such as television and radio. The viewer can receive information synchronized with the broadcast content to some extent by accessing the home page.

However, in order to perform processes in synchronization with broadcast content by using data signals multiplexed in broadcast, it is necessary that the terminal obtains data signals multiplexed in the broadcast. That is, there is a problem that the terminal needs to have a function to receive broadcast, or needs to be connected to a broadcast receiving apparatus and have a function to obtain data signals multiplexed in broadcast.

When the terminal does not have such function so that the terminal obtains the data signals multiplexed in the broadcast via a network, there is a problem in that delay time occurs in data signals in the network from a time when an event occurs to a time when an action is executed.

In addition, when providing information related to broadcast video and voice, in a method in which URL is sent with the video and voice, it is necessary that information such as the URL is added to broadcast information. For example, as for broadcast information such as CM that is broadcast repeatedly, it is necessary to add information such as URL corresponding to each item of broadcast information.

Further, in the case where broadcast video and voice are stored and used, there is a problem in that related information can not be obtained at the time when the stored video and voice are reproduced if information such as URL that is broadcast at the same time as the video and voice is not stored.

In the same way, in a method for obtaining related information by using time and CH number as disclosed in Japanese laid-open patent application No.9-160852,when broadcast information that is stored is watched, there is a problem in that related information can not be obtained since the time when the information is watched is different from the time when the information is broadcasted, so that the related information can not be associated with the broadcast information.

In addition, according to the conventional technology, there is a problem in that changing point of image frame of watched broadcast program image can not be grasped accurately.

As mentioned above, according to the conventional technologies, there is a problem in that it is not easy that a viewer obtains information or content that is related to broadcast information or recorded information from a server and the like connected to a network.

DISCLOSURE OF THE INVENTION

The present invention is contrived in view of the above-mentioned points, an object of the present invention that a viewer viewing broadcast information or recorded information can easily obtain information or content related to broadcast information or recorded information from a server and the like connected to a network. More particularly, this object is achieved by achieving the following first to fifth objects in the present invention.

The first object of the present invention is to solve the problem of the conventional technology of (1). That is, the first object is to provide for providing related information that can not be included in broadcast medium sending information in one direction in synchronization with and in cooperation with broadcast content based on the premise that there are various communication access systems and terminals, and the first object is that a content provider provides various services in styles according demands of individual viewers. In addition, the first object is to provide an environment in which a viewer can obtain desired services with out missing any service, and an environment in which a problem is solved, wherein the problem is that it is burdensome to receive a service for obtain related content while viewing and after viewing.

The second object of the present invention is to solve the problem of the conventional technology of (2). The second object is that, while a viewer is viewing video information, the viewer can easily refer to information related to a subject to which the viewer is interested in without restriction of time, and the second object is that broadcast information corresponding to dynamically changing interest information of the viewer is automatically selected, and the viewer can obtain the broadcast information. In addition, the second object is to enable a viewer to refer to various and proper related information so as to enable automatic selection of video information in detail.

The third object of the present invention is to solve the problem of the conventional technology of (3). More particularly, the third object is to provide a technology for quickly executing a process corresponding to an event synchronized with broadcast content of a predetermined channel without obtaining a data signal superimposed on broadcast by a viewer apparatus. The fourth object of the present invention is to enable a related information providing service for providing related information related to broadcast information via a network without any special process for adding, to broadcast information, information necessary for providing related information. In addition, the fourth object of the present invention is to enable a related information providing service for providing related information when the broadcast information is stored temporarily and is reproduced and viewed.

The fifth object of the present invention is to enable to provide a service correctly synchronized with broadcast content, in which a viewer apparatus can identify individual broadcast program content that is viewed by a user at a very short time resolution that is less than 1/30 second (corresponding to one image frame unit of television broadcast video), wherein the viewer apparatus does not have a communication means such as a communication line and the like for performing digital signal communication with a broadcast receiving apparatus.

To achieve the first object, the present invention can be configured in the following.

The present invention is a method used for a viewer apparatus to obtain a service, in a system in which the viewer apparatus and a content providing server are connected via network, wherein the content providing server provides the service that relates to video or voice, wherein:

when the viewer apparatus requests to obtain a service, the viewer apparatus sends service providing request information to a related information providing server so as to request information on providable services related to video;

the related information providing server sends the information on the providable services to the viewer apparatus on the basis of the service providing request information;

the viewer apparatus receives the information on the providable services;

the viewer apparatus requests for the content providing server to provide a service selected from the providable services; and the viewer apparatus obtains the service from the content providing server.

In the above-mentioned method, the method further may include the step of the viewer apparatus storing viewer information, wherein the service providing request information may include the viewer information.

In addition, the present invention is a broadcast synchronization/cooperation type content send/receive system in which a viewer apparatus of a viewer viewing a broadcast and a content providing server for providing content related to the broadcast are connected to a network, the viewer apparatus comprising:

means for sending, in synchronization with or in cooperation with broadcast content, information necessary for requesting a service to the content providing server so as to request information on providable services related to broadcast content;

means for visualizing and displaying the information on the providable services received from the content providing server in a selectable form;

means for selecting a service from the services which are visualized and displayed, and requesting the service to the content providing server;

means for receiving and using the service provided by the content providing server in response to a request of the service;

the content providing server comprising:

means for selecting the providable services on the basis of the information of the viewer apparatus in response to a request for information on the providable services received from the viewer apparatus;

means for sending information on selected providable services to the viewer apparatus; and means for receiving a request of a service from the viewer apparatus, and sending the service to the viewer apparatus which is the source of the request.

In the above-mentioned system, the viewer apparatus further may include means for receiving event information; wherein the means for requesting information on the providable services in the viewer apparatus automatically sends a request at a timing that is set beforehand by the viewer on the basis of the event information.

The content providing server may include:

means for estimating or detecting status of the access system between the content providing server and the viewer apparatus when the content server receives a request for a service from the viewer apparatus; and means for converting content on a service to be sent to the viewer apparatus so as to optimize the content on the basis of the status of the access system estimated or detected and information of the viewer apparatus.

In addition, the present invention is a viewer apparatus of a viewer viewing a broadcast, the viewer apparatus connected to a content providing server of a provider for providing content related to the broadcast via a network, the viewer apparatus comprising:

means for sending, in synchronization with or in cooperation with broadcast content, information necessary for requesting a service to the content providing server so as to automatically request information on providable services related to broadcast content on the basis of input by the viewer or at a predetermined timing;

means for visualizing and displays the information on the providable services received from the content providing server in a selectable form;

means for selecting a service from the services which are visualized and displayed, and requesting the service to the content providing server;

means for receiving and using the service provided by the content providing server in response to a request of the service.

In addition, the present invention is a content providing server of a provider for providing content related to a broadcast, the content providing server connected to a viewer apparatus of a viewer viewing the broadcast via a network, the content providing server comprising:

means for selecting providable services on the basis of information of the viewer apparatus in response to a request for information on the providable services received from the viewer apparatus;

means for sending information on selected providable services to the viewer apparatus;

means for estimating or detecting status of the access system between the content providing server and the viewer apparatus when the content server receives a request for a service from the viewer apparatus; and means for converting content on a service to be sent to the viewer apparatus so as to optimize the content on the basis of the status of the access system estimated or detected; and means for sending optimized content to the viewer apparatus that is the source of a request so as to provide a service.

In addition, to chive the object of the present invention, the present invention can be configured in the following.

The present invention is a method used for a viewer apparatus to obtain content information in a system in which the viewer apparatus and a content providing server for providing the content information related to video or voice are connected via a network, comprising the steps of:

the viewer apparatus obtaining related information necessary for obtaining the content information;

sending the related information to the content providing server so as to request the content providing server to send the content information; and obtaining the content information sent from the content providing server.

To achieve the first object, the present invention can be configured in the following. In the above-mentioned method, the viewer apparatus obtains the related information by separating related information broadcast with the video or related information recorded with the video from the video; and the related information includes, corresponding to each of a plurality of subjects included in the video, at least a piece of information resource identifying information and subject attribute information for describing a subject.

In addition, to achieve the first object, the present invention can be configured in the following.

The present invention is a viewer apparatus for receiving broadcast information including video information and related information related to the video information, wherein the related information includes, corresponding to each of a plurality of subjects included in the video information, at least a piece of information resource identifying information and subject attribute information for describing a subject;

the viewer apparatus comprising a broadcast receiving part for receiving the broadcast information, a video display part, a video display control part, first pointing means, a subject related information display part, a related information display control part, second pointing means, a subject attribute information storing part, a related information accessing part, and a related information storing part;

the video display control part displaying video information in the broadcast information received by the broadcast receiving part on the video display part, and identifying a subject pointed by the first pointing means among subjects displayed on the video display part;

the related information display control part displaying characters, a symbol, or a figure representing the subject identified by the video display control part on the subject related information display part, identifying information resource identifying information corresponding to the subject represented by the characters, the symbol, or the figure pointed by the second pointing means on the subject related information display part, and sending the information resource identifying information to the related information accessing part;

the related information accessing part obtaining content information by accessing the related information storing part or an information resource connected to a communication network in response to the information resource identifying information; and the related information display control part displaying the content information obtained by the related information accessing part on the subject related information display part.

In addition, the viewer apparatus may further includes an interest information extraction part;

the related information display control part sending, to the interest information extraction part, a plurality of pieces of information in the information resource identifying information, subject attribute information, the content information obtained from the information source, display time information on time during which the content information is displayed on the subject related information display part;

the interest information extraction part generating and holding interest information by referring to a plurality of pieces of information in the information resource identifying information, the subject attribute information, the content information, and the display time information, and selecting, on the basis of the interest information, second broadcast information received from the broadcast receiving part at a time different from a time at which the broadcast information is received.

In addition, the viewer apparatus may further includes a video storing part, and storing broadcast information selected by the interest information extraction part.

In addition, in the viewer apparatus, the related information display control part may include:

means for moving or deleting the characters, the symbol, or the figure representing a subject displayed on the subject related information display part by using the second pointing means or other input means;

wherein, when an operation of moving or deleting the characters, the symbol or the figure, the related information display control part sends operation information indicating the operation to the interest information extraction part;

the interest information extraction part updates the interest information on the basis of the operation information.

In addition, in the viewer apparatus, the related information includes subject coordinates on the video display part for each of subjects included in the video information, and the subject is identified by pointing an area including a point of the subject coordinates by using the first pointing means.

To achieve the third object, the present invention can be configured in the following.

The present invention is a method used for a viewer apparatus to obtain content information in a system in which the viewer apparatus and a content providing server for providing the content information related to video or voice are connected via a network, comprising the steps of:

the viewer apparatus obtaining related information necessary for obtaining the content information;

sending the related information to the content providing server so as to request the content providing server to send the content information; and obtaining the content information sent from the content providing server. In addition, the system includes a related information providing server;

the related information providing server forms, for each effective term, an action table for specifying an event identifier indicating an effective event and a corresponding action, the effective term being specified in synchronization with time in broadcasting video;

the related information providing sever sends the action table to a viewer apparatus;

the viewer apparatus receives the action table from the related information providing server; and the viewer apparatus obtains the event identification on the basis of an event that occurs in the viewer apparatus, performs the action corresponding to the event identification by using the action table so as to obtain related information necessary for obtaining the content information.

In addition, the present invention is a system for processing an event in synchronization with broadcast content, the system comprising a server for collecting information on broadcast content sent from a broadcasting station or a broadcasting information storing server and a viewer apparatus communicating with the server via a network, the server comprising:

action table forming means for forms, for each effective term, an action table specifying an event identifier indicating an effective event and action information indicating a process corresponding to the event identifier, the effective term being specified in synchronization with time in broadcasting broadcast content; and action table providing means for sending the action table to the viewer apparatus;

the viewer apparatus comprising:

event managing means for obtaining the event identifier on the basis of an event;

action table managing means for referring to the action table received from the server during the effective term so as to obtain action information corresponding to the event identifier; and action execution means for executing the action information.

In the above-mentioned system, the action table managing means of the viewer apparatus sends the event identifier to the server;

the server further comprising viewer apparatus information managing part for managing the event identifier received from the viewer apparatus for each viewer apparatus;

the table forming means in the server forming the action table for each viewer apparatus on the basis of the event identifier managed for each viewer apparatus.

Accordingly, proper action can be executed for each client.

In the above-mentioned system, the action table managing means in the viewer apparatus requests an action table having a future effective term from the server beforehand, such that the viewer apparatus can refer to an action table having a next effective term just after the effective term of an action table currently referred to ends.

Accordingly, the viewer apparatus can request an action table when the viewer apparatus (client) needs the action table, so that useless delivering of action table can be avoided.

In addition, in the above-mentioned system, the action table providing means actively sends a new action table to a plurality of viewer apparatuses just after the action table forming means forms a new action table. Accordingly, the viewer apparatus does not need to request the action table, so that the process can be simplified.

The present invention can be also configured in the following way.

The present invention is a method for processing an event in synchronization with broadcast content in a system comprising a server for collecting information on broadcast content sent from a broadcasting station or a broadcasting information storing server and a viewer apparatus communicating with the server via a network, comprising:

a first step in which the server forms, for each effective term, an action table specifying an event identifier indicating an effective event and action information indicating a process corresponding to the event identifier, the effective term being specified in synchronization with time in broadcasting broadcast content; and a second step in which the server sends the action table to the viewer apparatus;

a third step in which the viewer apparatus obtains the event identifier on the basis of an event;

a fourth step in which the viewer apparatus obtains action information corresponding to the event identifier by using the action table received from the server; and a fifth step in which the viewer apparatus executing the action information;

wherein the viewer apparatus refers to the action table received from the server during the effective term.

In the above-mentioned method, in the third step, the viewer apparatus sends the event identifier to the server;

the method further comprising:

a sixth step in which the server manages the event identifier received from the viewer apparatus for each viewer apparatus;

wherein, in the first step, the server forms the action table for each viewer apparatus on the basis of the event identifier managed for each viewer apparatus.

The above-mentioned method may further includes a step in which wherein the viewer apparatus requests an action table having a future effective term from the server beforehand, such that the viewer apparatus can refer to an action table having a next effective term just after the effective term of an action table currently referred to ends.

The above-mentioned method may further includes a step in which the server sends a new action table to a plurality of viewer apparatuses just after forming a new action table in the first step.

In addition, the present invention is a server for collecting information on broadcast content sent from a broadcasting station or a broadcasting information storing server, and processing an event in synchronization with broadcast content, the server comprising:

action table forming means for forms, for each effective term, an action table specifying an event identifier indicating an effective event and action information indicating a process corresponding to the event identifier, the effective term being specified in synchronization with time in broadcasting broadcast content; and action table providing means for sending the action table to the viewer apparatus.

The above-mentioned server may further includes viewer apparatus information managing part for managing the event identifier received from the viewer apparatus for each viewer apparatus;

the table forming means in the server forming the action table for each viewer apparatus on the basis of the event identifier managed for each viewer apparatus.

In the server, the action table providing means actively sends a new action table to a plurality of viewer apparatuses just after the action table forming means forms a new action table.

The present invention is a viewer apparatus in a system comprising a server for collecting information on broadcast content sent from a broadcasting station or a broadcasting information storing server and the viewer apparatus communicating with the server via a network, the viewer apparatus comprising:

means for receiving, from the server, an action table, having an effective term, specifying an event identifier indicating an effective event and action information indicating a process corresponding to the event identifier, the effective term being specified in synchronization with time in broadcasting broadcast content; and event managing means for obtaining the event identifier on the basis of an event;

action table managing means for referring the action table received from the server during the effective term so as to obtain action information corresponding to the event identifier; and action execution means for executing the action information; and means for sending the event identifier to the server.

In the above-mentioned viewer apparatus, the action table managing means in the viewer apparatus requests an action table having a future effective term from the server beforehand, such that the viewer apparatus can refer to an action table having a next effective term just after the effective term of an action table currently referred to ends.

To achieve the fourth and fifth objects, the present invention can be configured in the following.

The present invention is a method for a viewer apparatus to obtain related information in a system in which the viewer apparatus and a related information providing server for providing the related information related to broadcast information are connected via a network, wherein:

the viewer apparatus sends predetermined information extracted from the broadcast information to the related information providing server; and the related information providing server obtains the related information related to the broadcast information by using the predetermined information, and sends the related information to the viewer apparatus.

In the method, the related information providing server stores viewer information indicating characteristics of a viewer to which the related information is provided, and viewer apparatus information indicating characteristics of a terminal to which the related information is provided;

the viewer apparatus sends, in addition to the predetermined information, viewer information or viewer apparatus information specific for the viewer apparatus to the related information providing server;

the related information providing server obtains related information, and selects related information on the basis of the viewer information or viewer apparatus information specific for the viewer apparatus, and sends selected related information to the viewer apparatus.

To achieve the fourth object, the present invention can be configured in the following.

The present invention is a method used for a viewer apparatus to obtain content information in a system in which the viewer apparatus and a content providing server for providing the content information related to video or voice are connected via a network, comprising the steps of:

the viewer apparatus obtaining related information necessary for obtaining the content information;

sending the related information to the content providing server so as to request the content providing server to send the content information; and obtaining the content information sent from the content providing server, in addition, the system includes related information providing server, and records video and corresponding related information in a database on the related information providing server;

the viewer apparatus sends video or partial video information to the related information providing server, the partial video information being characteristic amount information obtained by converting the video;

the related information providing server searches the database by using received video or the partial video information, and sends related information obtained by the search to the viewer apparatus; and the viewer apparatus obtains the related information necessary for obtaining the content information.

In the method, the related information providing server stores viewer information indicating characteristics of a viewer to which the related information is provided, and viewer apparatus information indicating characteristics of a terminal to which the related information is provided;

the viewer apparatus sends, in addition to the partial video information, viewer information or viewer apparatus information specific for the viewer apparatus to the related information providing server;

the related information providing server obtains related information, and selects related information on the basis of the viewer information or viewer apparatus information specific for the viewer apparatus, and sends selected related information to the viewer apparatus.

In addition, the present invention is a related information providing method used for obtaining related information related to broadcast information, and providing the related information to a viewer, related information providing method comprising the steps of:

storing the broadcast information in a broadcast information database, and storing related information of each piece of the broadcast information in a related information database;

searching the broadcast information database for a piece of broadcast information corresponding to partial broadcast information which is a part of broadcast information being viewed by a viewer or which is characteristic amount information obtained by converting the part of broadcast information; and obtaining related information of the searched broadcast information by searching the related information database by the searched broadcast information, so as to provide searched related information.

In addition, the present invention is a related information providing method used for obtaining related information related to broadcast information that is stored in a broadcast information storing apparatus, and providing the related information to a viewer, the related information providing method comprising the steps of:

storing the broadcast information in a broadcast information database, and storing related information of each piece of the broadcast information in a related information database;

searching the broadcast information database for a piece of broadcast information corresponding to partial broadcast information which is a part of broadcast information being reproduced and viewed by a viewer or which is characteristic amount information obtained by converting the part of broadcast information; and obtaining related information of the searched broadcast information by searching the related information database by the searched broadcast information, so as to provide searched related information.

In the related information providing method, the partial broadcast information is broadcast information that is viewed for a predetermined time including a point of time when a related information providing instruction is input by a viewer, or the partial broadcast information is characteristic amount information obtained by converting broadcast information.

In the related information providing method, the broadcast information database manages each piece of broadcast information by using broadcast information identifying information, and the related information database manages the related information associated with the broadcast identifying information, the related information providing method comprising the steps of:

specifying a broadcast information identifying information of broadcast information corresponding to the partial broadcast information by searching the broadcast information database; and obtaining related information corresponding to the broadcast information identifying information by referring to the related information database, and providing the related information to the viewer.

In the related information providing method, the related information database manages, in addition to the related information, viewer information indicating characteristics of a viewer to which the related information is provided, and viewer apparatus information indicating characteristics of a terminal to which the related information is provided, related information providing method comprising the step of:

obtaining related information, and selecting related information on the basis of the viewer information or viewer apparatus information specific for the viewer apparatus, and sending selected related information to the viewer.

In addition, the present invention is a broadcast receiving system with a related information providing function, comprising one or more viewer apparatus and a related information providing server, the viewer apparatus comprising:

means for receiving broadcast information including video and voice, and providing the broadcast information to a viewer;

means for sending partial broadcast information via a network, the partial broadcast information being broadcast information that is viewed by a viewer at a point of time when a related information providing instruction is input by the viewer, or the partial broadcast information being characteristic amount information obtained by converting broadcast information; and means for obtaining related information sent via the network;

the related information providing server comprising:

a broadcast information database for managing each piece of broadcast information by associating the each piece of broadcast information with broadcast information identifying information;

a related information database for managing the related information associated with the broadcast identifying information;

means for specifying a broadcast information identifying information of broadcast information corresponding to the partial broadcast information sent by the viewer apparatus by searching the broadcast information database; and means for obtaining related information corresponding to the broadcast information identifying information by referring to the related information database, and providing the related information to the viewer apparatus.

In addition, the present invention is a viewer apparatus comprising:

broadcast receiving means for receiving broadcast information;

broadcast information demodulating/decoding means for demodulating and decoding the broadcast information received by the broadcast receiving means;

input means for a viewer to input instructions including a related information providing instruction;

network communication means for communicating with a related information providing server that stores related information corresponding to each piece of broadcast information via a network;

related information obtaining means: for sending partial broadcast information via the network in response to the related information providing instruction input by the input means, wherein the partial broadcast information is broadcast information that is output by the broadcast information demodulating/decoding means at a point of time when the related information providing instruction is input, or the partial broadcast information is characteristic amount information obtained by converting broadcast information; and for receiving related information corresponding to the partial broadcast information via the network, wherein the related information is sent from the related information providing server;

display/reproduce means for reproducing and displaying the broadcast information output from the broadcast information demodulating/decoding means, and the related information obtained by the related information obtaining means.

the viewer apparatus may further includes broadcast information storing means for storing broadcast information output from the broadcast information demodulating/decoding means;

wherein, when the related information obtaining instruction is input by the input means while reproducing and viewing broadcast information stored in the broadcast information storing means, the related information obtaining means sends partial broadcast information via the network, wherein the partial broadcast information is broadcast information that is reproduced and viewed at a point of time when the related information providing instruction is input, or the partial broadcast information is characteristic amount information obtained by converting broadcast information.

In addition, the viewer apparatus may further includes a button for bookmark, wherein:

the viewer apparatus stores partial broadcast information in a memory at a point of time when viewer operates the button for bookmark, and the related information obtaining means accesses the related information providing server at a time when the related information obtaining instruction is input, and sends the partial broadcast information stored in the memory to the related information providing server.

In addition, the present invention is a related information providing server, wherein the related information providing server is connected to a network, the related information providing server comprising:

a broadcast information database for managing each piece of broadcast information by associating the each piece of broadcast information with broadcast information identifying information;

a related information database for managing the related information associated with the broadcast identifying information;

means for specifying a broadcast information identifying information of broadcast information corresponding to the partial broadcast information sent by a viewer apparatus by searching the broadcast information database; and means for obtaining related information corresponding to the broadcast information identifying information by referring to the related information database, and providing the related information to the viewer apparatus;

wherein the partial broadcast information is broadcast information being viewed by a viewer, or broadcast information stored in a broadcast storing apparatus, or characteristic amount information obtained by converting broadcast information.

To achieve the third object, the present invention can be configured in the following.

The present invention is a method used for a viewer apparatus to obtain content information in a system in which the viewer apparatus and a content providing server for providing the content information related to video or voice are connected via a network, comprising the steps of:

the viewer apparatus obtaining related information necessary for obtaining the content information;

sending the related information to the content providing server so as to request the content providing server to send the content information; and obtaining the content information sent from the content providing server; in addition, the method comprising the steps of:

a broadcast station or a broadcast information storing server superimposing a predetermined data signal on voice, and sending the voice;

a broadcast receiving apparatus outputting broadcast voice from a speaker;

the viewer apparatus collecting the broadcast voice by using a microphone, converting the broadcast voice into an electrical signal, extracting the data signal superimposed in the electrical signal, and obtaining the related information by using the data signal.

In the above-mentioned method, the system includes a related information providing server; and the viewer apparatus sending the data signal to the related information providing server;

the related information providing server obtains the related information by using the data signal, and sending the related information to the viewer apparatus; and the viewer apparatus obtaining the related information.

In the method, the related information providing server stores viewer information indicating characteristics of a viewer to which the related information is provided, and viewer apparatus information indicating characteristics of a terminal to which the related information is provided;

the viewer apparatus sends, in addition to the data signal, viewer information or viewer apparatus information specific for the viewer apparatus to the related information providing server;

the related information providing server specifies related information, and selects related information on the basis of the viewer information or viewer apparatus information specific for the viewer apparatus, and sends selected related information to the viewer apparatus.

In addition, the present invention is a broadcast synchronization, type service providing method, wherein:

a broadcasting station for sending voice, or voice and video, or a broadcast information storing server superimposes a data signal on voice and sends the data signal, the data signal including a channel identifier uniquely assigned to a broadcast channel and an image frame identifier uniquely assigned to an image frame in video, or the data signal including a voice frame identifier uniquely assigned to a voice frame in voice;

in a receiving side, a viewer apparatus:

collects broadcast voice output from a speaker of a broadcast receiving apparatus by using a microphone, and converts the broadcast voice into an electrical signal;

extracts the data signal superimposed on the electrical signal continuously one after another;

extracts the channel identifier and the image frame identifier, or the voice frame identifier from the data signal; and obtains related information corresponding to the channel identifier and the image frame identifier, or the voice frame identifier via a network.

In the broadcast synchronization type service providing method, the broadcasting station or the broadcast information storing server sends the image frame identifier or the vice frame identifier as a time-series continuous number;

when the viewer apparatus continuously extracts the data signal superimposed on the voice from the voice output from the speaker of the broadcast receiving apparatus, if the data signal is correctly extracted from the voice so that the image frame identifier or the voice frame identifier is recognized, the viewer apparatus uses the image frame identifier or the voice frame identifier as an image frame identifier or an voice frame identifier of an image that is currently reproduced by the broadcast receiving apparatus;

if the data signal is not correctly extracted from the voice so that the image frame identifier or the voice frame identifier is not recognized, the viewer apparatus generates and uses an image frame identifier or a voice frame identifier on the basis of a value of an image frame identifier or a voice frame identifier that is most recently recognized, and on the basis of a difference between a time when the most recently recognized image frame identifier or voice frame identifier is recognized and a current time.

In the broadcast synchronization type service providing method, the viewer apparatus obtains the related information from a related information providing server connected to the network, in which the related information is stored in a broadcast information database managed by the related information providing server, in which the related information is associated with the channel identifier and the image frame identifier, or the voice frame identifier.

In addition, the present invention is a broadcast synchronization type service providing system comprising a broadcasting station for sending voice, or voice and video, or a broadcast information storing server, and a viewer apparatus in a receiving side, wherein:

the broadcasting station or the broadcast information storing server comprising means for superimposing a data signal on voice and sends the data signal, the data signal including a channel identifier uniquely assigned to a broadcast channel and an image frame identifier uniquely assigned to an image frame in video, or the data signal including a voice frame identifier uniquely assigned to a voice frame in voice;

the viewer apparatus comprising:

a microphone for collecting broadcast voice output from a speaker of a broadcast receiving apparatus and converting the broadcast voice into an electrical signal;

data signal extraction means for extracting the data signal superimposed on the electrical signal continuously one after another, and extracting the channel identifier and the image frame identifier, or the voice frame identifier from the data signal; and means for obtaining related information corresponding to the channel identifier and the image frame identifier, or the voice frame identifier via a network.

In addition, the present invention is a viewer apparatus for receiving voice output from a broadcast receiving apparatus receiving voice or voice and video sent from a broadcasting station or a broadcast information storing server, wherein:

a data signal is superimposed on the voice, the data signal including a channel identifier uniquely assigned to a broadcast channel and an image frame identifier uniquely assigned to an image frame in video, or the data signal including a voice frame identifier uniquely assigned to a voice frame in voice;

the viewer apparatus comprising:

a microphone for collecting broadcast voice output from a speaker of a broadcast receiving apparatus and converting the broadcast voice into an electrical signal;

data signal extraction means for extracting the data signal superimposed on the electrical signal continuously one after another, and extracting the channel identifier and the image frame identifier, or the voice frame identifier from the data signal; and means for obtaining related information corresponding to the channel identifier and the image frame identifier, or the voice frame identifier via a network.

The viewer apparatus may send, in addition to the channel identifier and the image frame identifier or the voice frame identifier, viewer information or viewer apparatus information specific for the viewer apparatus to the related information providing server; and the related information providing server obtains related information, and selects related information on the basis of the viewer information or viewer apparatus information specific for the viewer apparatus, and sends selected related information to the viewer apparatus. The viewer apparatus can obtain the selected related information Other objects, features and advantages of the present invention will become more apparent from the following detailed description when read in conjunction with the accompanying drawings.

BRIEF DESCRIPTION OF THE DRAWINGS

FIG. 9 is a figure showing an example of a notification setting (condition setting) screen;

FIG. 10 is a block diagram of a system of a second embodiment of the present invention (example 2-1);

FIG. 21 is an example of an action table according to the third embodiment;

FIG. 22 shows an example of a client occurrence event list according to the third embodiment;

FIG. 23 is an example of an action table that is obtained first in the example 3-1;

FIG. 24 is an example of an action table obtained next to that shown in FIG. 23;

FIG. 25 is an example of an action table according to the example 3-1;

FIG. 26 is an example of an action table that is different from the action table shown in FIG. 25;

FIG. 27 an action table according to the example 3-2;

FIG. 30 is a figure showing an example of an action table according to the example 3-3;

FIG. 34 is a figure showing an example of a table which the related information database 4022 has;

FIG. 43 shows a recognition result example for the channel ID and the image frame ID according to a result of a process performed by the data signal extraction means after the viewer apparatus is launched;

FIG. 44 shows values of variables obtained by the data signal extraction process shown in FIG. 43.

PREFERRED EMBODIMENTS FOR CARRYING OUT THE INVENTION

Figure 1:
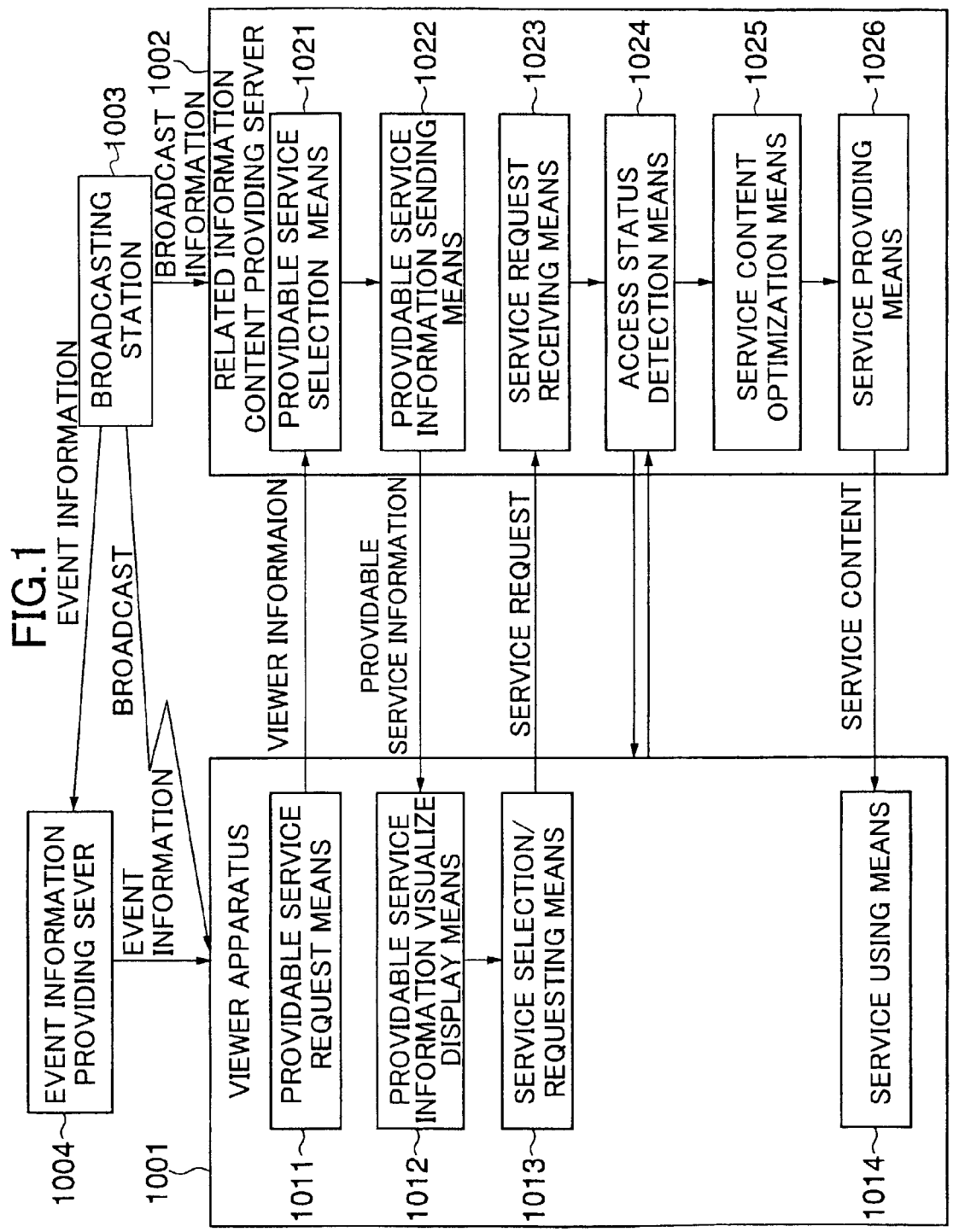
FIG. 1 is a figure showing a basic configuration example of a first embodiment of the present invention.

In the following, first to fifth embodiments that correspond to the first to fifth objects respectively will be described. According to an invention for the first to fifth embodiments, a viewer of broadcast information or recorded information can easily obtain information or content related to the broadcast information or recorded information from a server and the like connected to a network, and the objective of the present invention is achieved. Next, an overview of each embodiment will be described.

In the first embodiment, a viewer apparatus obtains related information by requesting a service to a related information content providing server that provides the related information and content corresponding to the related information, wherein a broadcast receiving apparatus for viewing broadcast delivered from a broadcasting station and an apparatus for obtaining related information related to broadcast are integrated in the viewer apparatus. In addition, the viewer apparatus obtains event information, and the viewer apparatus requests a service on the basis of the event information.

In the second embodiment, the broadcasting station sends broadcast information including information (URL and the like) corresponding to related information provided by the related information content providing server to the viewer apparatus. The information is added to each frame by each subject, and the viewer points a subject in which the viewer is interested so as to obtain the related information. In addition, interest information is obtained on the basis of pointing by the viewer, so that content corresponding to the interest of the viewer is automatically obtained. Accordingly, like the first embodiment, information related to broadcast information and the like can be easily obtained.

As for third to fifth embodiments, the basic configurations are the same as that of the first embodiment, and the object is to easily obtain information related to broadcast information and the like. However, configuration for obtaining related information differs.

That is, according to the third embodiment, a related information providing server provides the viewer apparatus with an action table related to broadcast content, and the viewer viewing the broadcast generates an event, which is indicated by the action table. Accordingly, an action corresponding to the event is executed, so that the related information is obtained.

In the fourth embodiment, the viewer apparatus sends a partial broadcast information to the related information providing server, and the related information providing server sends related information related to the broadcast to the viewer apparatus on the basis of the partial broadcast information.

In the fifth embodiment, frame ID and the like is superimposed on voice in broadcast. The viewer apparatus extracts the frame ID and the like, and requests related information to the related information content providing server by using the frame ID and the like.

In each embodiment, the viewer apparatus can obtain related information related to viewer information such as viewer profile and the like or terminal information. In addition, in each embodiment, the viewer apparatus obtains related information not only while receiving broadcast information from the broadcasting station, but also while receiving broadcast information from a broadcast information storing server that stors broadcast information via a network such as the Internet, for example.

In the following, each embodiment will be described in detail.

First Embodiment

In the following, the first embodiment corresponding to the first object will be described in detail.

FIG. 1 shows a basic configuration example of the first embodiment of the present invention. In the figure, 1001 indicates a viewer apparatus of a viewer who views broadcast, 1002 indicates a related information content providing server of a provide for providing information related to broadcast and information related to the related information, 1003 indicates a broadcasting station for sending broadcast content in only one direction, 1004 indicates an event information providing server for providing event information.

When the viewer views broadcast from the broadcasting station 1003, a providable service request means 1011 in the viewer apparatus 1001 sends viewer information, terminal information or an ID of the viewer apparatus 1001 necessary for requesting a service to the related information content providing server 1002 so as to request information of services that can be provided and that are related to the broadcast content.

A providable service selection means 1021 in the related information contents providing server 1002 selects services that can be provided on the basis of the viewer apparatus 1001 in response to the request received from the viewer apparatus 1001. A providable service information sending means 1022 sends selected providable service information to the viewer apparatus 1001.

A providable service information visualize display means 1012 in the viewer apparatus 1001 displays providable service information received from the related information content providing server 1002 by using icons. When one of icons is selected by a pointing device, a service selection/requesting means 1013 requests a service indicated by the icon.

When receiving the service request, a service request receiving means 1023 in the related information content providing server 1002 launches an access status detection means 1024. The access status detection means 1024 sends packets of a predetermined amount from the related information content providing server 1002 to the viewer apparatus 1001, and measures a time for the packets to return from the viewer apparatus 1001, so as to estimate the status of access system between the related information content providing server 1002 and the viewer apparatus 1001.

A service content optimization means 1025 converts and optimizes image size, resolution and the like of content of the service to be sent to the viewer apparatus 1001 on the basis of the information of the viewer apparatus 1001 and the status of the access system. A service providing means 1026 sends the optimized content to the viewer apparatus 1001 to provide the requested service.

A service using means 1014 in the viewer apparatus 1001 receives content of the service that the related information content providing server 1002 provides, and uses the requested service by storing, displaying and outputting the content.

Figure 2:
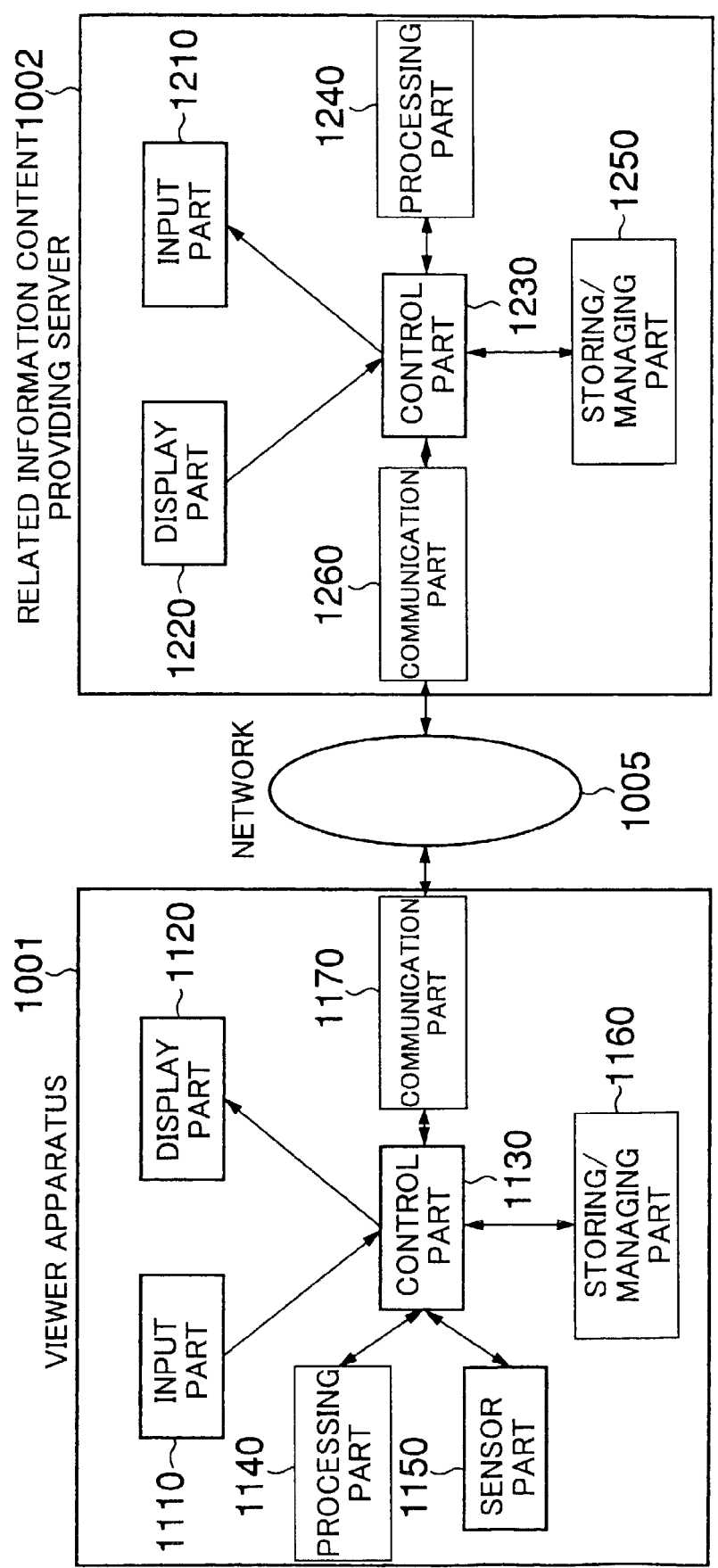
FIG. 2 is a block diagram of a system of the first embodiment of the present invention.

FIG. 2 shows a configuration of a system for realizing functions of the present invention shown in FIG. 1. The viewer apparatus 1001 and the related information content providing server 1002 are connected via the network 1005. The viewer apparatus 1001 includes an input part 1110, a display part 1120, a control part 1130, a processing part 1140, a sensor part 1150, a storing/managing part 1160, a communication part 1170. The related information content providing server 1002 includes an input part 1210, a display part 1220, a control part 1230, a processing part 1240, a storing/managing part 1250 and a communication part 1260.

Figure 3:
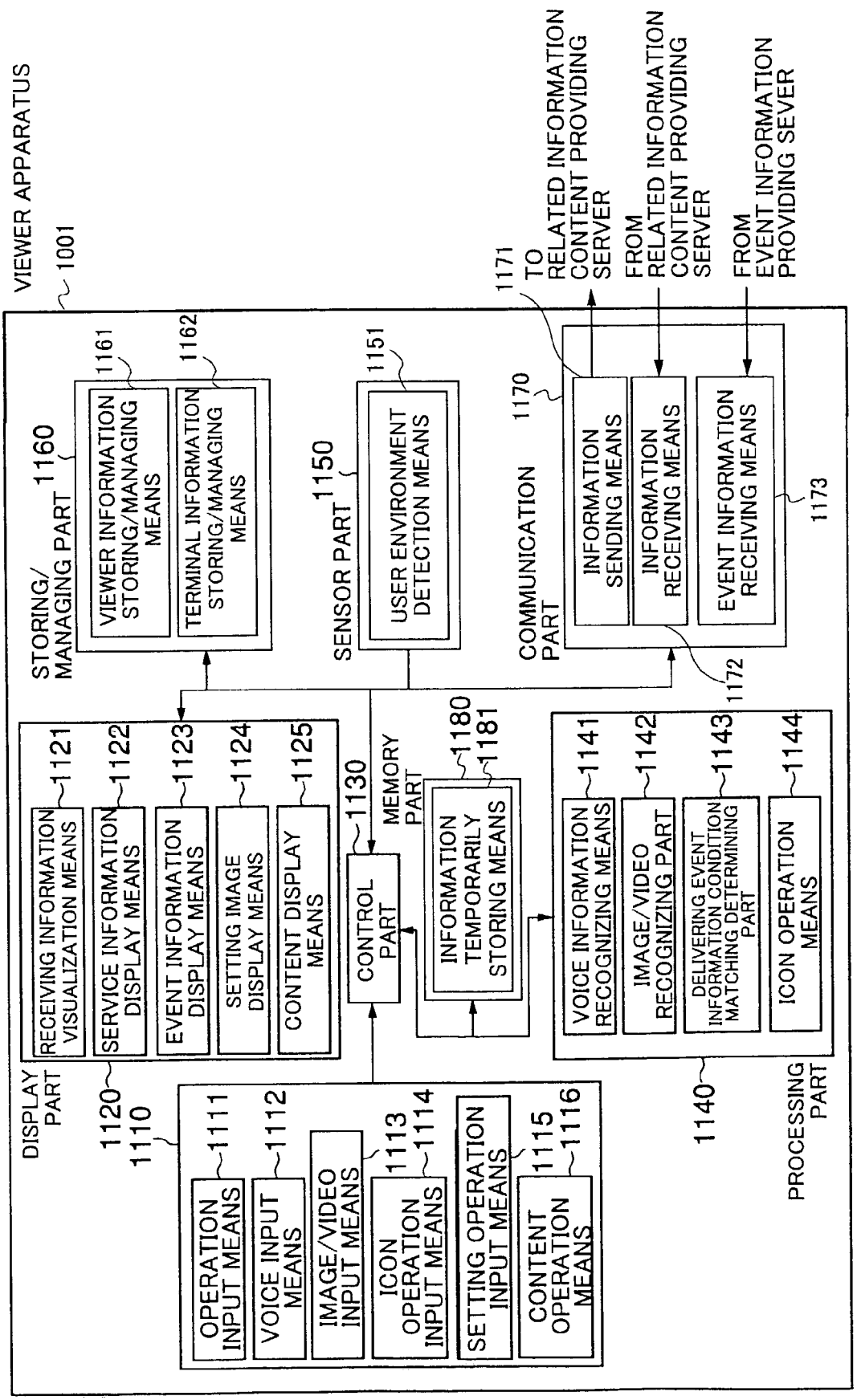
FIG. 3 is a figure showing a configuration example of the viewer apparatus.

FIG. 3 shows a configuration example of the viewer apparatus 1001. The input part in the viewer apparatus 1001 includes an operation input means 1111, a voice input means 1112, an image/video input means 1113, an icon operation input means 1114, a setting operation input means 1115, and a content operation means 1116. The display part 1120 includes a receiving information visualization means 1121, a service information display means 1122, an event information display means 1123, a setting image display means 1124, and a content display means 1125.

The processing part 1140 includes a voice information recognizing means 1141, an image/video recognizing part 1142, a delivering event information condition matching determining part 1143, an icon operation means 1144. The storing/managing means includes a viewer information storing/managing means 1161 and a terminal information storing/managing means 1162. The sensor part 1150 includes a user environment detection means 1151. The communication part 1170 includes an information sending means 1171, an information receiving means 1172, and an event information receiving means 1173. In addition, the viewer apparatus 1001 has a memory part 1180 that includes an information temporarily storing means 1181.

Figure 4:
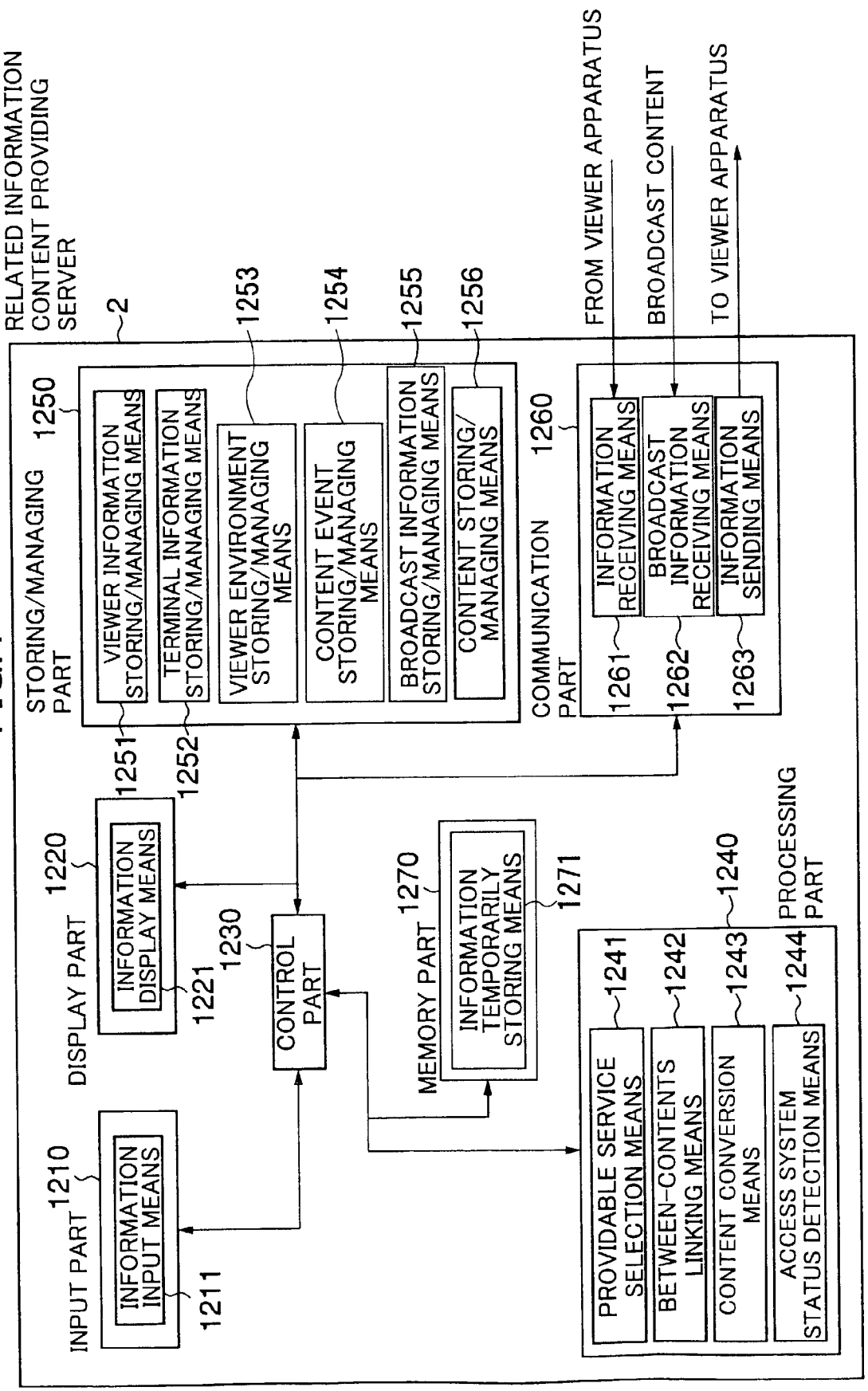
FIG. 4 is a figure showing a configuration example of a related information content providing server.

FIG. 4 shows a configuration example of the related information content providing server 1002. The input part 1210 in the related information content providing server 1002 includes an information input means 1211. The display part 1220 includes an information display means 1221. The processing part 1240 includes a providable service selection means 1241, a between-contents linking means 1242, a content conversion means and an access system status detection means 1244. A storing/managing part 1250 includes a terminal information storing/managing means 1251, a terminal information storing/managing means 1252, a viewer environment storing/managing means 1255, a content storing/managing means 1256. The communication part 1260 includes an information receiving means 1261, a broadcast information receiving means 1262, and an information sending means 1263. In addition, the related information contents providing server 1002 has a memory part 1270 that has an information temporarily storing means 1271.

Figure 5:
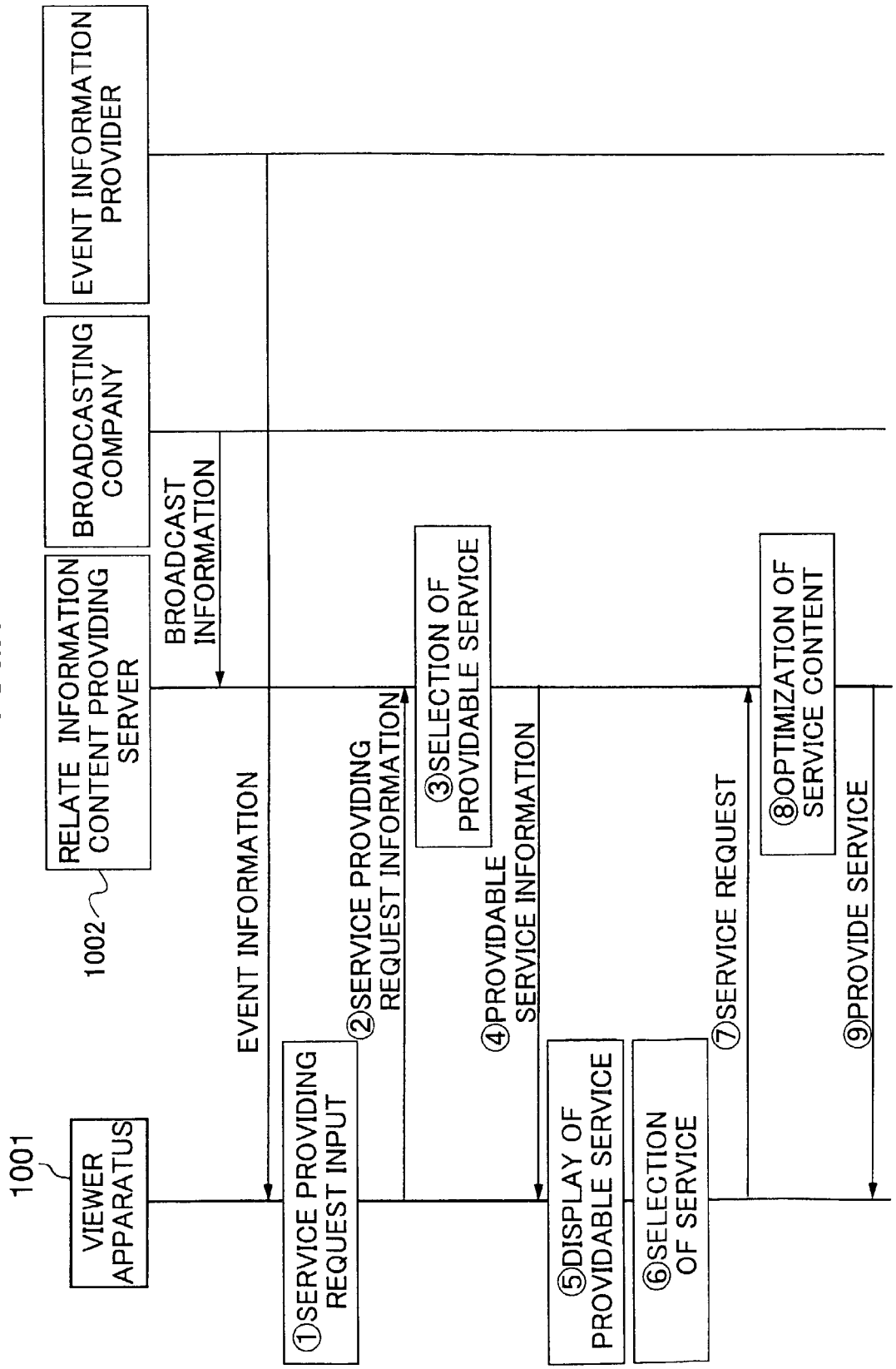
FIG. 5 is a figure showing a flow of information between the viewer apparatus and the related information content providing server.

FIG. 5 shows a flow of information between the viewer apparatus 1001 and the related information content providing server 1002. In the following, apparatuses shown in FIGS. 2-4 will be described in detail according to FIG. 5. The broadcast information such as program information is sent to the related information content providing server from a broadcasting company beforehand, and the event information is sent to the viewer apparatus 1001 from the event information provider beforehand or at the time of broadcasting.

(1) Input of Service Providing Request

First, in the viewer apparatus 1001, when the viewer wants to receive a service on related content related to broadcast content while the viewer watches the broadcast content distributed in one direction, the viewer inputs a request from the input part 1110. Means for inputting the request of the viewer is an operation input means 1111 such as a button and the like, a voice input means 1111 such as a microphone and the like, and an image/video input means 1113 for inputting gestures taken by a camera.

Information (On/Off information) input by the operation input means 1111 is stored in the memory part 1180 via the control part 1130. Voice information input by the voice input means 1112 is sent to the voice information recognition means 1141 via the control part 1130, and image/video information input by the image/video means 1112 is sent to the image/voice recognition means 1142 via the control part 1130. Accordingly, it is recognized that the viewer inputs a request, and the result (On/Off information) is stored in the memory part via the control part 1130.

(2) Service Providing Request Information

When request input information is stored in the memory part 1180, the control part 1130 requests viewer information (viewer profile) that is stored and managed by the viewer information storing/managing means 1161 of the storing/managing part 1160 from the storing/managing part 1160, and stores obtained viewer information in the memory part 1180. In the same way, the control part 1130 requests terminal information (manufacturer name, model, specification and the like) that is stored and managed by the viewer information storing/management means 1162 in the storing/managing part 1160 from the storing/managing part 1160, and stores the obtained terminal information in the memory part 1180.

The control part 1130 request viewer environment information from the sensor part 1150, and stores the viewer environment information in the memory part 1180, wherein the viewer environment information is detected by the user environment detection means 1151 in the sensor part 1150.

The above-mentioned viewer information is information on the viewer. The viewer information includes one or more following items of information, for example: name, sex, age, occupation, address, ZIP code, family structure, information on residence (condominium, stand-alone house and the like), hobby, genre of interest (politics, economy, news, computer, book, sport, travel and the like), annual income, information that indicates whether the user is a member of a service, member identification number, credit card ID, license (driver's license and the like), information on body form (weight, height, size of clothes and the like), information of ability (eyesight, hearing and the like).

Terminal information is information such as resolution of a display apparatus of the viewer apparatus, number of colors that can be displayed, performance of WWW information browsing means (Java function availability, video voice contents reproducing availability, coding format information for reproducing video voice contents) and the like.

The viewer environmental information represents environmental state and viewer state at the time when the viewer watches broadcast content distributed in one direction. The information on the environmental state is, where the content is viewed (location information obtained by GPS (global positioning system) and the like), when the content is viewed (time information obtained by a timer in the apparatus or GPS and the like), what is viewed (information such as channel or program obtained by monitoring infrared communication performed by a TV operation remote controller and the like).

The information of the viewer state is information such as posture of the viewer (sitting, standing and the like), and mental condition when viewing (pulsating, cool, fun, sad and the like). The viewing posture can be determined by height of the terminal from the floor. The mental condition can be determined from heart rate, perspiration, movement and the like. The height, heart rate, perspiration, movement can be detected by sensors. All of the items of the viewer information, terminal information, viewer environmental information are not necessarily required.

As for the viewer information, if necessary information is already sent to the related information content sever 1002, and is stored and managed in the terminal information storing/managing means 1251 in the storing/management part 1250, the viewer information may be information for the related information content providing server 1002 to determine particular information. The information may be ID and the like provided from the related information content providing server 1002, in which the viewer profile is registered in the related information content providing server 1002 beforehand.

That is, the information of the viewer apparatus used for requesting providable services may be registered in the related information content providing server 1002 beforehand, in which only an ID of the viewer apparatus is sent from the viewer apparatus. Or, all items of information may be sent every time when the request is sent.

The viewer information, terminal information and viewer environmental information stored in the memory part 1180 via the control part 1130 are sent to the related information content providing server 1002 by the information sending means 1171 in the communication part 1170 as the service providing request information. The control part 1130 sends information, indicating that it has sent the service providing request information, to the display part 1120 at the same time, and the display part 1120 displays the information by using visualization means, so that reaction for input operation (action) of the viewer is represented.

(3) Selection of Available Service

The related information content providing server 1002 receives the viewer information, terminal information and the viewer environmental information sent from the viewer apparatus 1001 by using the information receiving means 1261 in the communication part 1260, stores these items of information in the memory part 1270 via the control part 1230. At the same time, the related information content providing server 1002 stores and manages the viewer information by the viewer information storing/managing means 1251 in the storing/managing part 1250. In the same way, the related information content providing server 1002 stores and manages the terminal information by the terminal information storing/managing means 1252, and stores and manages the viewer environmental information by the viewer environmental information storing/managing means 1253.

The control part 1230 sends a request to the storing/managing part 1250, and stores event information managed by the content event information storing/managing means 1254 in the memory part 1270. In the same way, the control part 1230 stores the broadcast information managed by the broadcast information storing/managing means 1255 in the memory part 1270. Related content of the broadcast content (at least one kind of video, voice and data) is stored and managed by the content storing/managing means 1256.

The event information may be information (content ID and the like) for specifying individual related content, information on kinds of services on the related content, link information of the broadcast information, and content security information and the like. The broadcast information may be broadcast schedule information of content, and event information on broadcast content. As methods for obtaining the information, there are a method for directly receiving the information provided by the broadcasting company, and a method for extracting the information from broadcast information when the information is embedded in the broadcast information.

When the broadcast information is embedded in the broadcast content (video, voice or data), the broadcast information is received by the broadcast information receiving means 1262, sent to the storing/managing part 1250 via the control part 1230, and is managed by the broadcast information storing/managing part 1255 in real time. When the broadcast information is not embedded in the broadcast contents (at least one kind of video, voice, and data), broadcast content is linked with related content that is stored and managed by the storing/managing part 1250. For this purpose, the broadcast information receiving means 1262 receives the broadcast content, and sends the content to the processing part 1240 via the control part 1230.

In the processing part 1240, the between-content linking means 1242 performs linking between broadcast content and related content, calculates information corresponding to the broadcast information, and sends the information to the storing/managing part 1250 via the control part 1230, so that the information is managed by the broadcast information storing/managing means 1255.

By using an image/video recognition technology and a voice recognition technology, the between-content linking means 1242 uses a method for performing linking in stages from linking by using distances of physical amount to linking by using distances of meaning. The viewer information, terminal information, viewer environment information, contents event information and broadcast information stored in the memory part 1270 are transferred to the processing part 1240. On the basis of the transferred information, the providable service selection means 1241 in the processing part 1240 selects providable services suitable for the viewer.

Figure 6:
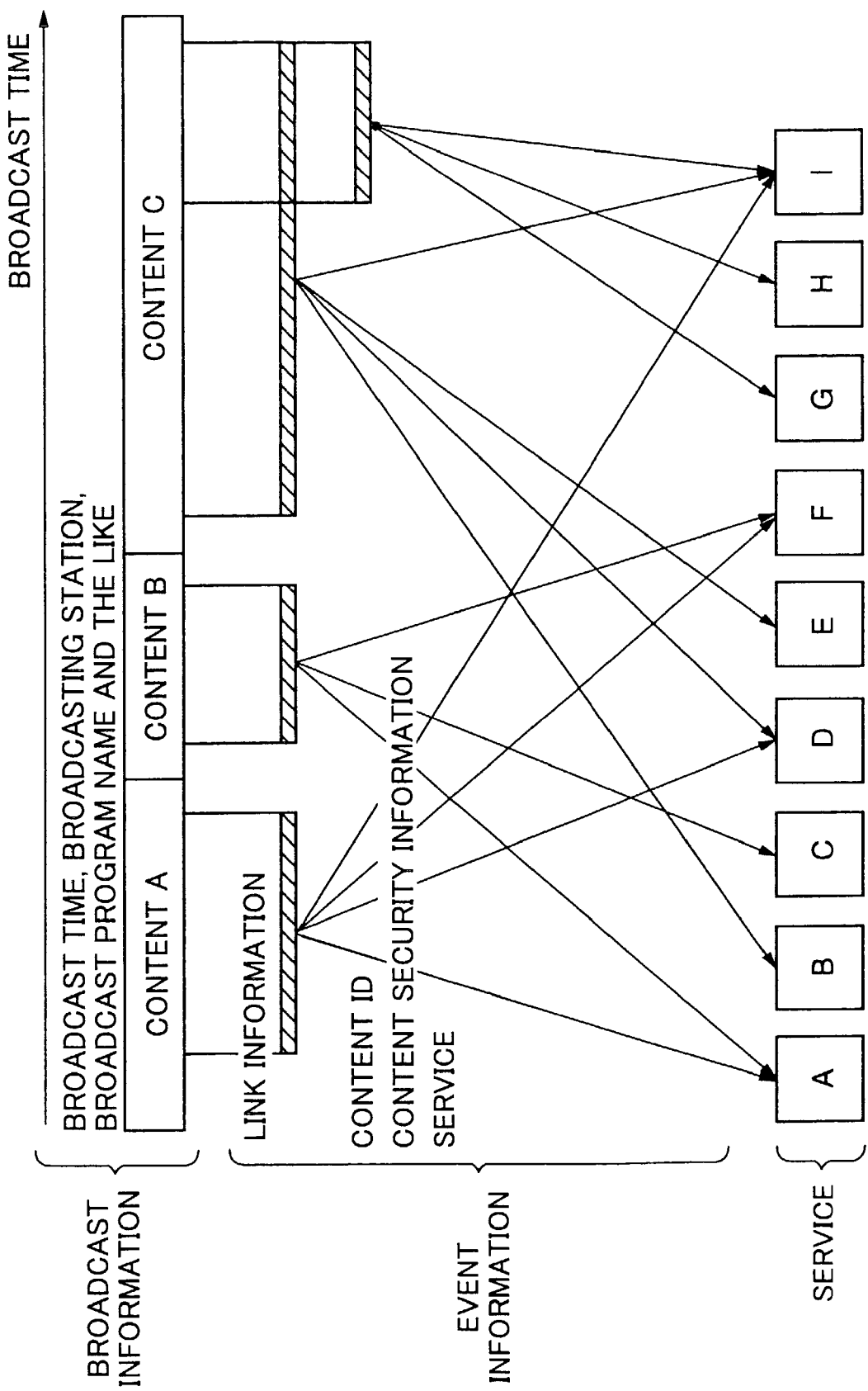
FIG. 6 is a conceptual diagram showing relationships among event information, broadcast information and the service.

FIG. 6 is a conceptual diagram showing relationships among event information, broadcast information and the service. For example, as for content A, service selection among services A, D, F and I is performed according to the viewer information, terminal information and the viewer environment information. As for content B, service selection is performed among services A, C and F. The providable services may be different according to time even if the content is the same.

Figure 7:
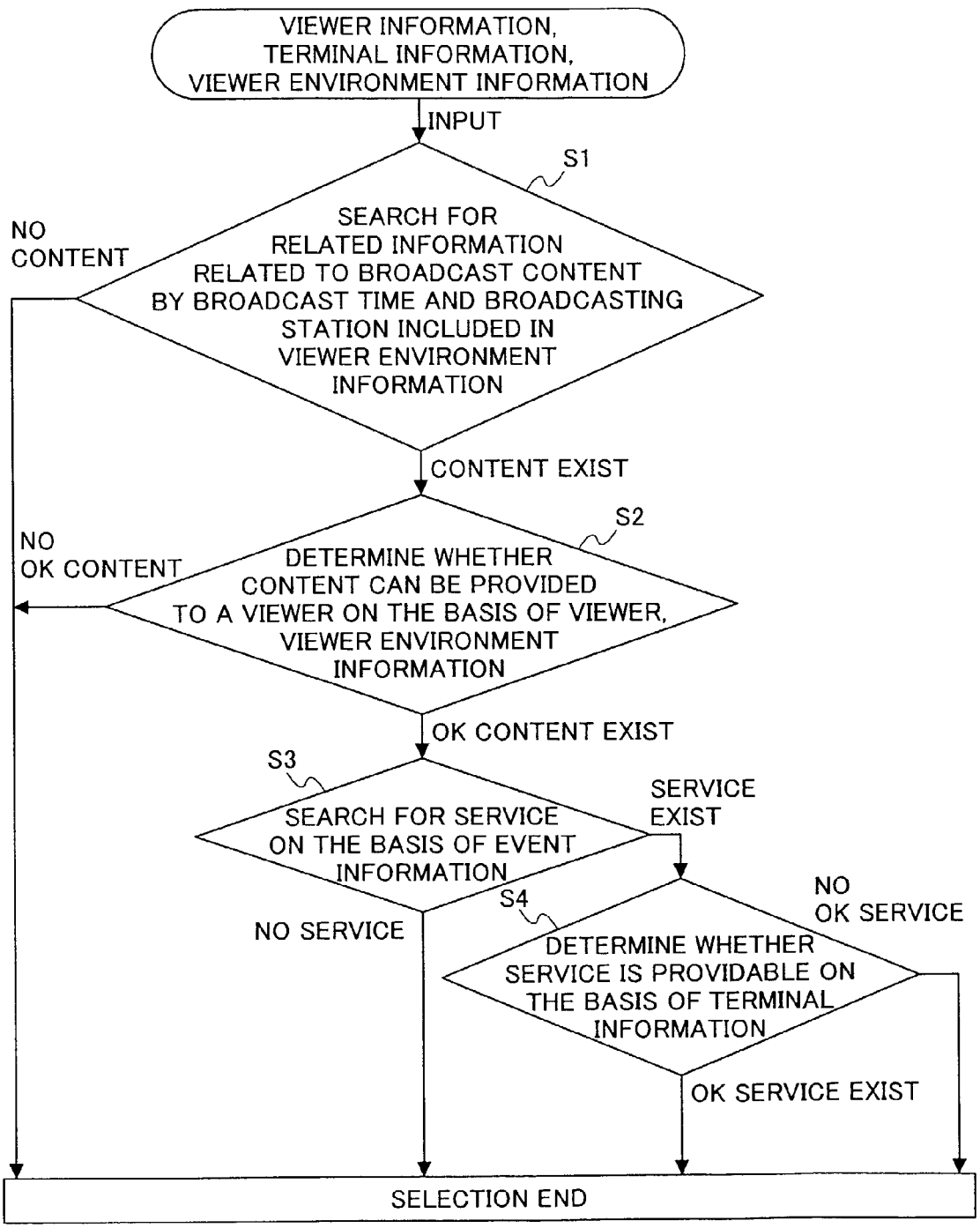
FIG. 7 shows a procedure for selecting the service and related contents.

A procedure in which the service and the related content are selected according to the received viewer information, terminal information and viewer environment information will be described. FIG. 7 shows the procedure. When the viewer information, terminal information and viewer environment information are received, related content that is related to the broadcast content (at least one kind of video, voice and data) is searched for by using broadcast time and broadcast station information included in the viewer environment information on the basis of broadcast information in step S1. When the related content is not searched for, information indicating that either of related content and the service is not searched is returned, and the selection process ends.

When the related content is searched, the process moves to step S2, it is determined whether the related content can be provided to the viewer on the basis of the viewer information and the viewer environment information. For example, when the viewer is under age or when providing area is restricted, it is determined whether age limit is defined for the searched related content, so that it is determined that the related content can be provided. When the viewer is in the kitchen, it is determined whether there is any limit according to the location of the viewer or any recommendation for the searched related content. When it is determined that there is no providable content, information indicating that there is no providable related content and no service is returned, and the process ends.

When there is providable content, the process goes to step S3, and a service linked with the related content is searched for on the basis of content even information. When the service is not searched for, information indicting that there is neither related content nor a service is returned, and selection process ends.

When the service is searched, the process goes to step S4, it is determined whether the service is providable according to the terminal information, because there may be a service that can not be provided according to the specification of the terminal. When the service is determined to be providable, information on the related content and the service is returned, and the selection process ends.

(4) Providable Service Information

Information on the searched related content and the service is stored in the memory part 1270 via the control part 1230. The information on the related content and the service may be names of the related content and the service, the location of the related content, the location of a tool necessary for the service, expiration data, icons indicating the related contents and the service. The information stored in the memory part 1270 is sent to the viewer apparatus 1001 by the information sending means 1263 in the communication part 1260 as the providable service information.

(5) Display of Providable Service

Figure 8:
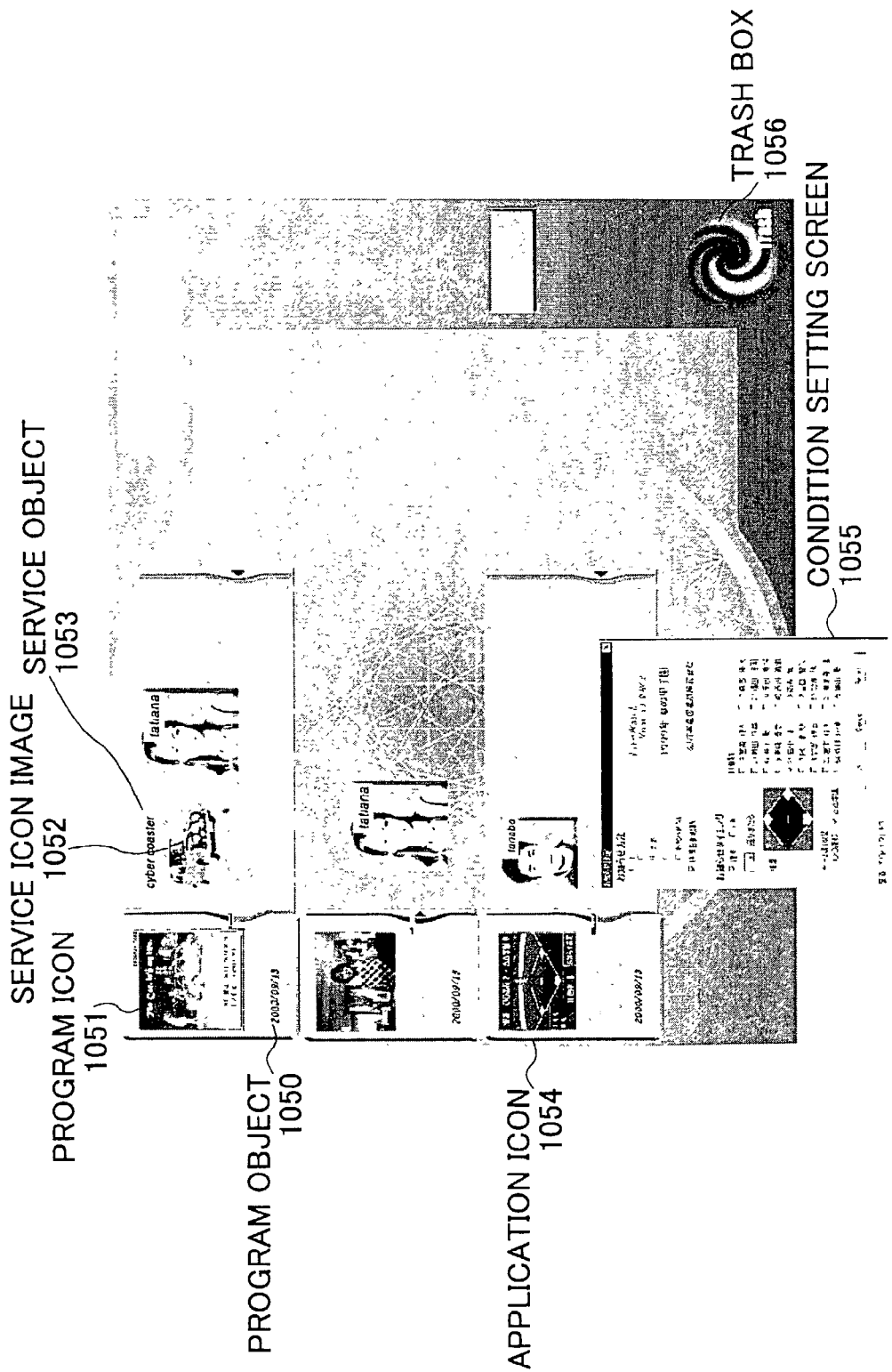
FIG. 8 is a figure showing an example of a display screen of service information.

In the viewer apparatus 1001, the information sent from the related information content providing server 1002 is stored in the memory part 1180 via the control part 1130, and is sent to the display part 1120. The information that is sent is visualized by the service information display means 1122. FIG. 8 shows an example of the information that is displayed. In FIG. 8, 1050 indicates a program object, 1051 indicates a program image icon image, 1052 indicates a service icon image, 1053 indicates a service object, 1054 indicates an application icon, 1055 indicates a condition setting screen for setting notification and the like, and 1056 indicates an icon of trash box. The application icon 1054 and the condition setting screen 1055 will be described later.

As for the icon information, there are a plurality of pieces of icon information on broadcast information such as the program object 1050, and icon information on a service such as the service object 1053. Each items of information is displayed as an image icon having a predetermined size (as the program icon image 1051, the service icon image 1052). The program icon has a structure such that it has a service icon as a child. A function of the service icon is to launch a service tool by using information other than the icon information as a clue. As the service, for example, there are a service for buying content, a service for viewing content, a service for processing content and the like. The service tool is an application program for executing the services.

The service tool is launched by selecting the service icon, so that the viewer can receive a desired service. The related content and information of the service are displayed as the image of the service icon. At a glance of the icon, the viewer can understand that what content can be received by using what service. Since the icon is managed in the memory part 1180 as a unit of an object, the icon can be moved to a desired position on the screen by using the icon operation means 1144 in the processing part 1110 after sending information input by the icon operation input means 1114 of the input part 1110 to the control part 1130. In addition, the icon can be deleted (moved to the trash box 1056).

To change the position of the icon is to change an icon display position parameter that is sent to the display part 1120, and to delete icon is to delete target object data in the memory part 1180. It is also possible not to display the service icon as necessary. In addition, the icon can be searched by providing a key by using items of information of the icon objects as indexes. For example, the icon can be searched for by using a program name, and by using a service name.

In the above-description, an example of a case is described in which, when the viewer wants to receive a service on related content related to the broadcast content while watching the broadcast content delivered in one direction, the request is positively input to the apparatus by the user.

However, the request can be automatically issued at a timing that is set beforehand by the viewer even though the viewer does not positively input the request. Next, an example in this case will be described. That is, a procedure for realizing a function will be described in which, a service on the related content are set beforehand in the apparatus, and the service can be reserved and the apparatus notifies the viewer of the service at a timing when the service can be received.

First, in the viewer apparatus 1001, an application is launched, in which the application has a function of displaying event information of broadcast content and a function of reserving a service and notifying the user at a timing when the service can be received. The application may be launched when the viewer wants to reserve a service beforehand, or may be automatically launched according to a channel of the broadcast. The application is sent to the viewer apparatus 1001 from the related information content providing server 1002, and the viewer apparatus 1001 receives it and launches it.

When the application operates in the viewer apparatus 1001, the application icon 1054 shown in FIG. 8 is displayed on the screen, so that the viewer is notified that the application is operating. The application icon 1054 has a function of visualizing the event information of the received broadcast content so as to display it in the icon, and a function of calling the condition setting screen 1055 that may be a reservation screen or a notification setting screen and the like.

FIG. 9 shows an example of the notification setting screen that is an example of the condition setting screen 1055. By clicking a button of "notification setting" in the application icon 1054, the condition setting screen 1055 shown in FIG. 9 can be displayed. As for this screen, when the event information agrees with a condition that is set, the viewer is notified that the event information agrees with the condition.

As a method for notifying the viewer at the timing of notification, blinking of the screen or a sound can be selected. In addition, the apparatus can be set such that an image is automatically displayed when launching. The example shown in FIG. 9 is a screen for setting notification on baseball broadcasting. For example, it can be set on this screen that the viewer is notified when scoring, when the game is in the third inning, or when a batter is at bat.

In the same way as the notification setting screen, the reservation setting screen can be used such that a timing for issuing a request is set, and a service providing request is automatically sent at the setting timing. For example, the timing is when it becomes a reserved time, or when a specific personality appears on the screen.

The application displays event information of the broadcast content delivered from the event information provider as the application icon 1054 on the display part 1120, and automatically inputs the request of the viewer in the apparatus at a timing that is set by the condition setting screen such as the reservation setting screen and the notification setting screen and the like. In the case of reservation, the service providing request is issued without verification by the viewer at the timing that is set. In the case of notification, the viewer is notified of the timing by blinking the icon or a sound, and the service providing request is issued after verification by the viewer according to instruction beforehand.

Next, a series of procedures of the reservation and notification setting will be described in detail.

It is assumed that event information of broadcast content is delivered from an event information provider. The event information receiving means 1173 in the communication part 1170 receives this event information. Pieces of the event information are stored in the memory part 1180 via the control part 1130 sequentially in an order of receiving. At the same time, the information is sent to the processing part 1140 and to the display part 1120 so that the event information display means 1123 displays the event information as an icon (the application icon 1054). As mentioned before, the icon has a function by which a viewer can set a condition for a desired service.

For displaying the setting screen, a display request is input by using the setting operation input means 1115 in the input part 1110, input information is sent to the control part 1130. Then, the setting image display means 1124 in the display part 1120 displays the setting screen on the basis of the input information. For inputting information for setting the condition, a setting information is input by using the setting operation input means 1115 in the input part 1110, and the setting information is stored in the memory part 1180 via the control part 1130.

After that, the condition that is stored in the memory part 1180 is sent to the processing part 1140, and the delivering event information condition matching determining part 1143 compares the condition with the delivered event information. The delivering event information condition matching determining part 1143 calculates semantical distance between the condition and the event information as similarity. The delivering event information condition matching determining part 1143 determines that the condition is met when the distance is smaller than a predetermined threshold. When the condition is met, it is notified to the control part 1130. Information indicating that the condition is met is stored in the memory part 1180 via the control part 1130. Process flow hereinafter is the same as process flow performed after request input information is stored in the memory part 1180 in the case a request is positively input when the user watches broadcast contents delivered in one direction and the user wants to receive a service on related contents related to the broadcast contents.

In the following, as for channeling when receiving broadcast content and as for each operation when sending the channel request, transition of information displayed on the display part 1120 will be described.

When a user watches broadcast content and issues a service request, the icon shown in FIG. 8 is displayed. When the user watches different broadcast content and issues a service request after the user changes the channel, the service icon for the previous broadcast content is not displayed, and only the program icon is displayed. Next, information newly sent from the related information content providing server 1002 is received, and a new program icon and a service icon are displayed. Then, when the channel is changed to the previous broadcast content and a service request is issued, the service icon that was not displayed is displayed, and a service icon that is newly requested is displayed additionally.

(6) Selection of Service (7) Service Request

Next, a procedure for selecting the service icon displayed on the display part 1120 and receiving the service will be described. Selection of service icon is performed by the icon operation input means 1114 of the input part 1110 in the viewer apparatus. On the basis of the selection input information, the information sending part 1171 in the communication part 1170 sends providable service information corresponding to the selected icon stored in the memory part 1180 to the related information content providing server 1002 via the control part 1130, wherein the providable service information includes location of related content, location of a tool necessary for services, expiration date and the like.

(8) Optimization of Service Contents

In the related information content providing server 1002, the information receiving means 1261 in the communication part 1260 receives information on services and content sent from the viewer apparatus 1001, and the information is stored in the memory part 1270 via the control part 1230. The information receiving means 1261 determines which viewer apparatus sends the information, and sends the information to the control part 1230 with the viewer apparatus information that is determined.

When the information on the service and the content are stored in the memory part 1270 via the control part 1230, the control part 1230 detects access system status by the access system status detection means 1244 in the processing part 1240. The access system status that is detected is status of the network, for example, a communication speed. The communication speed dynamically changes according to traffic of the network (amount of data that flows). The access system status detection means 1244 sends a predetermined amount of information packets to the viewer apparatus 1001 on the basis of the viewer apparatus information, and estimates the status of the access system by using time from sending to returning from the viewer apparatus 1001. When the communication part 1170 of the viewer apparatus 1001 receives the information packet, the information receiving means 1172 directly transfers the information packets to the information sending means 1171, and the information sending means 1171 sends the information packets to the related information content providing server 1002. The estimated status information of the access system is stored in the memory part 1270 via the control part 1230.

On the basis of the information of the service and the contents stored in he memory part 1270 via the control part 1230, the related content and the service tool that are stored and managed in content storing/managing means 1256 are searched, and are stored in the memory part 1270. At the same time, the terminal information managed by the storing/managing part 1250 is searched for on the basis of the viewer apparatus information, and is stored in the memory part 1270 via the control part 1230. The related content, status information of the access system and the terminal information stored in the memory part 1270 are transferred to the processing part 1240.

The content converting means 1243 converts the related content into optimal content on the basis of the status information of the access system and the terminal information (terminal specification). This conversion is performed in the following case.

1) The related content is converted into optimal content when the related content do not conform to the terminal specification and the status of the access system, in which the related content is produced for a high-spec terminal and for status of rich access system.

2) In addition, the related content is converted to optimal content when one kind of content is used for a plurality of services.

In the case of 1), the content converting means 1243 decreases data amount. For decreasing the data amount, the data amount is physically decreased by using the data compression technology, in addition, the data amount is decreased by summarizing in which meaning is considered. For text information, summary of semantic level is performed by using morphemic analysis, dictionary and corpus. For images and videos such as MPEG 1 and MPEG 2 and the like, compression ratio may be changed. As for MPEG 4 video that is object-coded, selective coding may be performed for each object. As for a video described by MPEG 7, it is semantically summarized by processing text description. As for contents in which hyper links are provided, link information is selectively decreased according to weight assigned to information under a link according to the viewer profile.

In the case of 2), the contents converting means 1243, the contents are translated to a language that the user wants. Various conversions between representation media are performed, for example, conversion from image to text, conversion from voice to text, conversion from image to voice, conversion from video to voice.

(9) Providing Service

The content optimally converted by the content converting means 1243 is stored in the memory part 1270, and is sent to the viewer apparatus 1001 with the service tool that is already stored by the information sending means 1263 in the communication part 1260. The viewer apparatus 1001 stores the service tool and the related content sent from the related information content providing server 1002 in the memory part 1180. The service tool provides a service on the related content on the viewer apparatus 1001 by using the content operation input means 1116 in the input part 1110 and the content display means 1125 in the display part 1120. A service for purchasing related content can be performed by sending transaction of the viewer on purchasing to a transaction processing center (not shown in the figures) by using the information sending means 1171 in the communication part 1170.

(Effects)

As mentioned above, according to the present embodiments, various services can be realized for providing related content that the individual viewer desires, in which the related content is linked with broadcast content that is provided in one direction based on the premise that various communication access systems and various terminals exist. In addition, such various services can be provided fairly. Further, an environment in which the viewer can receive desired services without leaving out any service can be provided, and an environment can be provided in which the problem on inconvenience for receiving the services of obtaining the related content while viewing or after viewing the broadcast content is solved.

Therefore, for the viewer, there are merits that the viewer can receive various services linked with broadcast content by receiving content optimal for the viewer's terminal, the viewer can receive the services without leaving out any service, and there is no inconvenience for receiving the services for obtaining the related content. As for the content provider, there is a merit that various services can be realized for providing related content desired by individual viewer, in which the related content is related with broadcast content delivered in one direction.

Second Embodiment

Next, the second embodiment will be described by using examples 2-1-2-4.In the second embodiment, when a viewer performs pointing operation on a subject that the viewer is interested in in video information, related information that is related to the subject is obtained for the viewer on the basis of information related to the subject. In addition, information related to the subject that the viewer is interested in is stored, and received broadcast information is selected on the basis of the stored information and the selected broadcast information is stored.

Example 2-1

FIG. 10 shows a system configuration of the viewer apparatus according to the example 2-1 of the second embodiment of the present invention. In FIG. 10, 2010 indicates broadcast information including video information 2011 and related information 2012 that is attached to the video information 2011. The video information includes at least video. In addition, a video program, which is a normally used word, that includes voice in addition to video corresponds to the video information 2011.

In digital broadcasting, additional information can be broadcasted in a video broadcasting channel as program arrangement information. Or, information related to video in other broadcasting channel can be broadcasted by using a data channel used for broadcasting data such as text or still image or the like. As the additional information, for example, a title or a genre of a program in the video, day and time of broadcasting and the like can be considered.

In the present invention, additional information includes at least information on the subject that is a display unit appears in the video information 2011. The additional information on the subject (to be referred to as related information hereinafter) includes at least subject attribute information for describing the subject, the subject coordinates, and URI (Uniform Resource Identification) information as address identification information of the related information in which the URL information is defined at least by RFC2396.In this case, URI includes an IP address an URL of the information providing apparatus connected to the communication network 2003.

The subject coordinates are coordinates indicating an existing area of the subject on the display screen. The subject appears or leaves over time, and moves in the screen while it appears Thus, it is necessary to define the subject coordinates for each frame of the video information 2011 or for each time.

Figures 11, 12:
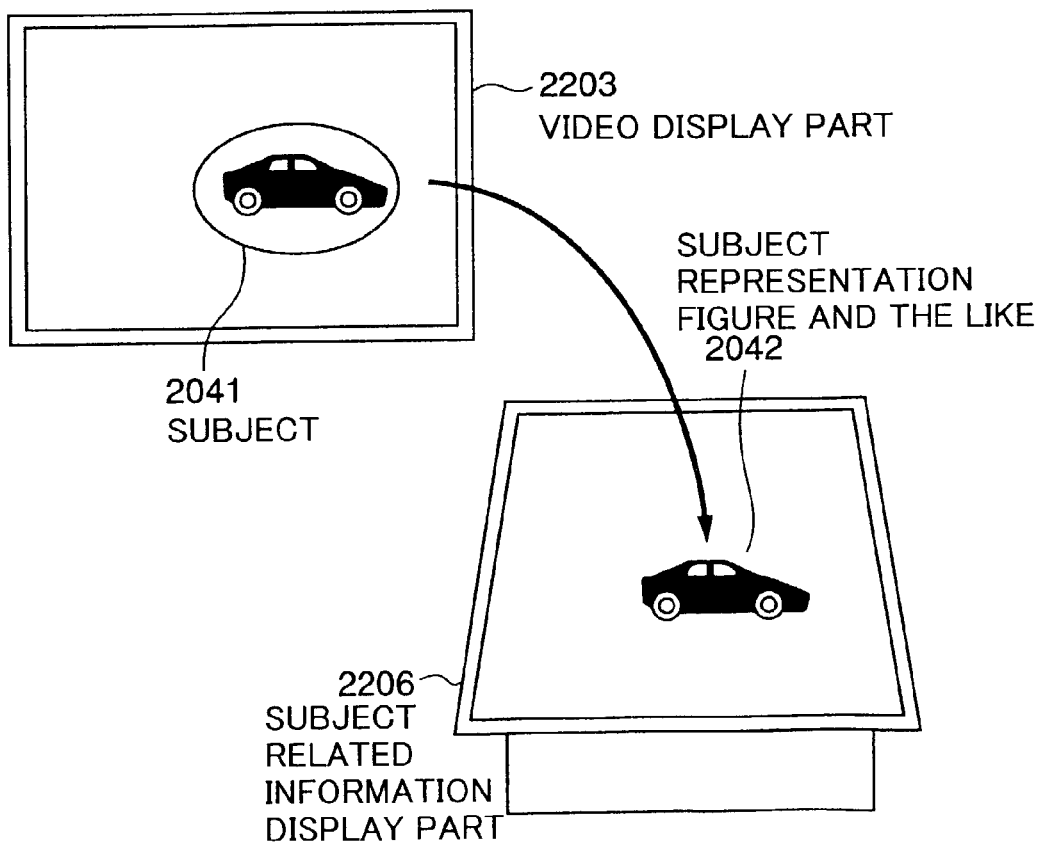
FIG. 11 is a figure showing an example of related information according to the second embodiment of the present invention.
FIG. 12 is a figure for explaining relationship between a subject in a video display part and a subject representation figure and the like in a subject related information display part.

In addition, the related information 2012 is defined for each of subjects which are more than one. FIG. 11 shows an example of the related information of the present invention. The related information 2012 includes a frame number 2121, subject coordinates 2122, a subject attribute information 2123 and a URI information 2124. As shown in FIG. 11, in the related information 2012 shown, when the frame number 2121 is N, the subjects having OB-A, OB-B and the like as the subject attribute information 2123 are displayed in subject coordinates (XA,YA), (XB,YB) respectively. In addition, for the subjects, URI information, 2124 URI-A and URI-B are defined respectively. These pieces of information are added for frames other than the frame number N. The subject may be different for each frame, and different URI may be assigned for the same subject. In addition, a plurality of URIs may be defined for one subject.

The configuration of the broadcast information including the above-mentioned related information and video information will be described in the following.

As a first configuration, the related information shown in FIG. 11 is inserted as header information at the head of each video frame in the video information. For example, in the case of MPEG 2 video stream, the related information may be inserted in the header of the picture layer, that is, a user data area of the picture header.

As a second configuration, the video information and the related information are separately formed, and, as shown in FIG. 11, the related information includes a frame number for identifying corresponding video frame.

In the case of the second configuration, the video information is sent by using broadcast channels for video, and the related information can be sent by using data channels. Or, in systems such as BS digital broadcasting or CS digital broadcasting or the like, the related information may be transmitted by using data structure of section format defined in MPEG 2 System(ITU-T H.222.0,ISO/IEC 13818-1) as a part of program arrangement information defined in ARIB STD-B10 "program arrangement information for digital broadcasting".

In the case of second configuration, the broadcast information is configured such that the related information is input in the viewer apparatus at the same time when or before the video frames are input.

In FIG. 10, 2002 indicates the viewer apparatus of the present embodiment of the present invention, and includes the following elements.

A broadcast receiving part 220 receives the broadcast information 2010 including the before-mentioned video information 2011 and the related, information 2012, and sends the broadcast information 2010 to a video display control part 2202.

The video display control part 2202 sends a display control signal for displaying the video information 2011 received from the broadcast receiving part 2201 to the video display part 2203. In addition, the video display control part 2202 receives coordinates of a point that is pointed by the viewer on the video display part, compares the coordinates with subject coordinates 212 in the related information 2012. The video display control part 2202 sends URI information 2124 and subject attribute information 2123 to a related information display control part 2205, in which the URI information 2124 and subject attribute information 2123 correspond to a subject having subject coordinates 2122 same as the pointed coordinates.

The video display part 2203 displays video on the display screen in the basis of the display control signal received from the video display control part 2202. In the case shown in FIG. 10, a car appears as the subject. Coordinates that are pointed by a first pointing device 2204 are detected, and the coordinates are sent to the video display control part 2202.

The first pointing device 2204 is connected to the video display control part 2202, for example, and is used for moving a cursor displayed on the screen of the video display part 2203, and for performing pointing operation at a desired cursor position. A general device such as so-called a mouse can be used as the first pointing device 2204.

The related information display control part 2205 sends a control signal to the subject related information display part 2206, in which the control signal is used for display, on the subject related information display part 2206, characters, a symbol, or a figure(to be referred to as subject representation figure and the like hereinafter) that represents the subject attribute information 2123 received from the video display control part 2202. In addition, the related information display control part 2205 sends the subject attribute information 2123 to a subject attribute information storing part 2209. In addition, the related information display control part 2205 receives the subject representation figure and the like that is pointed by the second pointing device 2207 in the subject related information display part 2206, sends URI information 2124 corresponding to the subject represented by the figure to a related information access part 2210. Then, the related information access part accesses an after-mentioned related information storing part 2211 or the communication network 2003, and displayes the obtained related information on the subject related information display part 2206.

The related information access part 2210 accesses the related information storing part 2211 if the URI information 2124 received from the related information display part 2205 corresponds to the related information storing part 2211. If the URI information 2124 corresponds to an information resource connected to the communication network 2003 such as the Internet, the related information access part 2210 accesses the information source via the communication network 2003. The related information access part 2210 obtains the related information and returns it to the related information display control part 2205

The subject related information display part 2206 receives a control signal for displaying the subject representation figure and the like, or the related information of the subject from the related information display control part 2205, and displays the subject representation figure and the like, or the related information of the subject. In addition, the subject related information display part 2206 is provided with the second pointing device 2207 as mentioned before. The operation of the second pointing device 2207 is the same as that of the first pointing device 2204, that is, the second pointing device 2207 is connected to the related information display control part 2205 for example, and is used for moving a cursor in the screen of the video display part 2203 and for performing pointing operation at a desired cursor position. A general device such as so-called touch panel or mouse can be used.

An input device 2208 is an input device such as a keyboard and the like used for operating this system. The subject attribute information storing part 2209 receives the subject attribute information 2123 sent from the related information display control part 2205 and stores it.

The related information storing part 2211 stores information related to the subject, in which the related information access part 2211 can access the information and obtain it. The stored information can be added, updated or deleted as necessary by using an apparatus that is not shown in the figure.

In the following, the operation of the system of the example 2-1 having the above-mentioned configuration will be described in the following. The broadcast information 2010 that includes the video information 2011 and the related information 2012 shown in FIG. 11 is broadcast from a broadcasting station, and is received by a broadcast receiving part 2201. After the broadcast information is demodulated, it is sent to the video display control part 2202. In the video display control part 2202, a control signal is generated for displaying the video information 2011 in the video information 2011 and the related information 2012 received from the broadcast receiving part 2201. The control signal is sent to the image display part 2203. The related information 2012 is stored in the video display control part 2202 temporarily.

When the subject is pointed in the video display part 2203, the video display control part 2202 receives the pointed coordinates from the video display part 2203, compares the received coordinates with the subject coordinates 2122 shown in FIG. 11, and detects a subject in which subject coordinates 2122 that are the same as the pointed coordinates are included. Then, the subject attribute information 2123 and the URI information 2124 corresponding to the detected subject are sent to the related information display control part 2205.

In the related information display control part 2205, processes are performed on the basis of the subject attribute information 2123 and the URI information 2124 received from the video display control part 2202. First, the subject attribute information 2123 is sent to the subject attribute information storing par 2209 and stored. The related information display control part 2205 generates a control signal for displaying the subject representation figure and the like that represents the received subject attribute information 2123, and the control signal is sent to the subject related information control part 2206.

FIG. 12 shows an example in which a subject 2041 is pointed by a first pointing device 2204 in the video display part 2203, and a subject representation figure and the like 2042 corresponding to the subject 2041 is displayed on the subject related information display part 2206.

It is desirable that different display devices are used for the video display part 2203 and the subject related information display part 2206. For example, the video display part 2203 is a CRT display apparatus, and the subject related information display part 2206 is a liquid crystal display. In this case, it can be considered to use a mouse as the first pointing device 2204, and to use a touch panel as the second pointing device 2207. However, the video display part 2203 and the subject related information display part 2206 are formed by sharing a display apparatus. In this case, different windows are provided on the screen or the screen is divided into a plurality display areas, and the video display part 2203 and the subject related information display part 2206 are provided in the windows or in the display areas. In this case, the first pointing device 2204 and the second pointing device 2207 can be realized by the same hardware, that is, a mouse can be shared.

Figure 13:
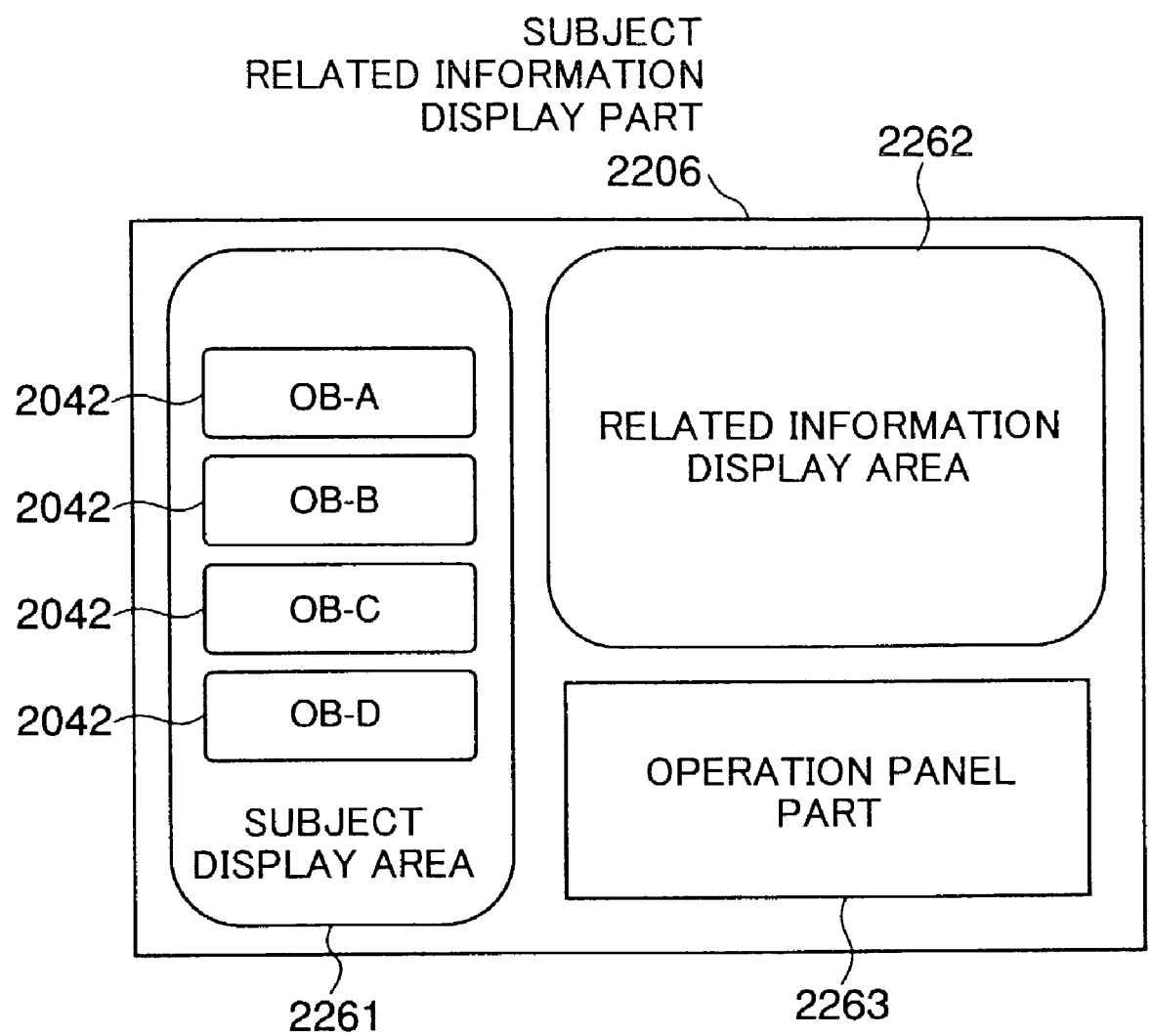
FIG. 13 is a figure showing a display example on a subject related information display part.

FIG. 13 shows an example of the subject related information display part 2206 in detail. In this example, the subject related information display part 2206 includes a subject display area 2261 for displaying a display representation figure and the like 2042, a related information display area 2262 for displaying the subject related information, and an operation panel part 2263. The operation panel part 2263 can be used as a substitute for the input device 2208 when a touch panel is used for example.

On the subject display area 2261, a plurality of subject representation figures and the like 2042 are displayed. In this example, each of character strings such as OB-A, OB-B, OB-C and OB-D and the like is the subject representation figure and the like. As the scene of the video progresses, when the subject 2041 is pointed one after another, the subject attribute information 2123 and the URI information 2124 corresponding to the subject 2041 are sent to the related information display control part 2205 one after another. The subject representation figures represent the result.

Next, when the viewer points the subject representation figure and the like 2042 displayed on the subject related information display part 2206 by using the second pointing device 2207, information for identifying the pointed subject representation figure and the like 2042 is sent from the subject related information display part 2206 to the related information display control part 2205. In response to this, the URI information 2124 corresponding to the subject 2041 indicated by the information for identifying the pointed subject representation figure and the like 2042 is extracted in the related information display control part 2205. The extracted URI information 2124 is sent to the related information access part 2210. When the URI information 2124 corresponds to the related information storing part 2211, the related information access part 2210 accesses the related information storing part 2211 and obtains the related information, and returns the related information to the related information display control part 2205.

When the URI information 2124 is in an information source connected to the communication network 2003, the related information access part 2210 obtains the related information from the information source via the communication network 2003, and returns it to the related information display control part 2205.

After receiving the returned information, the related information display control part 2205 displays the information on the related information display area 2262 of the subject related information display part 2206.

In the above-mentioned operation, the timing when the viewer points the subject representation figure and the like 2042 may be either of while receiving broadcasting or after receiving broadcasting. Therefore, if many pieces of information are to be referred to, the related information can be referred to at a convenient time after the broadcast is received.

Example 2-2

Figure 14:
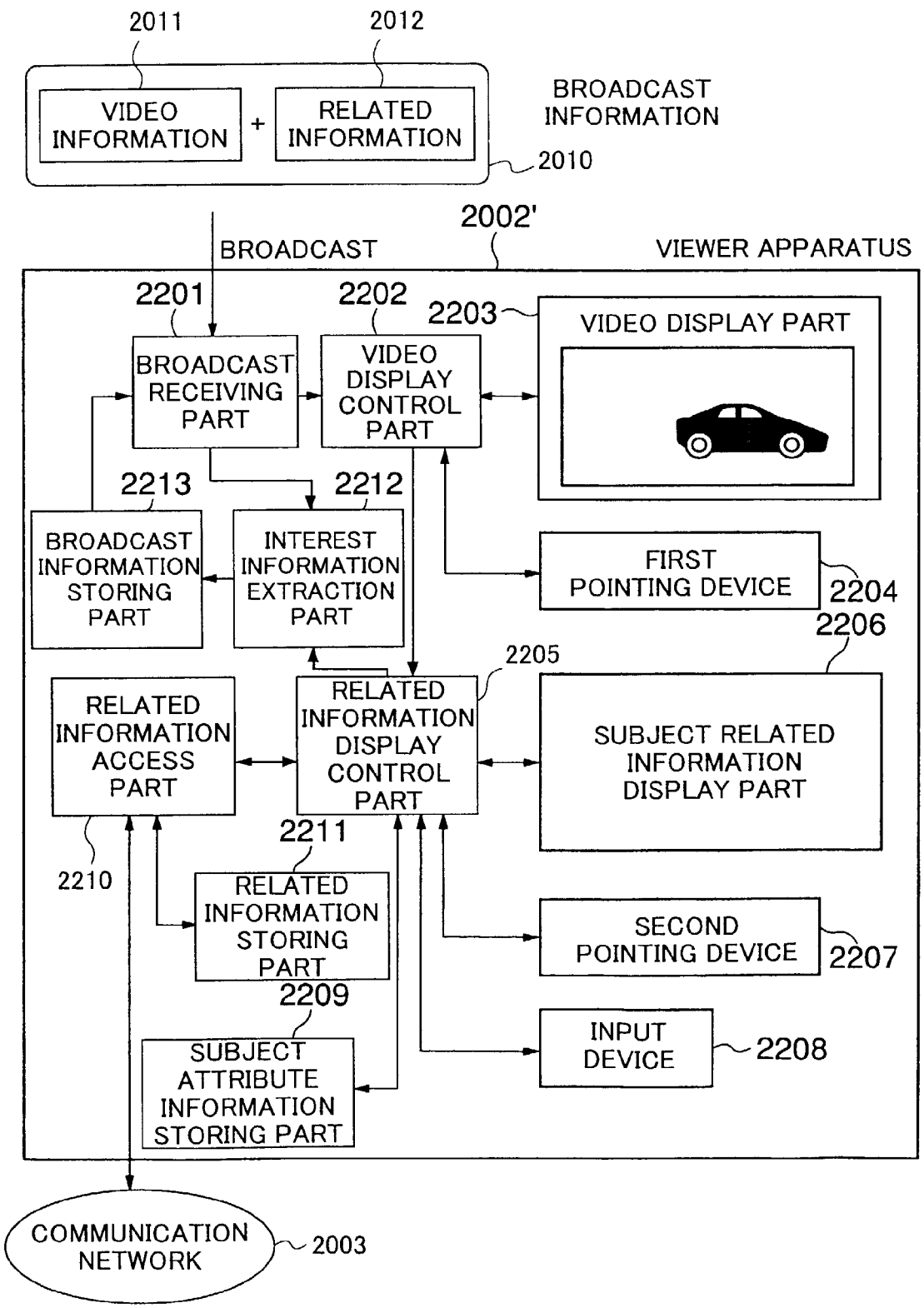
FIG. 14 is a block diagram of a system of the second embodiment of the present invention (example 2-2)

In the following, a viewer apparatus having a filtering/storing function for a video will be described as the example 2-2. FIG. 14 shows a system configuration of the example 2-2. The example 2-2 is a system in which an interest information extraction part 2212 is added to the system of the example 2-1. The system of the example 2-2 has a function for automatically selecting the broadcast information 2010 by using the interest information extraction part 2212 and storing the selected information. This system will be described in detail in the following.

In FIG. 14, the related information display control part 2205 has functions described in the example 2-1. In addition, as to a subject in which the subject representation figure and the like 2042 is pointed on the subject related information display part 2206, the related information display control part 2205 has a function for sending, to the interest information extraction part 2212, at least two pieces of information in URI information 2124 for the subject, subject attribute information 2123, related information received from the information source, and display time information indicating time when the related information is displayed on the subject related information display part 2206.

In addition, the interest information extraction part 2212 refers to a plurality of pieces of information or all pieces of information in the URI information 2124, the subject attribute information 2123, the related information and the display time information. Then, the interest information extraction part 2212 extracts interest information that is information indicating interest of the viewer for the related information, and stores it. In addition, the interest information extraction part 2212 receives broadcast information 2010 including the video information 2011 and the related information 2012 from the broadcast receiving part 2201. The interest information extraction part 2212 compares at least the subject attribute information 2123 or at least URI information 2124 in the related information 2012 with the stored interest information. Then, broadcast information 2010 that is determined to match the interest information of the viewer is selected. The selected broadcast information 2010 can be stored in the broadcast information storing part 2213 as necessary.

In the present invention, a function is provided for moving or deleting, by the user, the subject representation figure and the like 2042 displayed on the subject related information display part 2206. The system of the present invention can be configured such that the interest information stored in the interest information extraction part 2212 is decreased when the above-mentioned operation is performed. Accordingly, for example, it is reflected to extraction of the interest information that interest of the viewer for the subject attribute information 2123 represented by the deleted subject representation figure and the like 2042 or corresponding URI information 2124 is decreased.

Next, operation of the system in the example 2-2 will be described. The broadcast information 2010 including the video information 2011 and the related information 2012 broadcast from the broadcasting station is received by the broadcast receiving part 2201, and after it is demodulated, it is sent to the video display control part 2202. The related information 2012 is configured as shown in FIG. 11 for example, in the same way as the example 2-1. Since FIG. 11 was described in the example 2-1, the description will be omitted in this example.

The video display control part 2202 generates control signal for displaying the video information 2011 in the video information 2011 and the related information 2012 received form the broadcast receiving part 2201, and the control signal is sent to the video display part 203. The related information 2012 is stored in the video display control part 2202 temporarily.

When the subject 2041 is pointed in the video display part 2203, the video display control part 2202 receives the pointed coordinates from the video display part 2203, and compares the received coordinates with the subject coordinates 2122 shown in FIG. 11, so that a subject in which subject coordinates 2122 that match the pointed coordinates are defined is detected. Then, the subject attribute information 2123 and the URI information 2124 of thus detected subject 2041 are sent to the related information display control part 2205.

In the related information display control part 2205, processes are performed on the basis of the subject attribute information 2123 and the URI information 2124 received from the video display control part 2202. First, the subject attribute information 2123 is sent to the subject attribute information storing part 2209, and is stored. As for the received subject attribute information 2123, a control signal for displaying the subject representation figure and the like 204 representing the subject attribute information 2123 is generated and sent to the subject related information display part 2206. The display screen of the subject related information display part 2206 is the same as that described by using FIGS. 12 and 13.

When the viewer points the subject representation figure and the like 2042 displayed on the subject related information display part 2206 by using the second pointing device 2207, related information corresponding to the subject attribute information 2123 represented by the pointed subject representation figure and the like 2042 is obtained. The obtained related information is displayed in the related information display area 2262 in the subject related information display part 2206. This point is the same as that described in the example 2-1.

In the following, different points in the operation of the example 2-2 compared with that of the example 2-1 will be mainly described.

In the example 2-2, the related information display control part 2205 has functions described in the example 2-1. In addition, as to a subject in which the subject representation figure and the like 2042 is pointed on the subject related information display part 2206, the related information display control part 2205 has a function for sending, to the interest information extraction part 2212, at least two pieces of information in URI information 2124 for the subject, subject attribute information 2123, related information received from the information source, and display time information indicating time when the related information is displayed on the subject related information display part 2206.

The time for displaying the related information is based on the start time and end time for displaying the related information on the subject related information display part 2206. These times also relate to time information of operation of the second pointing device 2207 by the viewer who refers to the subject related information display part 2206. As the start time, time when the subject representation figure and the like 2042 is pointed can be used, or start time for displaying the related information obtained after that on the subject related information display part 2206 can be used. As the end time, time when the viewer performs an operation for ending display of the related information can be used, or time when the next subject representation figure and the like 2042 is pointed can be used.

The interest information extraction part 2212 refers to a plurality of pieces of information or all pieces of information in the URI information 2124, the subject attribute information 212, the related information and the display time information received form the related information display control part 2205, and extracts interest information and stores it. The interest information is information for representing what information the viewer is interested in. Generally, the interest information can be generated by statistically processing the display time information or the number of times of pointing. For example, the number of times of pointing is the number of times of pointing for each piece of subject attribute information or for each piece of URI information, and the display time information is display time for each piece of the subject attribute information, each piece of URI information, or each piece of related information, or the total. Or, the interest information may be pointing number or display time or the total value, for each combination of at least two of the subject attribute information 2123, URI information 2124, and the related information.

In addition, text included in the subject attribute information 2123 and the related information is disassembled into keywords. As for a keyword, when the number of times of viewing the subject attribute information 2123 and the related information that include the keyword is large, or when the display time for the subject attribute information 2123 and the related information that include the keyword is long, it is assumed that the keyword indicates viewer's interest. Then, a group of keywords indicating the interest is extracted, so that the group can be used as the interest information.

When the viewer moves or deletes the subject representation figure and the like 2042 displayed on the subject related information display part 220, the information can be sent from the related information display control part 2205 to the interest information extraction part 2212, so that the information can be reflected to the extraction process of the interest information. For example, when the viewer deletes the subject representation figure and the like 2042, it is regarded that interest of the viewer for the subject attribute information 2123 represented by the deleted subject representation figure and the like 2042 or the corresponding URI information 2124 is lowered, so that the interest information is decreased, and this is reflected to the interest information extraction process.

In addition, the interest information extraction part 2212 receives the broadcast information 2010 including the related information 2012 from the broadcast receiving part 2201, compares the URI information 2124 in the related information 2012 with the above-mentioned interest information, and performs a filtering process for selecting broadcast information that matches the viewer's interest. Thus filtered broadcast information 2010 is stored in the broadcast information storing part 2213 as necessary. In this case, whether the broadcast information matches the interest is determined by determining whether the related information includes subject attribute information 2123, URI information 2124, related information or combination of these in which the pointing number is large, or display time or sum of display time is long. Instead of using the subject attribute information 2123 or the URI information 2124 itself, pointing number or display time for each genre can be used. In this case, the subject attribute information 2123 or the URI information 2124 is classified to genres.

Next, a concrete example of the interest information extraction part will be described.

In the following description, it is assumed that the related information in the present embodiment includes a URI and a keyword group indicating contents corresponding to the URI. For example, related information related to a car that appears in a video as a subject includes the location of the car in the screen, a URL address of a specification information home page of the car, and (car) as the keyword group. A concrete description example of such related information is shown in the following.

<frame no="N">
<object>
<location>(XA,YA)-(XB,YB)</location>

```
<uri>url:www.automobile.com/car_A/spec.html
<uri>
<keyword> car </keyword>
</object>
</frame>
```

This example corresponds to a case where only a car exists as subject in a video frame of the frame number "N". Between <frame no="N"> and </frame>, information on the video frame of the frame number "N" is written. Between <object> and </object>, information on a subject is written. In this case, location of the car, the URL address of the specification information home page of the car, and (car) as the keyword are written. When a plurality of subjects exist, a plurality of <object> . . . </object> exist between <frame no="N">and </frame>. The related information is not necessarily the XML format. It may be the table type shown in FIG. 11.

The interest information extraction part in this example stores a user profile including the keyword group and weights for each keyword as the interest information. An example of the user profile is shown in the following.

(car :1, panda :2, men's underpants :1, sea cucumber :1)

The above example describes the user profile including a set of a plurality of combinations, each combination being "keyword : the weight of the keyword".

When the viewer points the car appearing as a subject in a video, the interest information extraction part increments the weight of the keyword "car". When the keyword "car" does not exist in the user profile at the time when the car is pointed, the keyword "car" is added to the user profile and the weight is set to be 1.

Therefore, if the car appears 10 times as the subject in the video, and if the viewer points the car every time, the user profile becomes (car :11, panda :2, men's underpants :1, sea cucumber :1).

When the viewer deletes the subject representation figure and the like 2042 displayed on the subject related information display part 2206, the weight of the keyword included in the related information corresponding to the subject is decremented, so that the user profile is updated. For example, when the user profile is {car :11, panda :2, men's underpants :1, sea cucumber :1}, if the viewer deletes the subject representation figure and the like 2042 of the subject related to the related information including the keyword (car) from the subject related information display part 2206, the user profile is updated to {car :10, panda :2, men's underpants :1, sea cucumber :1}.

When the viewer points a subject representation figure and the like 2042 displayed on the subject related information display part 2206 to refer to the related information, the weight of the keyword included in the related information corresponding to the subject representation figure and the like 2042 is increased according to reference time of the related information, so that the user profile is updated.

For example, the weight of the keyword included in the related information of the subject is incremented each time the related information is referred to for one minute. When the user profile is {car :10, panda :2, men's underpants :1, sea cucumber :1}, if the viewer points the subject representation figure and the like 2042 of the subject related to the related information including the keyword (car), so that the viewer refers to the related information for ten minutes, the user profile is updated to {car :20, panda :2, men's underpants :1, sea cucumber :1}.

In addition, the interest information extraction part performs processes according to the following rule when broadcast information is filtered.

When a keyword included in the related information related to a subject in the video that is received is included in the user profile, the weight of the keyword is regarded as a interest degree for the subject. When a plurality of keywords are included in the user profile, sum of the weights of the keywords is regarded as the interest degree. When the interest degree is no less than a constant value K, it is regarded that the viewer is interested in the subject, so that the equivalent process as that performed when the subject is pointed is automatically performed. For example, when K=10 and the user profile is {car :20, panda :2, men's underpants :1, sea cucumber :1}, if related information including the keyword {car} is received, the interest degree for the corresponding subject is 20,which is greater than 10.Therefore, the equivalent process as that performed when the subject is pointed is automatically performed, that is, the process for displaying the subject representation figure corresponding to the subject on the subject related information display part is performed.

The above-mentioned example is only an example of a process of the interest information extraction part. Other rules for weighting various keywords, for using the keywords can be used.

Example 2-3

In the following, the example 2-3 will be described.

Figure 15:
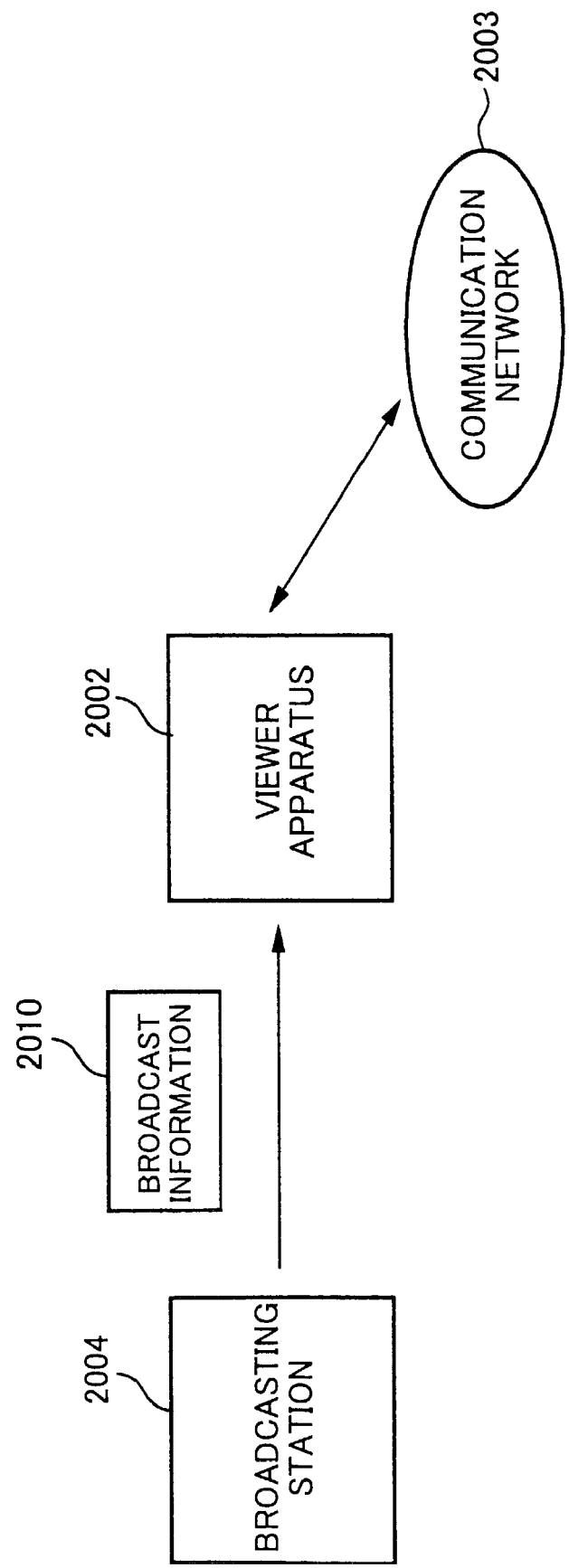
FIG. 15 is a block diagram of a system of the second embodiment of the present invention (example 2-3)

FIG. 15 shows a system configuration of the example 2-3 of the present invention. The example 2-3 is a broadcast information send/receive system in which a broadcast station 2004 is added to the viewer apparatus 2002 that is described so far. The broadcast station 2004 includes a function for broadcasting the broadcast information 2010 including the related information 2012 shown in FIG. 11.

Figure 16:
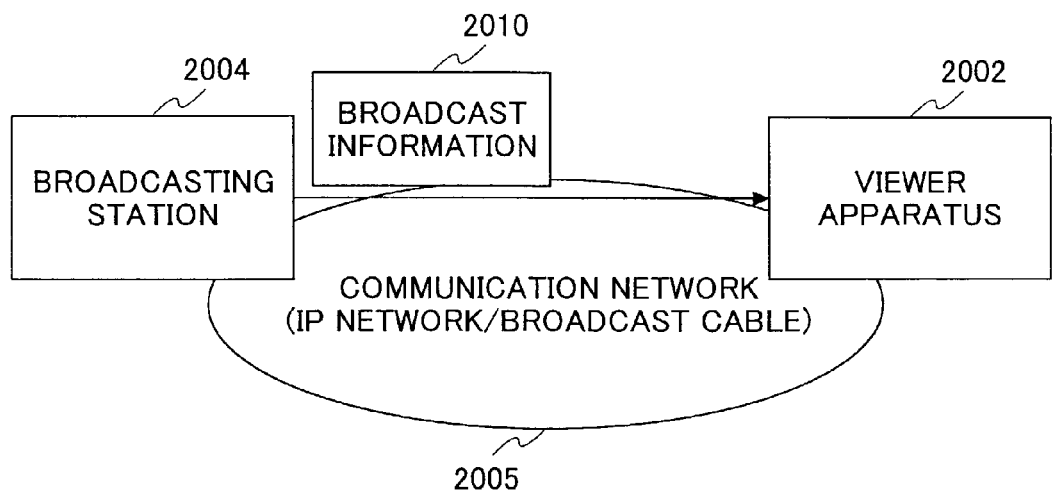
FIG. 16 is a figure showing another example in the example 2-3.

The broadcast station may be a broadcasting station for performing broadcast via broadcasting infrastructure. In this case, the broadcast station is connected to a satellite broadcasting system or a ground wave broadcasting system such as a BS digital broadcasting system, a CS digital broadcasting system, a ground wave digital broadcasting system. In addition, the broadcast station may be a broadcast station for performing network broadcast such as internet broadcast or cable television broadcast. In this case, as shown in FIG. 16, a server connected to a predetermined network such as the Internet or a cable for broadcasting is used.

Example 2-4

In the following, the example 2-4 will be described.

Figure 17:
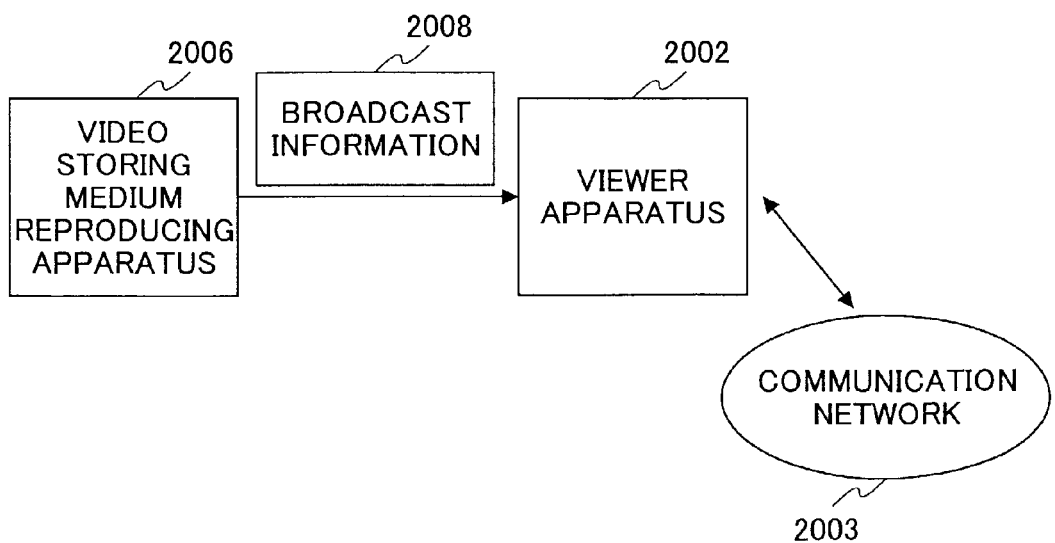
FIG. 17 is a block diagram of a system of the second embodiment of the present invention (example 2-4)

FIG. 17 shows a system configuration of the example 2-4 of the present invention. The example 2-4 is a broadcast information send/receive system in which a video storing medium reproducing apparatus 2006 is added to the viewer apparatus 2002 that is described so far. The video storing medium is DVD, D-VHS video tape and the like, and is a medium in which the broadcast information 2010 including the related information shown in FIG. 11 is recorded. The video storing medium reproducing apparatus 2006 is a DVD player, VCR and the like, and generally has a function for recording and storing broadcast information mainly including video received from broadcasting in the video storing medium. In addition, the video storing medium reproducing apparatus 2006 has a function for reproducing the recorded broadcast information. Broadcast information obtained from the broadcasting infrastructure may be recorded beforehand in the video storing medium. Or, the video storing medium may be obtained by the user from a retail store or a rental shop, wherein broadcast information including video information such as a movie or a drama is recorded beforehand in the video storing medium.

In the example 2-4, the broadcast information 2010 including the related information shown in FIG. 11 is input in the viewer apparatus 2002 from the video storing medium reproducing apparatus 2006 that reproduces a predetermined video storing medium.

Also in the second embodiment, related information that is related to the viewer information and to the terminal information can be obtained. For example, a plurality of URIs corresponding to viewer information or terminal information are sent to the viewer apparatus as the related information with video information, and the viewer apparatus selects at least a URI that matches viewer information or terminal information that is input beforehand in the viewer apparatus. As the related information, the after-mentioned format such as related information examples 1-5 described in the fourth embodiment can be used.

(Effect)

According to the viewer apparatus and the broadcast information send/receive system of the present embodiment, the viewer apparatus receives broadcast information including related information, in which URI information indicating the location of the related information is defined in the related information for each subject appearing in video. Then, when the viewer points the subject displayed on the video display screen, the subject representation figure and the like is displayed on the screen. Next, in response to pointing operation on the subject representation figure and the like, related information is obtained by the URI information, and displayed on the screen. Accordingly, the viewer can obtain information related to an interested subject from an information source other than broadcast information source while the viewer is watching video information.

When the viewer points a plurality of subjects one after another, the characters or figures and the like representing the subject is displayed one after another. Accordingly, when there are many pieces of interested related information, the viewer can refer to the related information after watching broadcast information without restriction of time.

In addition, interest information is extracted and held, in which the interest information is obtained in consideration of number of pointing times on subjects and display time information for related information of the subjects. Thus, broadcast information conforming to the interest information can be automatically selected and stored from a plurality pieces of broadcast information that is broadcast at a time when the viewer does not watch any broadcast information. Accordingly, the viewer can obtain broadcast information conforming to genres of related information to which the user referred in the past.

According to the present invention, when the viewer deletes displayed subject representation figure and the like, the interest to the URI information is regarded to be decreased so that the stored interest information is decreased, and it is reflected to the interest information extraction processes. Accordingly, it becomes possible to stop obtaining information of the genre according to dynamic change of viewer's interest after the time when the viewer fully referred to related information.

Since the related information can be obtained subject by subject, related information can be defined for a subject which appears various scene. As a result, related information can be referred to more finely, compared with obtaining related information program by program. For example, meaning of a subject may change according to scenes, thus, by defining related information frame by frame, it becomes possible to refer to various and proper related information. In addition, video information can be automatically selected more finely. In addition, since the characters/figure for a subject is displayed on the screen additionally, the viewer can refer to related information without receiving restriction of time.

In addition, by providing the mechanism, in which only related information interested by the viewer is properly browsed by pointing an interest subject, it becomes possible to obtain information suggesting what information the viewer is interested in on the basis of pointing operation and the like on the subject.

Third Embodiment

Next, the third embodiment of the present invention will be described. In this embodiment, related information is obtained by performing a process for an event from a terminal such as a personal computer in synchronization with broadcast contents from TV, radio or the like. The process for the event in synchronization with broadcast content is a process to change, according to the broadcast content, an action performed in response to occurrence of an event such as button push operation in the viewer apparatus. As a concrete example of the process, in a case where CM1, CM2 and CM3 are sequentially broadcast in a predetermined channel of television broadcasting, when a user pushes a button of the viewer apparatus during CM1 is broadcast, a link to information on the CM1 is displayed on a display apparatus connected to the viewer apparatus. In the same way, while CM2 is broadcast, when the user pushes a button of the viewer apparatus, a link to information on CM2 is displayed. In addition, while CM3 is broadcast, when the user pushes a button of the viewer apparatus, a link to information on CM3 is displayed.

Figure 18:
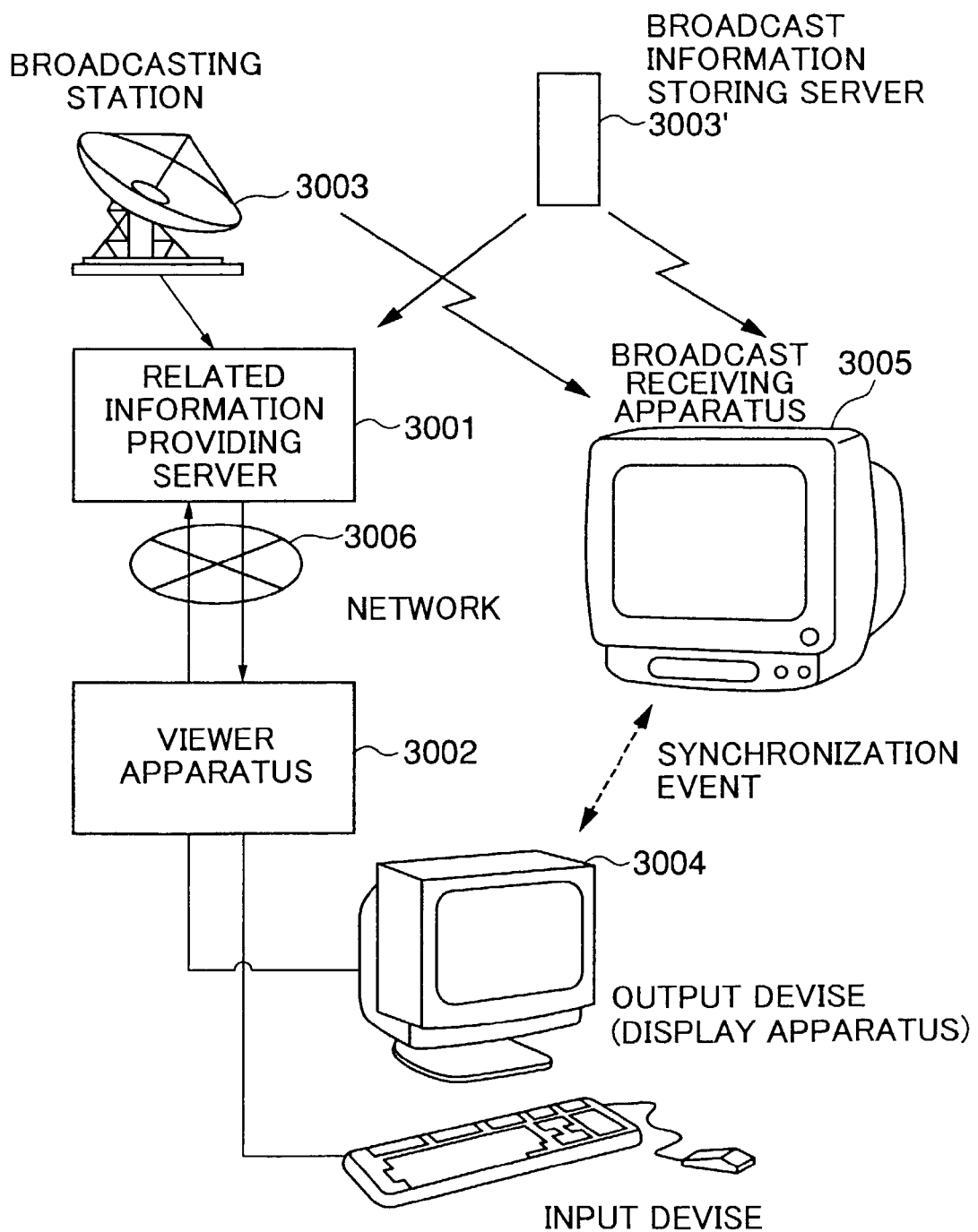
FIG. 18 is a block diagram of a system of a third embodiment of the present invention.

FIG. 18 shows a system configuration of the third embodiment of the present invention. The system shown in FIG. 18 includes a related information providing server 3001 (to be referred to as a server 3001 hereinafter), a viewer apparatus 3002 (client) for communication with the server 3001 via the network 3006, a broadcasting station 3003 for broadcasting broadcast content, and an input/output apparatus 3004 connected to the viewer apparatus 3002. The broadcast content broadcast from the broadcasting station 3003 can be received by the broadcast receiving apparatus 3005. Various actions are performed in the viewer apparatus 3002 in synchronization with the broadcast content. In addition, the action that is performed in response to the event occurring in the viewer apparatus 3002 changes in synchronization with the broadcast content.

The synchronizing process in this embodiment can be performed not only when the broadcast receiving apparatus 3005 receives the broadcast contents from the broadcast station 3003, but also when the broadcast receiving apparatus 3005 receives the broadcast contents from the broadcast information storing sever 3003' connected to a network such as the Internet.

The event that occurs in the viewer apparatus 3002 is each of various operations performed by the user for the input/output apparatus 4. For example, when the viewer apparatus 3002 includes a keyboard, the event corresponds to a signal indicating that a predetermined button on the keyboard is pushed. When the broadcast apparatus 3002 includes a pointing device such as a mouse, the event corresponds to a signal indicating that a predetermined position is clicked on the screen displayed on the display apparatus connected to the viewer apparatus 3002. In addition, the event may mean that a predetermined time lapses after an action occurs, or mean time out, that is, the time becomes a predetermined time.

The event in this embodiment is determined, from the various operations or occurrences of events, according to what application is to be realized by using the system of the present invention. For example, in an application in which an icon is added on the screen in the display apparatus when a viewer is interested in a subject or BGM and the like in a drama while the viewer is watching the drama so that the viewer pushes a button for so-called bookmark in the viewer apparatus 3002, the event is that the viewer (user) pushes the bookmark button, and when the bookmark button is pushed, an action that the icon is added is performed. In addition, for example, in an application in which, while the viewer watches an educational program on TV, information pages on the educational program are displayed on the screen of the display apparatus of the viewer apparatus 3002 while the program progresses, the event corresponds to a predetermined time, that is, the event corresponds that it becomes the time when the program is switched. At the time when the event occurs, an action that the page is change to a new page is performed.

The actions performed in the viewer apparatus 3002 are various processes by an application program executed in the viewer apparatus 3002, and the action varies according to a service application realized by using the system of the present invention. In the before-mentioned example, the processes such as "add icon for accessing the related information", "update to a new information page" corresponds to the actions.

When the viewer apparatus 3002 of the system of the present invention is implemented by a personal computer including MS-Windows as an OS, the action is a process by a software program to be performed on the Windows.

The server 3001 obtains action table resource data that is information to be referred to for forming an action table from an institution for managing the broadcast contents such as a broadcasting station.

Figure 19:
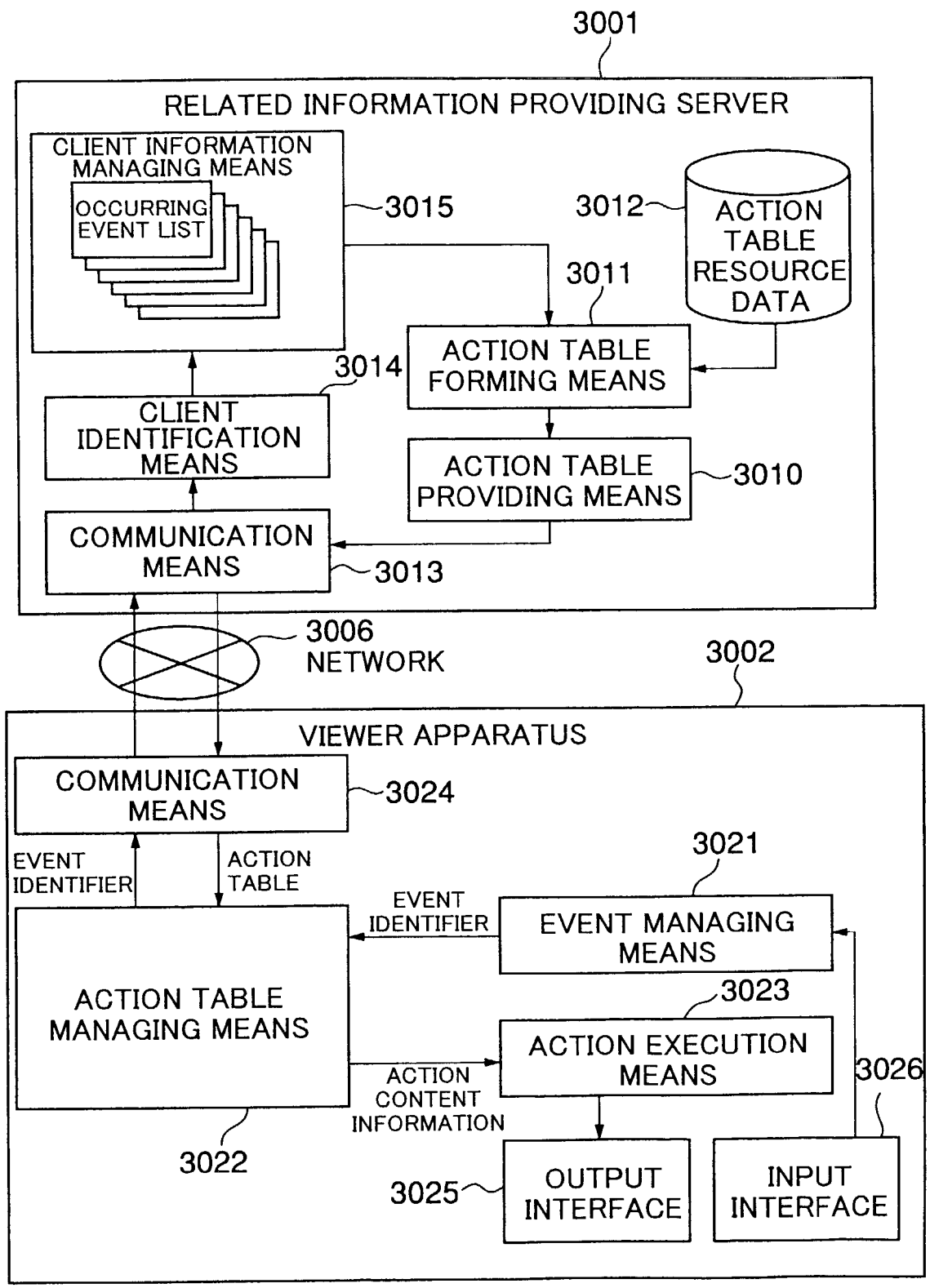
FIG. 19 is a block diagram of the related information providing sever shown in FIG. 18 and the viewer apparatus.

FIG. 19 is a block diagram of the sever 3001 and the viewer apparatus 3002 of the present invention.

The server 3001 includes a communication means 3013 for communicating with a plurality of viewer apparatuses via the network 306, a client identification means 3014 for identifying the viewer apparatus 3002 accessing the server 3001, a client information managing means 3015 for holding a client occurrence event list that is a list of event identifiers of events that already occurred for each viewer apparatus 3002, the action table resource data 3012 to be referred to for forming the action table, an action table forming means 3011 for updating the configuration of the action table and for determining term of validity for each action table and adding it to the action table, and an action table providing means 3010 for providing the action table via the network 3006.

The viewer apparatus 3002 includes a communication means 3024 for communicating with the server 3001, an action table managing means 3022, an event managing means 3021, an action execution means 3023, an input interface 3026 and an output interface 3025. The action table managing means 3022 obtains an action table from the sever 3001 and holds it. The event managing means 3021 monitors occurrence of the event, and notifies the action table managing means 3022 of the event identifier of the event. The action execution means 3023 instantaneously executes the action described in the action information received from the action table managing means 3022.

Figure 20:
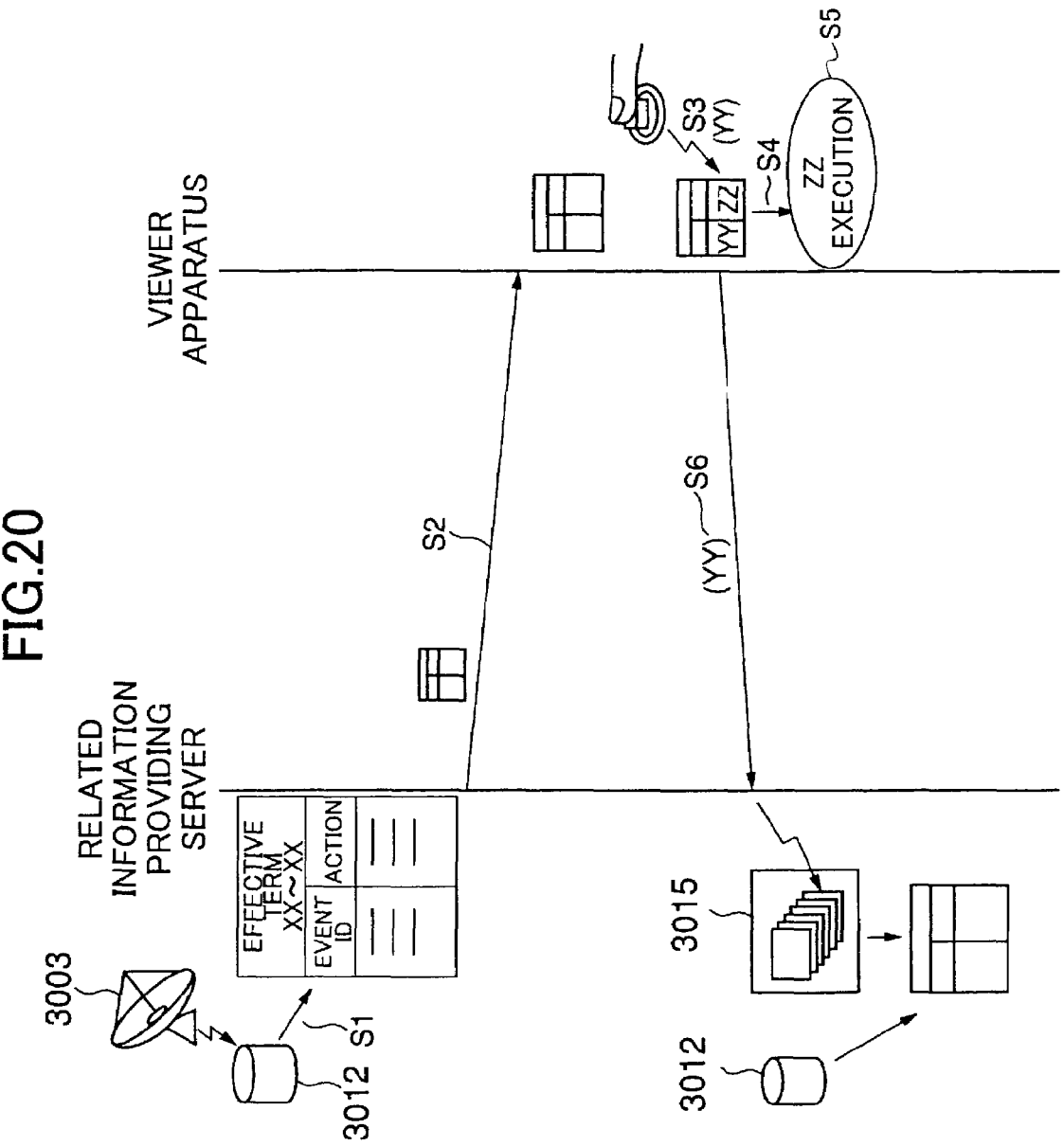
FIG. 20 is a sequence chart of a method according to the third embodiment.

FIG. 20 shows a sequence chart of a method according to the present embodiment. The action table resource data 3012 in the server collects broadcast information broadcast by the broadcasting station 3003. First, the server 3001 forms an action table that specifies event identifiers indicating effective events and action information indicating processes executed in response to the events for each effective term XX~XX that is specified in synchronization with the broadcasting time of the broadcast contents (step S1). Next, the server 3001 sends the action table to the viewer apparatus 3002 (step S2). Next, the viewer apparatus holds the received action table, and obtains an event identifier YY that corresponds to an occurred event, for example, an event that the user pushes a pushing button (step S3). Next, the viewer apparatus 3002 obtains action information ZZ corresponding to the event identifier YY by using the action table received from the server 3001 (step S4). Finally, the viewer apparatus 3002 executes the action information ZZ (step S5). At this time, the viewer apparatus 3002 may sends the event identifier YY to the server 300 (step S6). Accordingly, the server 3001 can form the occurrence event list and form an action table suitable for the viewer apparatus 3002 by the client information managing means 3015.

FIG. 21 shows an example of the action table according to the present invention, and FIG. 22 shows an example of the client occurrence event list according to the present invention.

In the following, the concrete operation of the present embodiment will be described.

When the viewer apparatus 3002 launches, the action table managing mans 3022 obtains the action table from the server 3001. The action table managing means 3022 checks the effective term described in the action table, and regards the obtained action table as a reference object during the effective term.

Before the effective term of the action table that is currently referred to ends, the action table managing means 3022 obtains a new action table from the server 3001. The new action table becomes the reference object at the same time when the effective term of the current action table ends.

After that, while the action table managing means 3022 checks the effective term of the action table that is the current reference object, before-mentioned operation is repeated, so that the action table is updated one after another.

In addition, as client operation is performed or as an action is executed, when an event occurs, the event managing means 3021 sends an event identifier of the occurring event to the action table managing part 3022. The action table managing part 3022 refers to the action table that is currently referred to, and sends action information corresponding to the even identifier to the action execution means 3023. The action execution means 3023 executes the action according to the action information.

In addition, the action table managing means 3022 in the viewer apparatus 3002 sends the event identifier received from the event managing means 3021 to the server 3001. When the server 3001 receives the event identifier from the viewer apparatus 3002, first, the client identifying means 3014 identifies the viewer apparatus 3002. Next, the client information managing means 3015 adds the event identifier to the client occurrence event list corresponding to the client (viewer apparatus).

In addition, in the server 3001, when the action table is requested from the viewer apparatus 3002, the client identifying means 3014 identifies the viewer apparatus 3002, and the action table forming means 3011 forms the action table by referring to the client occurrence event list corresponding to the identified viewer apparatus 3002. The action table providing means 3010 sends the action table to the viewer apparatus 3002.

In addition, in the server 3001, when the action table forming means 3011 forms a new action table, the action table providing means 3010 actively sends the new action table to the viewer apparatus 3002.

The viewer apparatus 3002 holds a received new action table by the action table managing means 3022, and changes the action table that is currently referred to is changed to the new action table when the effective term of the action table that is currently referred to ends.

Example 3-1

Next, an example in which the system of the present invention is applied to television broadcasting will be described as the example 3-1.

In an application of the example 3-1, the viewer is interested in a subject, a background or BGM and the like in drama images and voices while the viewer watching the drama on TV, and the viewer pushes a button for bookmark of the viewer apparatus 3002, then, an icon (or URL and the like) for accessing the related information is added to the screen of the display apparatus. It is assumed that the viewer apparatus 3002 includes three bookmark buttons as an input device.

And it is assumed that identifiers for each button in the system are (0, 0), (1, 0) and (2, 0). It can be considered that each of these three bookmark buttons has its function, for example, a first button indicates that the viewer is interested in the subject, a second button indicates that the viewer is interested in the background, and the third button indicates that the viewer is interested in BGM. In addition, in some instances, the interest indicated by the button may be changed. That is, for example, at a point in time, the button (1,0) indicates that the viewer is interested in the subject, the button (2,0) indicates that the viewer is interested in the background, and the button (3,0) indicates that the viewer is interested in the BGM. At another point of time, since two subjects (for example, personalities) exist in the image, the button (1,0) indicates that the viewer is interested in the first subject, the button (2,0) indicates that the viewer is interested in the second subject, and the button (3,0) indicates that the viewer is interested in the BGM. In addition, in each viewer apparatus, meaning of button operation may be deferent, that is, the action arisen according to the button operation may be different for each viewer apparatus 3002.

FIG. 23 shows an example of an action table of the present invention. The effective term of this action table is from time 0 to time 999. The input device is formed by three buttons. The identifiers for the buttons in the system are (0, 0), (1, 0) and (2, 0). The event identifiers include time information and button identifiers. The event identifier [(0, 499), (0, 0)] indicates an event that the button of the identifier (0, 0) is pushed between the time 0 and the time 499. An action "add icon_A" for adding an icon A to the screen is described in response to the event identifier.

According to the action table shown in FIG. 23, if the button of the identifier (0, 0) is pushed between the time 0 to the time 499, "add icon_A" is executed. In the same way, if the button of the identifier (1, 0) is pushed between the time 0 to the time 499, "add icon_B" is executed. If the button of the identifier (2, 0) is pushed between the time 0 to the time 499, "add icon_C" is executed. If the button of the identifier (0, 0) is pushed between the time 500 to the time 999, "add icon_D" is executed. If the button of the identifier (1, 0) is pushed between the time 500 to the time 999, "add icon_E" is executed. If the button of the identifier (2, 0) is pushed between the time 500 to the time 999, "add icon_F" is executed.

The viewer apparatus 3002 regards the action table as the reference object between the time 0 to the time 999. Then, if a button of the viewer apparatus 3002 is pushed between the time 0 to the time 999 so that an event occurs, the viewer apparatus 3002 instantaneously executes an action determined on the basis of the action table.

FIG. 24 shows an example of an action table obtained next. For obtaining the action table having the next effective term, the viewer apparatus 3002 accesses the server 3001 between the time 0 and the time 999. Between the time 1000 and the time 1999, processes are performed by referring to the action table shown in FIG. 23. For all the viewer apparatuses 3002, the next action table obtained from the server 3001 is the same irrespective of occurrence of any event between the time 0 and the time 999.

In each client (viewer apparatus), the action table of the effective term 1000-1999 may be different according to the kind of the event and presence or absence of event occurrence between the term 0-999.

FIG. 25 and FIG. 26 shows examples action tables having different information. When a plurality of viewer apparatuses 3002 exists in the system of the present invention, it is assumed that no event occurs between the time 0 and the time 999 in the first viewer apparatus, and a button of the identifier (0, 0) is pushed between the time 0 and the time 499 so that "add icon_A" is executed. In this case, the first viewer apparatus obtains the table shown in FIG. 25 from the server 3001 as a new action table. On the other hand, when the button of the identifier (0, 0) is not pushed between the time 0 and the time 499, the first viewer apparatus obtains the table shown in FIG. 26 from the server 3001 as a new action table.

As mentioned above, information in the action table to be obtained is different according to the presence or absence of occurrence of the event or the kind of occurred event in each viewer apparatus 3002. As a result, the action to be executed by a button operation can be changed for each viewer apparatus depending on button operation performed before.

Example 3-2

Next, the example 3-2 will be described in which the present invention is applied to television broadcasting.

In the application of this example 3-2, while the viewer is watching an educational program and the like, predetermined information pages on the program are displayed on the screen of the display 3004 of the viewer apparatus 3002 as the program progresses, that is, predetermined home pages on the Internet are displayed as the program progresses. In this application, the event corresponds to a predetermined time, that is, corresponds to a fact that it becomes time when the program is changed. When the event occurs, an action for updating to a new information page is executed.

FIG. 27 shows an example of the action table of the example 3-2. In FIG. 27, an action of adding a home page of which the URL is http://page1 is described as "open http://page1". When the viewer apparatus is implemented on a personal computer including OS of MS-Windows, execution of the action "open http://page1" corresponds to opining the home page indicated by the URL by using a function of an internet browser program "iexplore.exe" and the like in the MS-Windows.

In this operation, first, the viewer apparatus 3002 is launched before the program that is the object of synchronous processing is broadcast, and the viewer apparatus 3002 obtains the action table shown in FIG. 27 from the server 3001. Next, in the viewer apparatus 3002, at the time of 00/09/04/19:00:00,it is determined that an event of an event identifier [00/09/04/19:00:00] occurs, so that a corresponding action "open http://page1" is executed and a home page of http://page1 is displayed.

Next, when the time becomes 00/09/04/19:04:00,it is determined that an event of an event identifier [00/09/04/19:04:00] occurs, so that corresponding action "open http://page2" is executed. Next, when the time becomes 00/09/04/19:09:15,it is determined that an event of an event identifier [00/09/04/19:09:15] occurs, so that corresponding action "open http://page3" is executed. After that, in the same way, when the time becomes a time specified by the event identifier, it is determined that the event occurs, so that the action is executed.

In addition, since the effective term of the action table shown in FIG. 27 is until 00/09/04/19:15:00,when the time becomes 00/09/04/19:15:00,the action table shown in FIG. 27 that is currently referred to is updated to a newly obtained action table. After that, an action is executed at each time specified by the event identifier in the updated action table.

Example 3-3

Next, the example 3-3 will be described in which the present invention is applied to television broadcasting.

Figure 28:
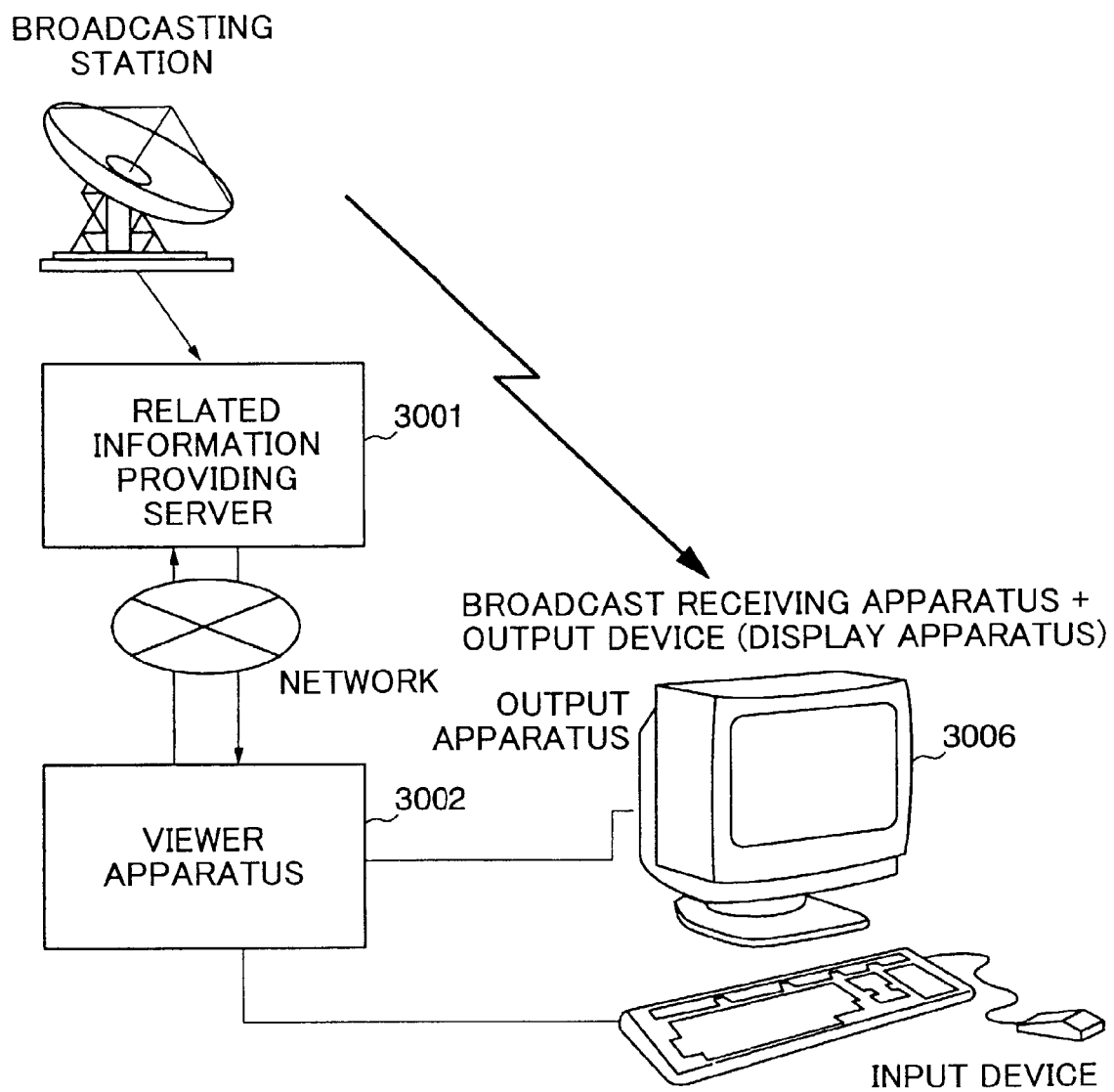
FIG. 28 is a block diagram of a system of the example 3-3.

In this example 3-3,as shown in FIG. 28, an output apparatus 3006 of the viewer apparatus 3002 is integrated with a broadcast receiving apparatus that receives broadcast video. Or, the output apparatus 3006 is connected to the broadcast receiving apparatus. The viewer apparatus 3002 is provided with a pointing device such as a mouse as an input device. As the pointing device, a touch panel display can be used. In this case, it is possible to point, by using the pointing device, a subject in each video frame in the broadcast video image displayed on the broadcast receiving apparatus.

Figure 29:
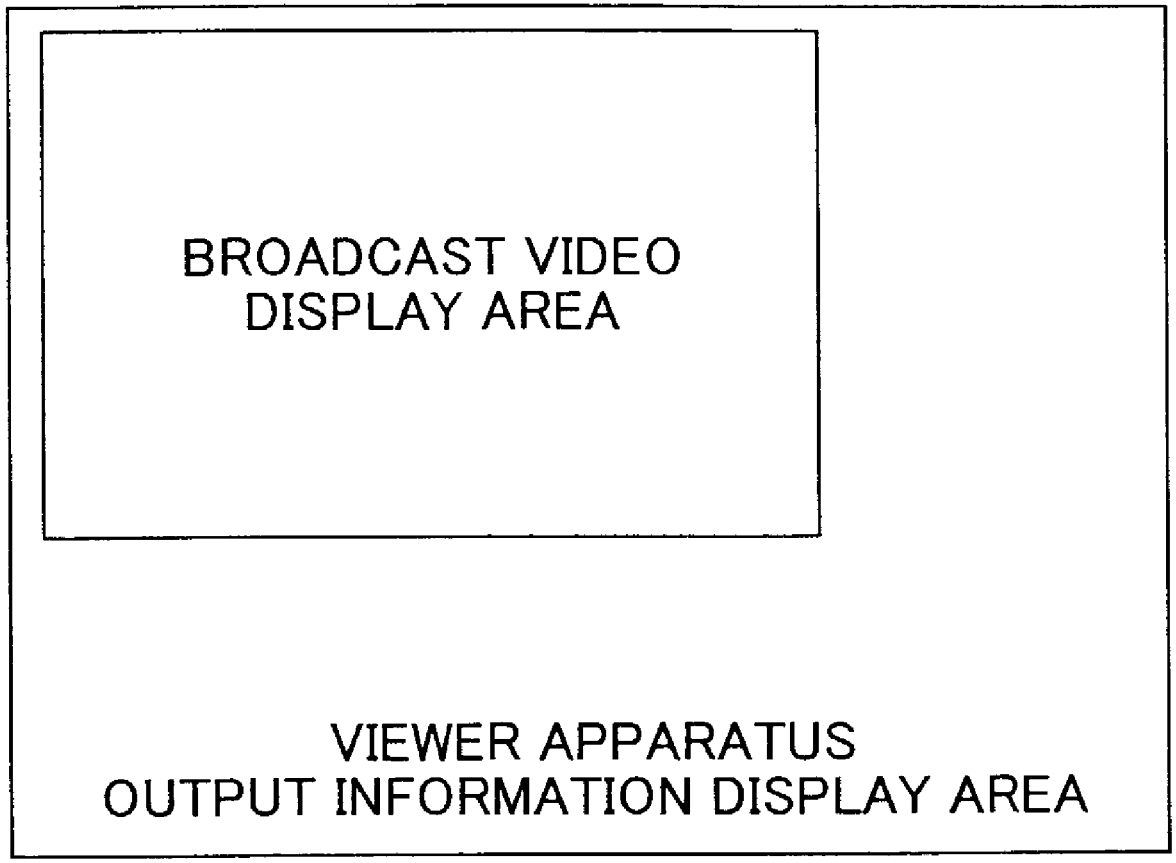
FIG. 29 is an example of an information display area in the case when a broadcast receiving apparatus for receiving broadcast video and an output device of the viewer apparatus are integrated.

When the broadcast receiving apparatus for receiving the broadcast video and the output device of the viewer apparatus are integrated, the information display area (display screen) of the integrated apparatus can be configured as shown in FIG. 29.

In this example, in the above-mentioned environment, when the viewer points a subject in a video frame in the broadcast video by using the pointing device connected to the viewer apparatus, an action corresponding to the pointed subject is executed. As the action to be executed, various processes can be considered, for example, displaying a home page related to the pointed subject, adding the home page related to the pointed subject to a bookmark, and the like. In this example, an action will be described in which an icon image corresponding to the pointed subject is added to the screen.

Figure 31:
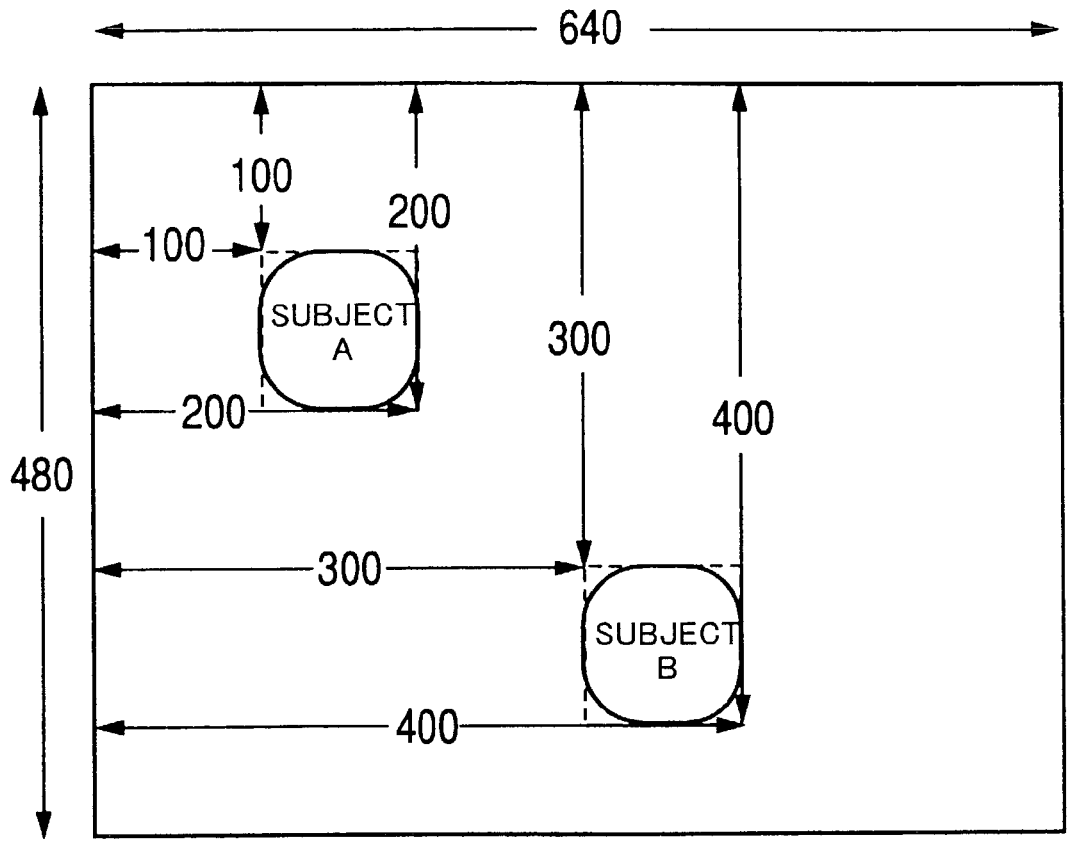
FIG. 31 is a figure showing a broadcast video display area.
Figure 32:
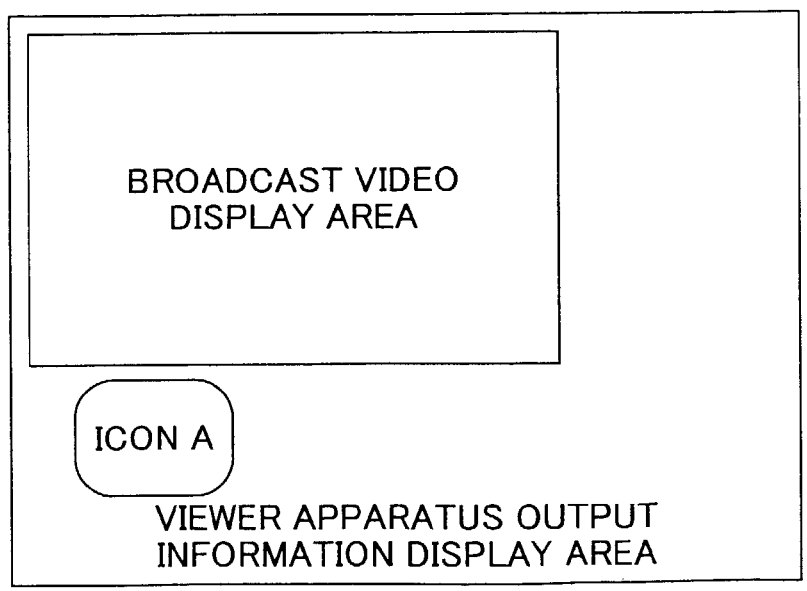
FIG. 32 is a figure for explaining that an icon A is added and displayed in a viewer apparatus output information display area.

In this case, an example of the action table provided from the related information providing server 3001 is shown in FIG. 30. As for the action table shown in FIG. 30, the effective term is from the time 0 to the time 999. The event identifier is formed by time information (t1,t2), and coordinates (xa,ya) and coordinates (xb,yb), in which coordinates (xa,ya) correspond to the upper-left corner of a rectangle area corresponding to a subject existing area in a broadcast video display area, and coordinates (xb, yb) correspond to the upper-right corner of a rectangular area, so that the event identifier is described as [(t1, t2),(xa, ya)-(xb, yb)]. As shown in FIG. 31, if the resolution of the broadcast video display area is 640×480 (VGA), an event identifier [(0, 299),(100, 100)-(200, 200)] means an event that a point in a rectangular area is pointed between the time 0 and the time 299, wherein the rectangular area has a diagonal line from (100, 100) to (200, 200) assuming that the upper-left corner coordinates are (0, 0). Normally, a subject A to be pointed exists in the rectangular area between the time 0 and the time 299. In the action table shown in FIG. 30, an action "add icon_A" is described corresponding to the event identifier [(0, 299),(100, 100)-(200, 200)] in which the action means that an icon A is added to the screen.

According to the action table shown in FIG. 30, when a point in the rectangular area having a diagonal line from (100, 100) to (200, 200) is pointed between the time 0 to the time 299, the action "add icon_A" is executed. In the same way, when a point in the rectangular area having a diagonal line from (300, 300) to (400, 400) is pointed between the time 0 to the time 299, an action "add icon_B" for adding an icon B on the screen is executed. When a point in the rectangular area having a diagonal line from (200, 100) to (300, 200) is pointed between the time 300 to the time 599, the action "add icon_A" is executed. When a point in the rectangular area having a diagonal line from (200, 300) to (300, 400) is pointed between the time 300 to the time 599, the action "add icon_B" is executed. When a point in the rectangular area having a diagonal line from (300, 100) to (400, 200) is pointed between the time 600 to the time 999, the action "add icon_A" is executed. When a point in the rectangular area having a diagonal line from (100, 300) to (200, 400) is pointed between the time 600 to the time 999, the action "add icon_B" is executed.

Normally, a subject to be pointed exists in the rectangular area that is the pointing object in the broadcast video display area. For example, as shown in FIG. 31, between the time 0 to the time 299, a subject A and a subject B exist in the broadcast video area. Therefore, in the above-mentioned example, when the viewer points the subject A between the time 0 to the time 299 while the viewer is watching the broadcast video, the icon A corresponding to the subject A is added to the viewer apparatus output information display area.

In the description in each above-mentioned example, the action described as "add_icon X" can be extended such that it is described as "add icon_X URL". More specifically, it can be described as "add icon_A www.ntt.co.jp". In this example, this action corresponds to a process that, the icon A is added, and after that, at any time, when the icon A is selected by the viewer, information of the URL address "www.ntt.co.jp" is provided.

As mentioned before, according to the present embodiment, the event in the viewer apparatus can be defined as various forms. For example, occurrence of various button operation, occurrence of operation by a pointing device such as a mouse and the like, or voice input from a microphone connected to the viewer apparatus can be used as the event. If the viewer apparatus is provided with a system for voice recognition, input of a predetermined word from the microphone may become the event. In addition, a fact that the current time becomes a predetermined time, a fact that a predetermined time lapses, or a fact of the above-mentioned facts occur at the same time can be used as the event.

In addition, according to the present embodiment, the event identifier for identifying the above-mentioned event is predetermined. The event identifier maybe defined differently for each service to be applied. Accordingly, as described before using examples, information providing services linked with television broadcasting can be provided in various forms.

Also in this embodiment, related information related to the viewer information and the terminal information can be obtained. For example, the viewer information and the terminal information are sent from the viewer apparatus to the related information providing server beforehand, and the related information providing server takes the viewer information and the terminal information into account when generating the action table for each viewer apparatus.

(Effects)

According to the system, method and the recording medium recording the control program according to the present embodiment, the viewer apparatus can quickly execute a process for an event synchronized with broadcast contents of a predetermined channel without obtaining data signals multiplexed in broadcast. Therefore, it is not necessary for the viewer apparatus to have a function for obtaining the data signals multiplexed into the broadcast from the broadcast receiving apparatus. In addition, when a button operation and the like is performed in the viewer apparatus, the viewer apparatus refers to the action table already stored in the action table management means, so that an action corresponding to the occurred event is instantaneously executed. Thus, delay time becomes very short, and it can be avoided that operability is lowered due to low response speed for the client operation. In addition, according to the present invention, since the effective term is described for each table that includes event identifies and corresponding actions, the system of this embodiment can cope with dynamic changes of broadcast time of broadcast contents that is the synchronization object and dynamic changes of program constitution. For example, the system can be applied to a live program and the like in which program constitution always changes. The effective term of the action table can be set by the provider of the broadcast contents that is the synchronization object. By using the effective term effectively, it is considered that event processing in synchronization with the live program and the like can be realized to some extent.

In addition, according to the present embodiment, since the server manages the event identifiers for each viewer apparatus, an appropriate action can be executed for each viewer apparatus even for the same event.

Fourth Embodiment

Next, the fourth embodiment of the present invention will be described by using examples 4-1 sand 4-2. In this embodiment, the viewer apparatus sends partial broadcast information to a related information providing server, and the related information providing server searches for related information on the basis of the partial broadcast information, and sends the related information to the viewer apparatus.

Example 4-1

Figure 33:
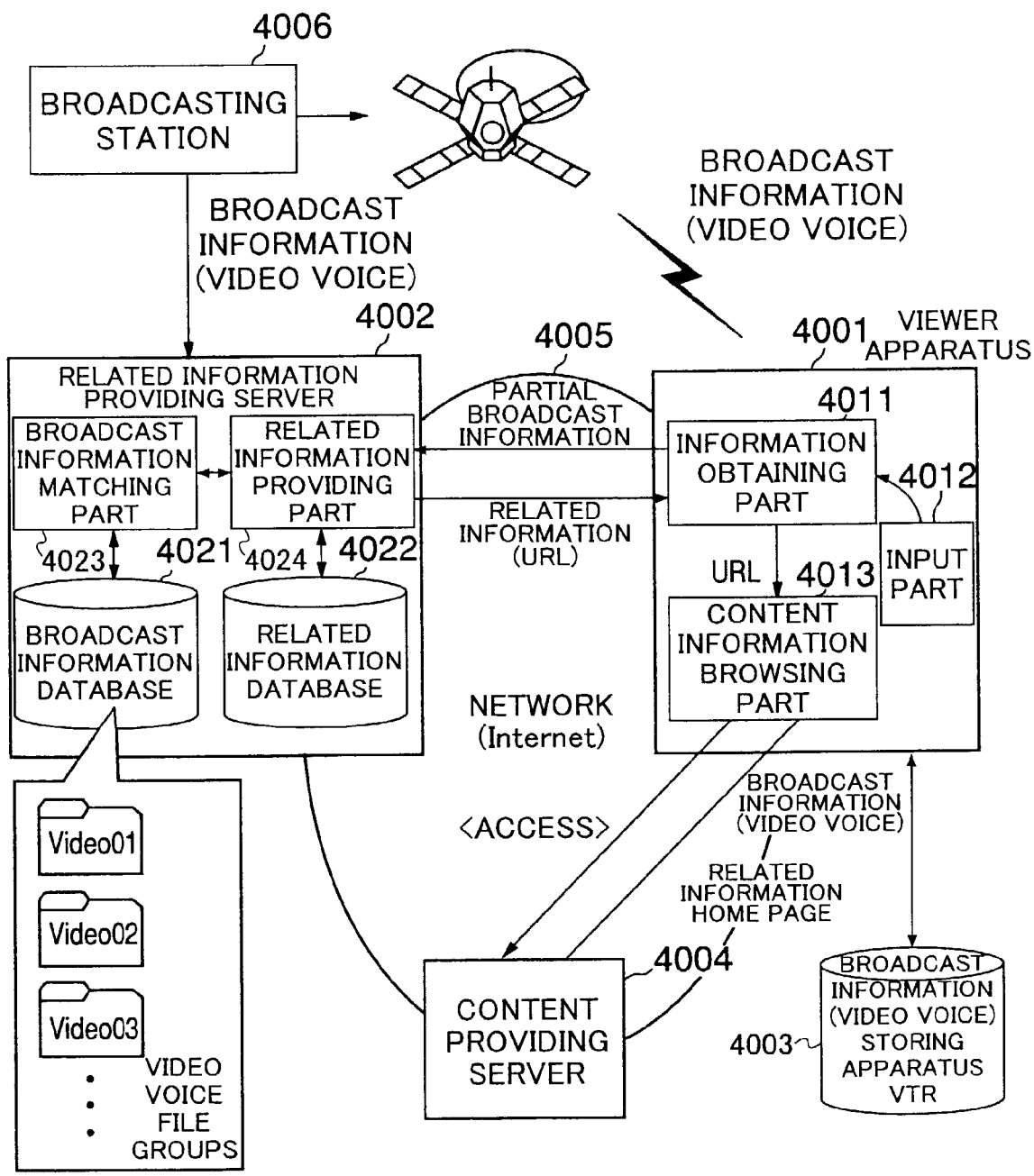
FIG. 33 is a figure showing an example of a whole configuration of a system according to a fourth embodiment (example 4-1)

As shown in FIG. 33, a broadcast receiving system with related information providing function includes a viewer apparatus 4001, a related information providing server 4002, a broadcast information storing apparatus 4003, and a content providing server 4004. The viewer apparatus 4001 includes an information obtaining part 4011 for receiving broadcast information including video and voice from a broadcasting station 4006, sending, by a related instruction obtaining instruction of the viewer from an input part 4012, broadcast information which the viewer is watching or partial broadcast information that is characteristic amount information obtained by converting the broadcast information, obtaining the related information, and providing the related information to the viewer. The related information providing server 4002 is connected to a network 4005 such as the Internet, stores the broadcast information and the related information of the broadcast information, sends related information corresponding to the partial broadcast information from the viewer apparatus to the viewer apparatus 4001. The broadcast information storing apparatus 4003 is a VTR and the like, and stores the broadcast information received by the viewer apparatus 4001. The content providing server 4004 sends a related information home page to the viewer apparatus 4001 in response to being accessed by the viewer apparatus 4001. In the figure, although only one viewer apparatus is shown, there are many viewer apparatus actually.

The viewer apparatus 4001 is an apparatus having a function for receiving a broadcast signal such as from BS digital broadcast, CS digital broadcast, ground wave digital broadcast, cable television broadcast, and network broadcast via IP network (the Internet), decoding broadcast information such as video and voice and the like, reproducing it, and providing the broadcast information to the viewer. The viewer apparatus is formed by a broadcast receiving antenna apparatus and a tuner apparatus or a STB (Set Top Box) and a television and the like. In FIG. 33, the viewer apparatus 4001 is shown as an apparatus in which the above-mentioned apparatuses are integrated. However, the viewer apparatus 4001 can be configured such that a broadcast receiving antenna, an apparatus for decoding the broadcast information from the broadcast signal, and an apparatus for displaying and reproducing video and voice and the like are separated, and the apparatuses are connected as necessary by a cable communication route or by a radio communication route. In addition, the viewer apparatus 4001 includes a communication apparatus such as a modem and the like for performing communication by connecting to the Internet and the like via a communication line such as ISND, analog telephone, or the like. In addition, as shown in FIG. 33, the viewer apparatus 4001 includes the broadcast information storing apparatus 4003 for storing received broadcast information, and has a function for reproducing the stored broadcast information at the appropriate times for viewing. The internal structure in the viewer apparatus 4001 will be described later.

The related information is information related to a specific piece of broadcast information, and is multimedia information formed by text, image, voice, music, video and the like. For example, when a movie is provided as the broadcast information, the related information may be profile information of the characters in the movie described by HTML, a title of BGM, information of the composer and the like. When the broadcast information is a CM, the related information may be detailed information of a commodity advertised by the CM, information of BGM of the CM and the like. Or, the related information may be address information for accessing the multimedia information contents, that is, a URL (Uniform Resource Locators) of the contents.

When the related information is the URL to the multimedia information contents related to broadcast information, the viewer apparatus 4001 accesses the related information providing server 4002, and obtains the URL that is the related information corresponding to notified broadcast information identification information. After that, the viewer apparatus 4001 accesses the URL via the Internet 4005, obtains information contents such as a home page and the like from the content providing server 4004, and provides the contents to the viewer. The viewer apparatus has a content information browsing part 4013 as a means for performing the processes.

The related information providing server 4002 includes a broadcast information database 4021, a related information database 4022, a broadcast information matching part 4023, and a related information providing part 4024. The related information providing server 4002 may be realized as a WWW server connected to the Internet 4005.

The broadcast information database 4021 manages each piece of broadcast information while associating the broadcast information with broadcast information identification information, which is for identifying the broadcast information. That is, as shown in FIG. 33, a broadcast program video and voice group including broadcast information to be stored is managed as files having names of Video 01, Video 02, Video 03, . . . , for example. In this case, the file name corresponds to the broadcast information identification information. In addition, a video frame in each video and voice file can be specified by specifying a video frame number in the video and voice file. In this case, the file name and the video frame number correspond to the broadcast information identification information. In addition, the broadcast information database 4021 may include used for speeding up matching processes of searching for broadcast information by the broadcast information matching part 4023, this information being obtained by performing media conversion necessary for searching process, or characteristic amount extraction process (for example, the information is characteristic vector information and the like extracted from voice signal). The related information database 4022 includes a table shown in FIG. 34, in which broadcast information identification information stored in the broadcast information database 4021 is associated with related information corresponding to the broadcast information. In the example shown in FIG. 34, the related information is a URL of a home page including related information.

The broadcast information matching part 4023 searches the broadcast information database 4021 for broadcast information corresponding to the partial broadcast information received from the viewer apparatus 4001, so that the broadcast information matching part 4023 specifies the broadcast information identification information of the broadcast information corresponding to the partial broadcast information. The related information providing part 4024 refers to the related information database 4022, obtains the related information corresponding to the specified broadcast information identification information, and sends it to the viewer apparatus 4001.

Figure 35:
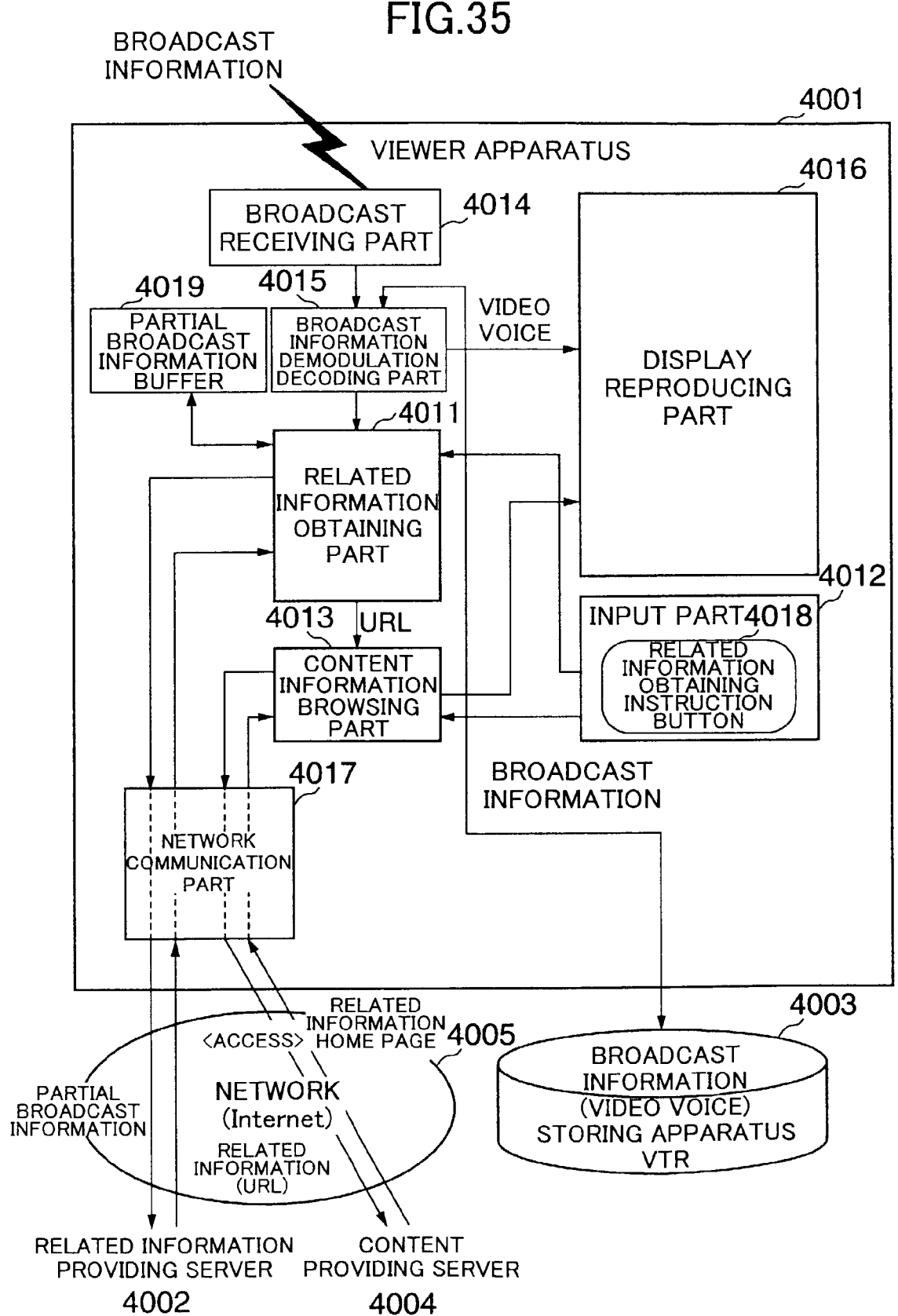
FIG. 35 is a figure showing a configuration example of the viewer apparatus according to the example 4-1.

As shown in FIG. 35, the viewer apparatus 4001 includes a related information obtaining part 4011, an input part 4012 a content information browsing part 4013, a broadcast receiving part 4014, a broadcast information decoding part 4015, a display reproducing part 4016, a network communication part 4017 and a partial broadcast information buffer 4019.

The broadcast receiving part 4014 is an antenna, and receives broadcast information from the broadcasting station 4006. The broadcast information demodulating decoding part 4015 demodulating and decoding the broadcast information received by the broadcast receiving part 4014, and outputs broadcast information to the displaying and reproducing part 4016 and to the related information obtaining part 4011, in addition, to the broadcast information storing apparatus 4003 when the broadcast information is stored. The broadcast information demodulating decoding part 4015 receives the stored broadcast information from the broadcast information storing apparatus 4003, and reproduces it. The input part 4012 has a related information obtaining instruction button 18 and other various buttons not shown in the figure. When the viewer operates the related information obtaining instruction button 4018, the related information obtaining part 4011 generates the partial broadcast information from the broadcast information which the viewer is watching, sends the partial broadcast information from the network communication part 4017 to the related information providing server 4002 via the network 4005, obtains related information sent from the related information providing server 4002 and received by the network communication via the network 4005, and outputs URL included on the related information to the content information browsing part 4013. The content information browsing part 4013 accesses the content providing server 4004 via the network communication part 4017 and the network 4005 by using the URL, receives the related information home page sent from the content providing server 4004 via the network communication part 4017, and outputs the home page to the displaying and reproducing part 4016. The displaying and reproducing part 4016 includes a display means such as CRT, LCD and the like, and a display circuit. The displaying and reproducing part 4016 outputs or displays video and voice that are broadcast information or the related information home page and the like. The partial broadcast information buffer 4019 temporarily stores the video and voice that are viewed and listened.

Next, operation of the broadcast receiving system with related information providing function of this embodiment will be described.

When the viewer operates the related information obtaining instruction button 4018 while the viewer views and listens broadcast information, the related information obtaining part 4011 sends the broadcast information, or characteristic amount information obtained by converting the broadcast information to the related information providing server 4002 as the partial broadcast information. In the case that the viewer obtains related information corresponding to broadcast information stored in the broadcast information storing apparatus 4003 at a point of time while reproducing and viewing the broadcast information, the related information obtaining part 4011 sends the broadcast information stored in the broadcast information storing apparatus 4003 reproduced at the point of time, or characteristic amount information obtained by converting the broadcast information to the related information providing server 4002 as the partial broadcast information. The related information is assumed to be a URL to a home page and the like for providing information related to the broadcast information. When the partial broadcast information is sent from the viewer apparatus 4001, the related information providing server 4002 specifies broadcast information identifying information of the broadcast information corresponding to the partial broadcast information by searches the broadcast information database 4021. The related information providing part 4024 obtains related information (that is, URL) group associated with the broadcast information identifying information by referring to a table shown in FIG. 34, and the related information providing part 4024 notifies the viewer apparatus 4001 of the group. The related information obtaining part 4011 of the viewer apparatus 4001 provides the obtained related information to the viewer.

As a realized example of the related information obtaining part 4011, the viewer operates the input means such as the related information obtaining instruction button 4018 in the viewer apparatus 4001, the viewer apparatus 4001 accesses the related information providing server 4002 at the time when obtaining of related information is instructed, the partial broadcast information is sent to the related information providing server 4002, and the viewer apparatus obtains related information associated with the broadcast information identifying information corresponding to the partial broadcast information from the related information database 4022, and provides the related information to the viewer. Other than the above-mentioned example, following examples can be realized. (1) the viewer apparatus continuously accesses the related information providing server 4002, and obtains every pieces of related information related to broadcast information or related to reproduced broadcast information from the related information managing database 4022, and provides it to the viewer. (2) The viewer apparatus 4001 includes a button for so-called bookmark, the related information obtaining instruction button 4018, and a memory (storage), and the memory stores partial broadcast information at the time when the viewer operates the button for bookmark to bookmark information. Then, the viewer apparatus accesses the related information providing server 4002 when the viewer operates the related information obtaining instruction button 4018 to instruct to obtain the related information, sends the partial broadcast information stored in the memory to the related information providing server 4002, obtains related information group associated with broadcast information identifying group corresponding to the partial information from the related information database 4022, and provides the related information to the viewer.

In the case where the broadcast information matching part 4023 specifies the broadcast information identifying information of the broadcast information corresponding to the partial broadcast information by searching the broadcast information database for the broadcast information corresponding to the partial broadcast information received form the viewer apparatus 4001, it is assumed that a method described in K. Kashino, G. Smith and H. Murase: "Time-Series active search for quick retrieval of audio and video" Proc of ICASSP-99, Vol. 6, PP.2993-2996, March 1999 or in are used, in which the that is described in K. Kashino and H. Murase: "Time-Series active search for quick retrieval of audio and video", NTTR&D, Vol.49, No. 7, 2000, PP.407-413 is used. According to the above-mentioned method, a program title, CM, target sound, presence or absence of image and corresponding position can be searched for quickly from long time voice or broadcast. When searching for a voice, the search is performed on the basis of histograms of characteristic vectors of whole voice that is search target and voice that is searched for. When this method is used, the partial broadcast information corresponds to voice data in the video and voice that are viewed and listened for a time including a point of time at which the related information is to be obtained, or the partial broadcast information corresponds to the characteristic vector extracted from the voice signal. When the related information obtaining part 4011 in the viewer apparatus 4001 sends the characteristic vector to the related information providing server 4002 as the partial broadcast information, the related information obtaining part 4011 also has a function for extracting the characteristic vector from the voice signal.

As the partial broadcast information, video frame data, video sequence data (a series of frame data) and various characteristic amount extracted from video signal such as color histogram can be used.

Next, concrete operations of the system will be described in the case when information related to broadcast is obtained while the viewer is watching the broadcast.

First, while the viewer is watching and listening broadcast video and voice that is broadcast or while the viewer is reproducing, and is watching and listening broadcast video and voice stored in the broadcast information storing apparatus 4003, the related information obtaining part 4011 always buffers the video and voice that are watched and listened from time "a" before. At this time, it assumed that the viewer is interested in the contents of the video and voice, and operates the related information obtaining instruction button 4018. As a result, the related information obtaining part 4011 sends partial broadcast information to the related information managing server 4002 via the network communication part 4017, in which the partial broadcast information is a voice signal of the broadcast video and voice listened during a period from a time that is "a" time before the time "t" at which the button is operated to the time "t", that is, during the period from the time t−a to the time t.

The related information providing part 4024 of the related information providing server 4002 sends the received partial broadcast information to the broadcast information matching part 4023. The broadcast information matching part 4023 searches the broadcast information database 4021 for the broadcast information corresponding to the partial broadcast information by using the received partial broadcast information, that is, the voice signal. As a result of the search, for example, it is assumed that a video sequence from a frame 1 to a frame 3 in the video file Video 01 matches the received partial broadcast information. Since the partial broadcast information corresponds to the voice signal in the broadcast video and voice that are viewed and listened during the period from the time t−a to the time t, a video frame corresponding to the last time in the matched video sequence corresponds to a video frame viewed at the time of t at which the viewer operates the related information obtaining instruction button 4018. The broadcast information matching part 4023 performed before-mentioned judgement. As a result, information of "file name :Video 01, frame number :002" is sent to the related information providing part 4024 as the broadcast information identifying information. The related information providing part 4024 refers to the related information database 4022 shown in FIG. 34, and sends URL "http://www.aaa.co.jp./program information.html" to the viewer apparatus 4001 as the related information corresponding to the broadcast information identifying information "file name :Video 01, frame number :002".

The viewer apparatus 4001 sends the received URL to the content information browsing part 4013. The content information browsing part 4013 accesses the content providing server 4004 specified by the URL address, obtains the related information home page, and provides it to the viewer by the displaying and reproducing part 4016.

Example 4-2

In the example described above, the related information that is provided when the viewer specifies broadcast information is determined irrespective of attribute of the user basically. In addition, the same related information is provided to all viewers for the same broadcast information.

Also in this embodiment, in the same way as the above-mentioned embodiments, related information that may be different for each viewer and each viewer apparatus can be provided on the basis of the viewer information and the terminal information of the viewer apparatus. In this embodiment, a configuration for providing related information that may be different for each viewer and each viewer apparatus will be described in detail as the example 4-2.

Like in the first embodiment, the viewer information is information on the viewer including one or more of items of information which are name, sex, age, occupation, address, ZIP code, family structure, information on residence (condominium, stand-alone house and the like), hobby, information genre which the viewer interested in (politics, economy, news, computer, book, sports, travel and the like), annual income, information whether the viewer is a member of each service and membership number or credit card ID, existence of various qualification (drivers license and the like), information on body form (weight, height, size of clothes and the like), information on ability (eyesight, hearing and the like) and the like.

The terminal information (viewer apparatus information) is information including resolution of the display device of the viewer apparatus, the number of colors which can be displayed, performance of WWW information browsing means (availability of Java function, existence of video and voice content play back function, coding format information which can be played back as the video sound content) and the like.

In the following, as for the case related information that may be different for each viewer and each viewer apparatus can be provided on the basis of the viewer information and the terminal information of the viewer apparatus, different points compared with the example 4-1 will be described with reference to FIGS. 36 and 37.

Figure 37:
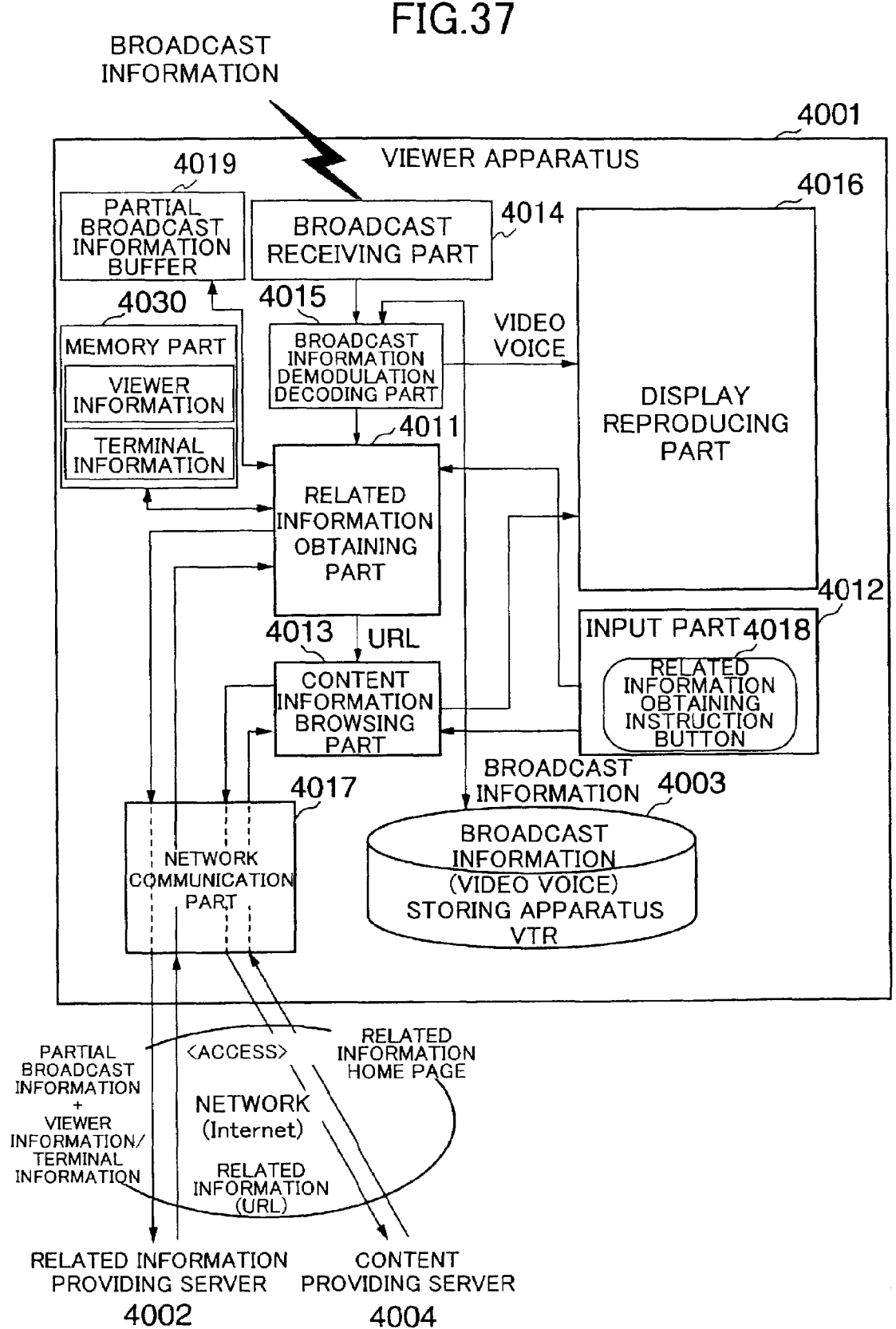
FIG. 37 is a figure showing a configuration example of the viewer apparatus according to the example 4-2.

In this example, as shown in FIG. 37, the viewer apparatus includes a memory part 4030 for storing the viewer information and the terminal information, and an input part 4012 for providing a function for inputting viewer information to the viewer. The viewer inputs various viewer information via the input part, and the input viewer information is held in the memory part 4030.

In addition, the terminal information is held in the memory part 4030 when the terminal is manufactured, or, the terminal information is sent to the memory part 4030 from the display reproducing part 4016 and held when the display reproducing part 4016 is connected.

In addition, in this example, the related information held in the related information database 4022 includes main body of the related information such as URL and the attribute information. The attribute information in this example is characteristics of a viewer to which the related information can be provided, that is, sex, age, body shape characteristic, ability characteristic, occupation, district, Zip code group, family structure characteristic, residence characteristic, annual income, information genre to which the related information belongs, service using right necessary for using the related information, terminal characteristics of the terminal to which the service is provided, that is, resolution characteristics of display apparatus, the number of colors which can be displayed, and performance of content information browsing part 4013.

Examples of the related information are as follows, when the main body of the related information is URL.

Related information example 1: "URL1 (for woman), (target age is equal to or more than 20), (equal to or more than 1024×800), (equal to or more than256 colors)"

Related information example 2: "URL2 (clothing size M), (Java function is necessary)"

Related information example 3: "URL3, (occupation: housewife), (Tokyo)"

Related information example 4: "URL4, (for woman), (eyesight equal to of below 0.8)"

Related information example 5: "URL5, (genre sports).

For example, the content for the related information example 1 is advertising information of tobacco for woman, and is not applicable for one under 20 or a man. The related information example 2 corresponds to advertising information of closing, the related information example 3 corresponds to commodity information in a supermarket in Tokyo, the related information example 4 corresponds to advertising information for eyeglass for a woman. In addition, the related information example 5 corresponds to advertisement for sports goods and the like.

Figure 36:
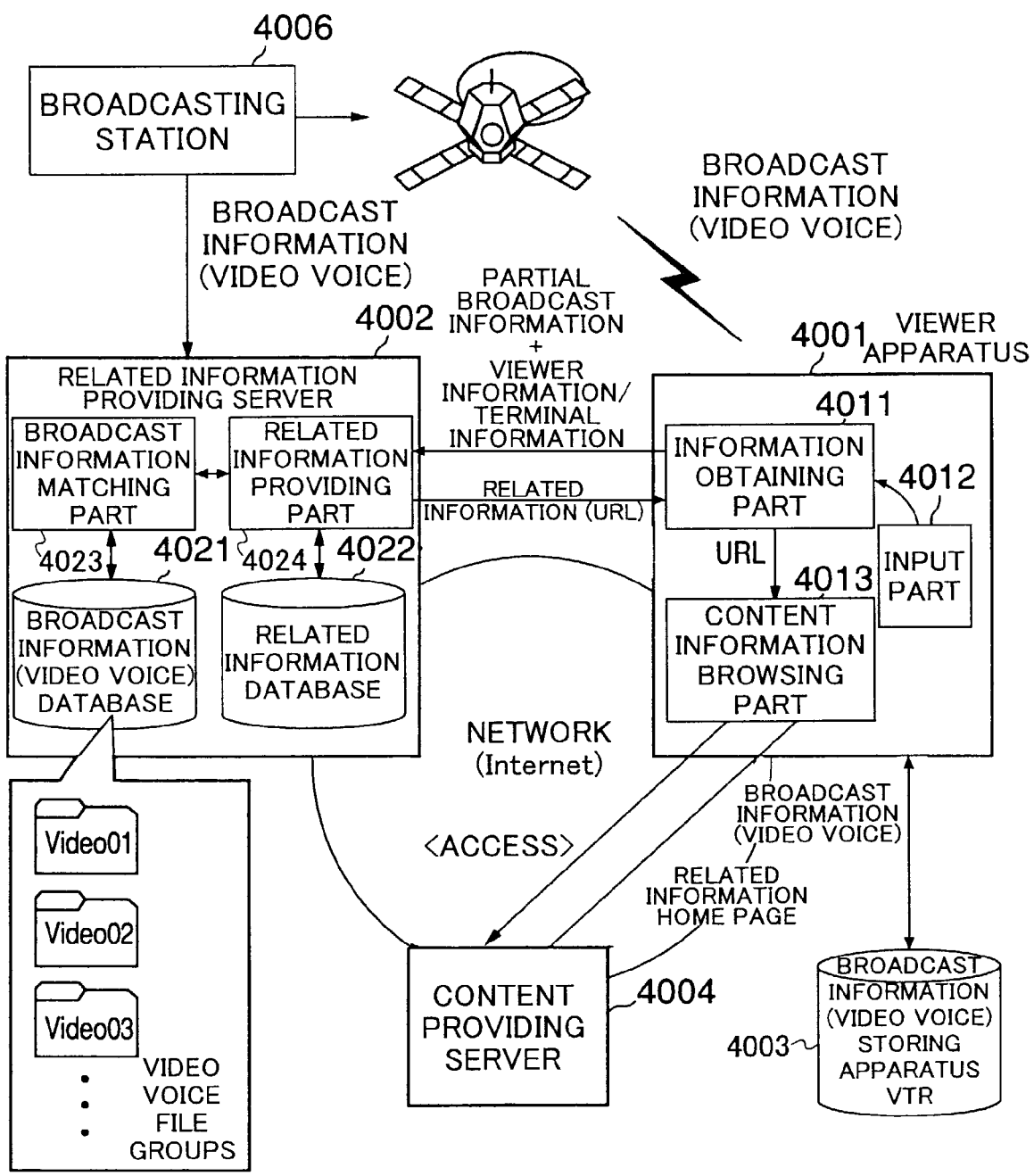
FIG. 36 is a figure showing an example of a whole configuration of a system according to a fourth embodiment (example 4-2)

As shown in FIG. 36, when the related information obtaining part 4011 of the viewer apparatus 4001 sends partial broadcast information to the related information providing server 4002 as described in the above example, the related information obtaining part 4011 sends the viewer information and the terminal information, or either one of these pieces of information with the partial broadcast information.

The related information providing part 4024 of the related information providing server 4002 specifies the broadcast information identifying information from the partial broadcast information according to the before mentioned procedure, and specifies the corresponding related information. After that, the related information providing part 4024 refers to the viewer information and the terminal information attached to the related information, and selects related information, and sends selected related information to the viewer apparatus.

More specifically, the related information corresponding to the broadcast information identifying information specified by the partial broadcast information received from the viewer apparatus 4001 is the related information example 1-4. When the viewer information is (woman) and the terminal information is (resolution 800×600) and (Java is not available), the related information providing part 4024 excludes the related information example 1 and the related information example 2, in which the condition for the related information example 1 is that equal to or more than 1024×800 is necessary, and the condition for the related information example 2 is that Java function is available. Then, the related information providing part 4024 sends the remaining URL3, URL4 and URL5 to the viewer apparatus 4001.

When the viewer information is (woman), (Kyoto), (eyesight 1.5), (interest genre:book), and the terminal information is (resolution 1024×800), (Java available), the related information providing part 4024 sends excludes the related information 3, the related information 4 and the related information 5, in which target area is Tokyo for the related information 3, eyesight of the viewer needs to be equal to of below 0.8 for the related information 4, and the genre is set and the genre is not the book for the related information 5. Thus, the related information providing part 4024 sends the remaining URL1 and URL2 to the viewer apparatus 4001.

Other than the above-mentioned example, when information of (available only for A service member) is provided to the related information as attribute information, and when the A service member number is included as the viewer information, the related information may be sent to the viewer apparatus 4001. In addition, when information of (driver's license is necessary) is provided to the related information, and when information of (have driver's license) is included in viewer information, the related information may be sent to the viewer apparatus 4001.

In addition, when information of (mpeg2 format) is provided to the related information as attribute information and when the terminal information includes (reproducing available coding method: mpeg2), the related information may be sent to the viewer apparatus.

As mentioned above, in the example 4-2, by using the viewer information and the terminal information, related information that is not necessary for the viewer is not sent. In addition, related information that can not be used by the viewer apparatus used by the viewer is not sent, so that only information necessary for the viewer or usable for the viewer is provided to the user.

(Effects)

As mentioned above, according to the present embodiment, it is not necessary to perform a special process such as a process for adding necessary information to broadcast video and voice for providing related information. In addition, also in the case when the broadcast video and voice is temporarily stored and reproduced for viewing, a service for providing related information related to the broadcast video and voice via a network can be realized.

Fifth Embodiment

Next, a fifth embodiment of the present invention will be described. In this embodiment, a service accurately synchronized with broadcast image frame can be realized by using frame ID and the like superimposed on broadcast voice.

As such services, there is a following service, for example. When a user pushes a button on a viewer apparatus while the user is watching TV broadcasting, related information that is related to the image displayed on the television screen at the time when the button is pushed is obtained via a network, and the related information is used in the viewer apparatus.

In addition, following service for generating following actions can be available. While watching an educational program and the like, a text book used for explanation for the educational program is displayed on a display apparatus of the viewer apparatus, and as the program progresses, a page is turned, underlined, a pointer is displayed showing a point that is explained.

For realizing the above-mentioned services, it is necessary for the viewer apparatus to grasp contents of broadcast which the user is viewing. That is, according to the present embodiment, the viewer apparatus always grasps information indicating what channel the user is watching, or what image is displayed on the TV currently, or the like, by using frame ID and the like superimposed on voice. Therefore, in a service in which related information related to the image being watched is obtained at the time when a button is pushed in the viewer apparatus, related information to be obtained can be switched instantaneously at the time when video scene that is displayed on the TV screen is switched so that the content is switched.

In this embodiment, the word "related information" is used for indicating information for obtaining contents related to broadcast information, in addition, the word is used for indicating contents itself related to broadcast information.

Figure 38:
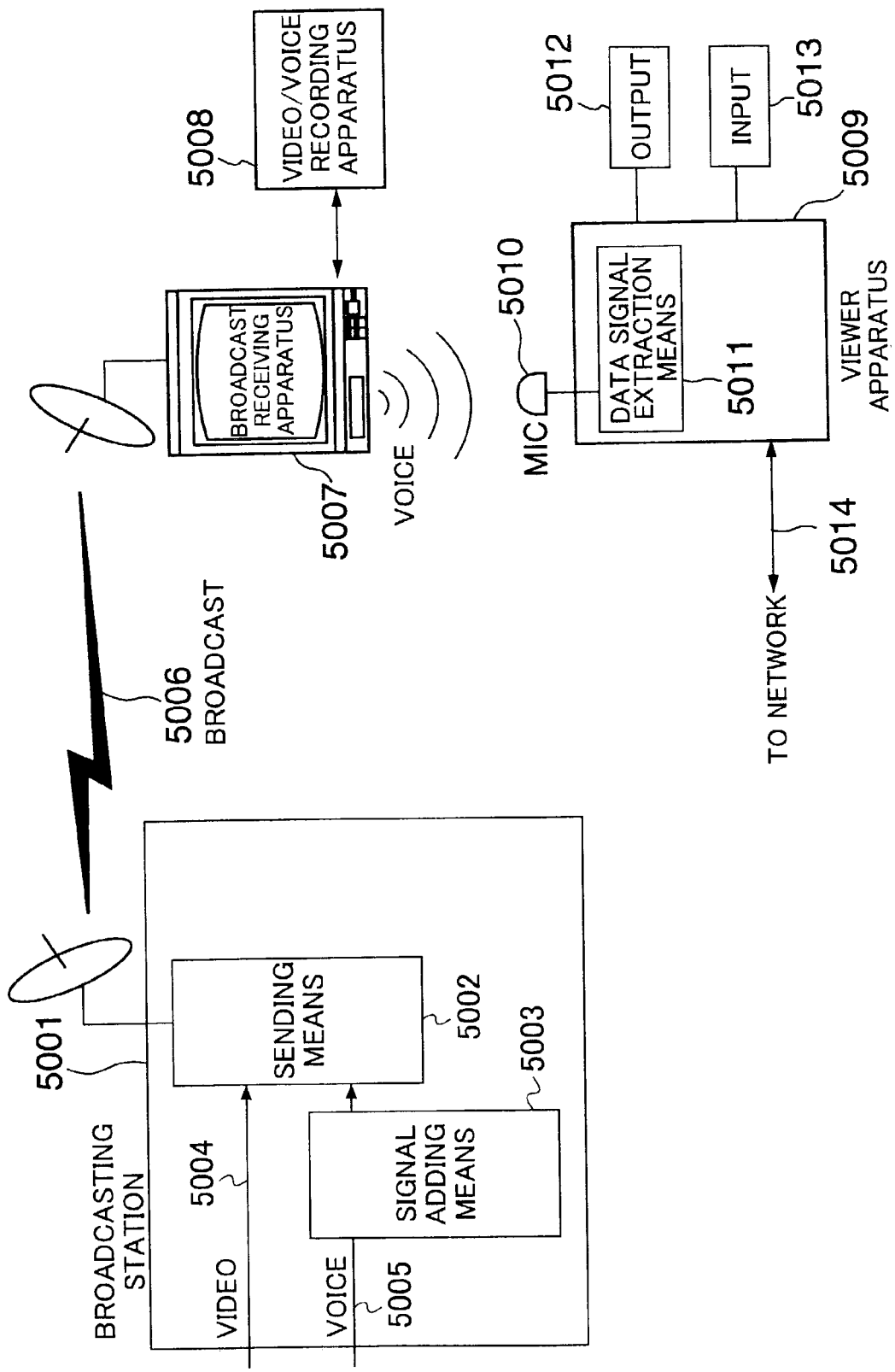
FIG. 38 is a figure showing an example of a whole configuration of a broadcast synchronization type service providing system according to a fifth embodiment of the present invention.

FIG. 38 shows an example of a whole configuration of a broadcast synchronization type service providing system according to the fifth embodiment of the present invention. A numeral 5001 indicates a broadcasting station, 5002 indicates a sending means, 5003 indicates a signal adding means, 5004 indicates video, 5005 indicates voice, 5006 indicates broadcast, 5007 indicates a broadcast receiving apparatus, 5008 indicates a video/voice recording apparatus, 5009 indicates a viewer apparatus, 5010 indicates a microphone (MIC), 5011 indicates a data signal extraction means, 5012 indicates an output means, 5013 indicates an input means, 5014 indicates a connection line to the network.

The broadcast synchronization type service providing system shown in FIG. 38 includes the signal adding means for superimposing a digital data signal including at least channel ID, and, image frame ID or voice frame ID on analog voice wave in broadcasting wave in the side of the broadcasting station for broadcasting voice and video.

For superimposing the data signal on the voice wave, a following method can be adopted, in which the data signal is superimposed for each 1/30 second when frame rate of the broadcast video is 30 frames per second. As a method for superimposing the data signal on voice by using the signal adding means, data hiding technology (Nikkei electronics, No. 683 (1997), pp. 99~125, 149~162) can be used, for example.

As an example of a method for superimposing the data signal on the voice signal, there is a following method. The sending side deletes specific frequency components (bandwidth) of the voice signal in response to "0", "1" of binary data signal, and sends the voice signal. Then, the receiving side detects the deleted frequency components from the voice signal, so that binary data sequence is reproduced. As another method, the sending side sends specific frequency components in response to "0", "1" of binary data signal in outside of the bandwidth of the voice signal. The receiving side detects the frequency components sent in the outside of the bandwidth of the voice signal, so that binary data sequence is reproduced.

In FIG. 38, in the side for receiving broadcast includes a broadcast receiving apparatus for reproducing broadcast voice and video, the broadcast receiving apparatus 5007 and the viewer apparatus 5009 that does not include a communication means such as communication line.

Figure 39:
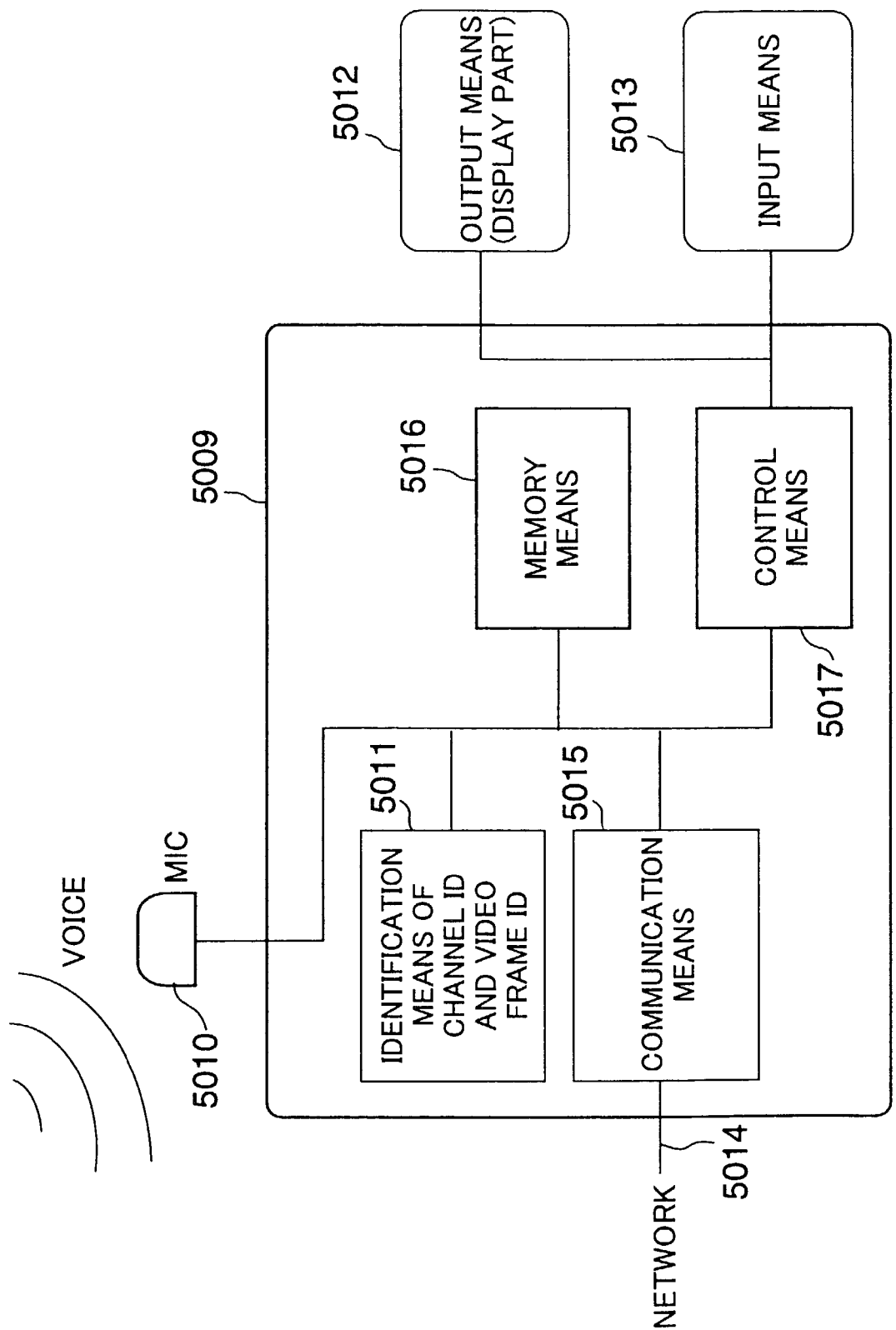
FIG. 39 is a figure showing an example of a configuration of the viewer apparatus according to the fifth embodiment.

FIG. 39 shows an example of the configuration of the viewer apparatus. The viewer apparatus 5009 includes a microphone 5010, a data signal extraction means 5011 and a communication means 5015. The microphone 5010 collects voice of broadcast information reproduced by the speaker of the broadcast receiving apparatus. The data signal extraction means 5011 extracts a signal superimposed on the voice input from the microphone, and checks channel ID and image frame ID. The communication means 5015 is for communicating with a related information content providing server on the network.

In addition, the viewer apparatus 5009 includes a memory means 5016 for storing data necessary for each process, an output means 5012 such as a display and the like for displaying related information and the like provided from the server on the network to the user, an input means 5013 such as a mouse and a keyboard for inputting information necessary for operating the terminal, and a control part 5017 for controlling these parts.

In the broadcast synchronization type service providing system, as shown in FIG. 39, in the broadcasting station side, the data signal is superimposed on voice in the broadcast information as mentioned before, and the voice is broadcast with video of the broadcast information. In the viewer apparatus, the data signal extraction means (means for identifying channel ID and image frame ID) shown in FIG. 39 extracts the data signal superimposed on the analog voice wave of the broadcast information, so that status of broadcast information which the user is watching can be accurately grasped, that is, it can be accurately grasped that the user is watching which scene in which channel.

Therefore, the viewer apparatus can provide the broadcast synchronization type service to the user by communicating with a server that provides related information related to the broadcast information, the server existing on the network and the like. As mentioned before, the broadcast synchronization type service is, for example, a service for providing related information one after another that changes in synchronization with progress of a program (actually, changes of voice and image frame), or a service in which the user can browse related information of a scene that the user is interested in after marking the scene by pushing a button.

In addition, by connecting, to the broadcast receiving apparatus, a means for recording and reproducing broadcast information, and by using the means, the user can freely use the before-mentioned service at any time for a broadcast program that is once recorded, as well as for broadcast program currently being broadcast. In the following, the operation of the broadcast synchronization type service providing system will be described.

Figure 40:
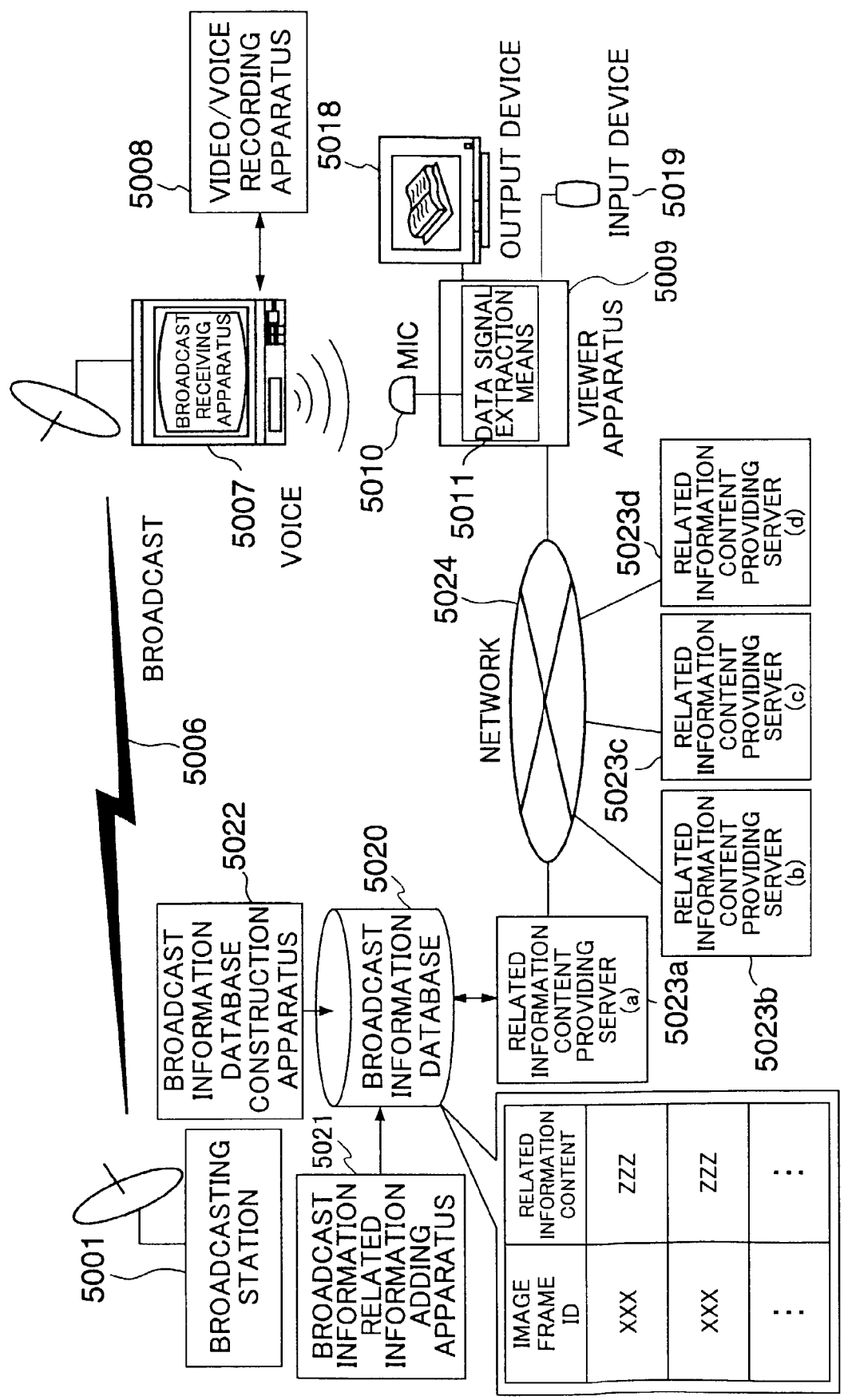
FIG. 40 is a figure showing a detailed example of a whole configuration of a broadcast synchronization type service providing system according to a fifth embodiment of the present invention.

FIG. 40 shows a block diagram of an example of the fifth embodiment. In the figure, a numeral 5001 indicates a broadcasting station, 5007 indicates a broadcast receiving apparatus, 5008 indicates a video/voice recording apparatus, 5009 indicates a viewer apparatus, 5010 indicates a microphone (MIC), 5011 indicates a data signal extraction means, 5018 indicates an output device, 5019 indicates an input device, 5014 indicates a connection line to the network, 5020 indicates a broadcast information database, 5021 indicates a broadcast information database construction apparatus, 5023a-5023d indicate related information content providing servers (a)-(d).

In the broadcast synchronization type service providing service of the present invention, produced broadcast information is broadcast, as a program, by a broadcasting means in the side of the broadcasting station for general users. At this time, a data signal is superimposed on voice in the broadcast information by the signal adding means, wherein the data signal includes channel ID by which broadcast channel can be identified uniquely and image frame ID by which image frame can be identified uniquely.

The above-mentioned process is performed for every piece of broadcast information that is the target for the broadcast synchronization type service. Accordingly, by extracting the data signal superimposed on the broadcast information, the broadcast channel and the image frame currently viewed can be identified uniquely.

In the side of receiving broadcast, by using the broadcast receiving apparatus 5007 such as a television, the broadcast information can be viewed. Then, the user can receive the broadcast synchronization type service by launching the viewer apparatus 5009. When the viewer apparatus 5009 launches, the viewer apparatus 5009 collects voice output from the speaker of the broadcast receiving apparatus 5007 by using the microphone 10.

Then, the viewer apparatus 5009 recognizes the channel ID and the image frame ID from the collected voice by using the data signal extraction means. At this time, the viewer apparatus specifies a related information content providing server related to the broadcast information of the broadcast channel which is currently watched from related information content providing servers related to broadcast information of each channel that exist on the network. After that, the viewer apparatus accesses the related information content providing server via the network and sends the image frame ID.

The related information content providing server manages a broadcast information database formed by a database construction apparatus 5022 for broadcast information and a related information adding apparatus 5021 and the like. The broadcast information database is provided with a table in which each image frame ID is associated with various related information such as voice, video, characters, instruction to a service terminal or the like. By specifying the image frame ID, a set of related information can be easily specified.

The related information content providing server receives the image frame ID sent from the viewer apparatus in the user side corresponding to a client, so that the related information content providing server can accurately grasp a scene which the user currently watches. Thus, the related information content providing server can related information corresponding to the scene to the viewer apparatus. By repeating the above-mentioned operation one by one, the user can receive related information accurately synchronized with the broadcast information which the user currently watches. Therefore, the broadcast synchronization type service can be realized.

In addition, in the providing method of the broadcast synchronization type service, the operation of the broadcast synchronization type service providing system is the basic operation, in addition, by specifying a format of the image frame ID, reliability can be improved for the viewer apparatus to grasp the broadcast information which the user currently watches.

Figure 41:
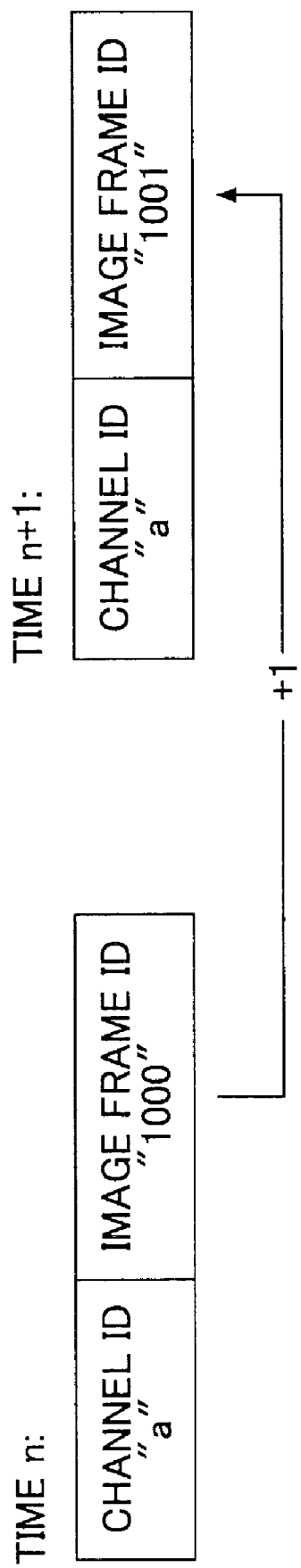
FIG. 41 is a figure showing an example of a configuration of a data signal superimposed on voice and voice data.

FIG. 41 shows a data structure including the channel ID and the image frame ID. The channel ID an the image frame ID are information by which broadcast channel and the image frame can be identified uniquely, in addition, the image frame ID is a time-series sequential number. As mentioned before, the viewer apparatus collects voice that is reproduced from the speaker of the broadcast receiving apparatus, and identifies the channel ID and the image frame ID one after another by using the data signal extraction means.

Figure 42:
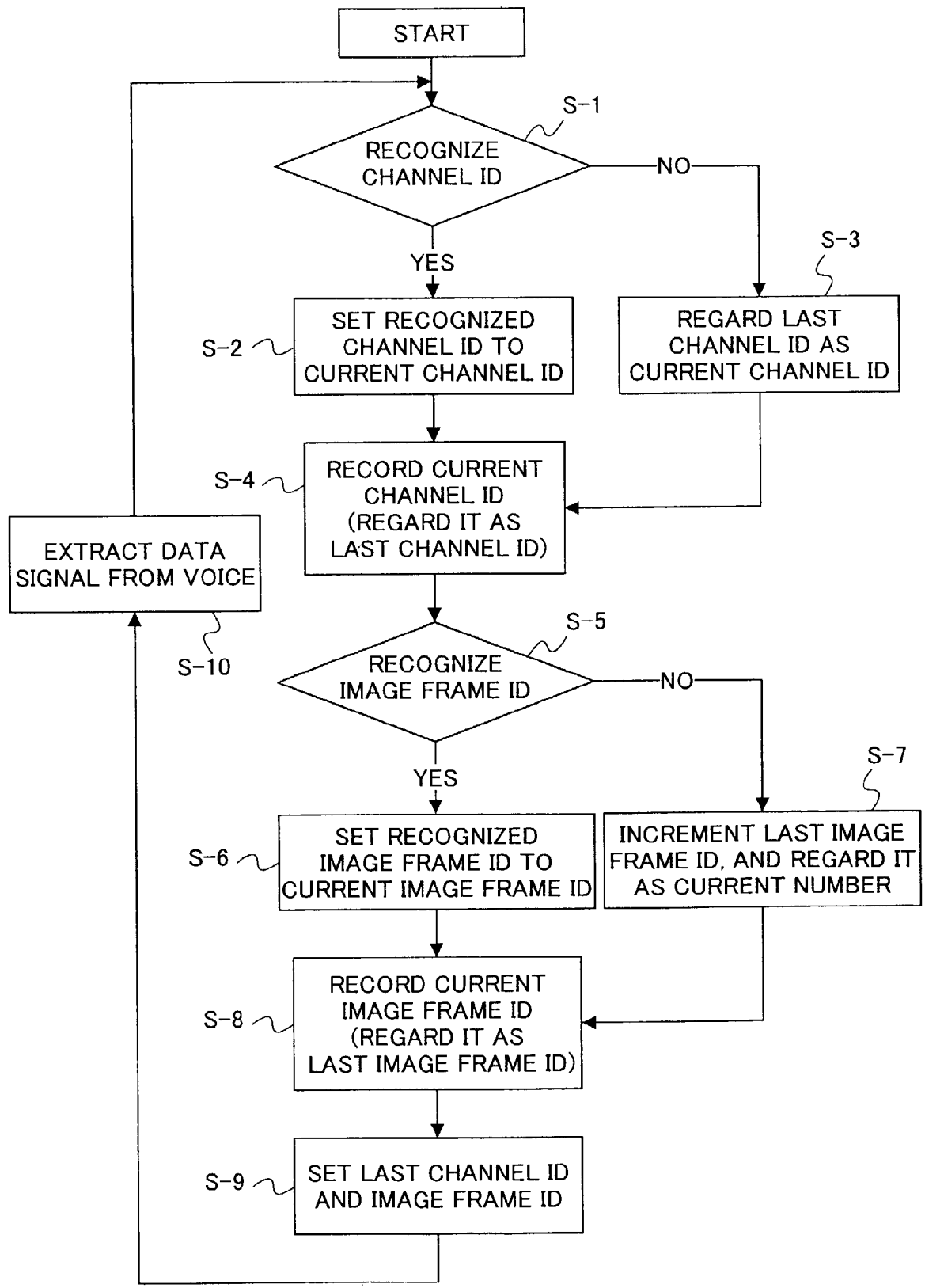
FIG. 42 is a flow chart showing a process for determining actually used channel ID and image frame ID from the data signal extracted from voice.

FIG. 42 shows a process flow for checking the two IDs. When the viewer apparatus is launched, the viewer apparatus sets two value "last channel ID" and "last image frame ID" as initial values. As for the initial values set at this time, for example, the initial value of "last channel ID" is set to be a channel ID that was watched just before quitting watching in the previous time, or a predetermined channel ID and the like. The initial value of "last image frame ID" is set to be "0" and the like.

The viewer apparatus extracts the data signal one after another from voice, and identifies the channel ID and the image frame ID (step S1). Then, following processes are performed according to whether the two IDs can be identified accurately. When the channel ID is identified accurately, the channel ID is used as a channel ID of a broadcast channel that is currently reproduced (step S2). When the data signal is not properly extracted from the voice and the channel ID is not identified, the value of "last channel ID" is regarded as the channel ID of the broadcast channel that is currently reproduced, and is used (step S3). Then, a current channel frame ID is recorded (step S4). As for recognition of the image frame ID (step S5), when the image frame ID is correctly identified, in the same way as the channel ID, the image frame ID is used as an image frame ID of an image currently reproduced (step S6). On the other hand, when the image frame ID is not identified, since the image frame ID is a time-series sequential number, a value in which 1 is added to "last image frame ID" is regarded as an image frame ID of an image currently reproduced, and is used (step S7). Then, current image frame ID is recorded (step S8).

After the channel ID and the image frame ID are used as current values, they are set to a value of "last channel ID" and a value of "last image frame ID" respectively (step S9). Then, the data signal is extracted from voice of next interval (step S10). Accordingly, latest values can be held and used in the process performed one after another.

As mentioned above, by determining the image frame ID and following the process flow, even when the data signal can not be correctly extracted from voice while watching the same program, the image frame ID can be interpolated. Thus, the service can continues to be provided.

A concrete example in which the broadcast synchronization type service providing method is applied to television broadcast will be described taking a television program as an example. It is assumed that the broadcasting station for broadcasting the television program is provided with a means for superimposing the data signal on voice beforehand, and the channel ID of the broadcasting station is "a", and the image frame ID starts from "1".

In addition, it is assumed that the recognizing result of the channel ID and the image frame ID by the data signal extraction means after launching the viewer apparatus is as shown in FIG. 43. In addition, it is assumed that a variable for storing the value of "last channel ID" is "LAST-CH-ID", a variable for storing the value of "last image frame ID" is "LAST-FRAME-ID", a variable for storing the value of "current channel ID" is "CH-ID", a variable for storing the value of "current image frame ID" is "FRAME-ID".

While the user is watching the television program, when the viewer apparatus is launched, it is assumed that "z" is set to "LAST-CH-ID", and "0" is set to "LAST-FRAME-ID". Next, as shown in FIG. 43, as a result that the service terminal performs identification by using the data signal extraction means, since the channel ID and the image frame ID are correctly identified as "a" and "1000" respectively (step 1), "a" is set to "CH-ID", and "1000" is set to "FRAME-ID". In addition, "a" is set to "LAST-CH-ID", and "1000" is set to "LAST-FRAMEID".

However, as shown in FIG. 43, according to the next result of the data signal extraction means, both of the channel ID and the image frame ID are "unknown" (step 2). Therefore, according to the process flow shown in FIG. 42, "a" is set to "CH-ID" by referring to "LAST-CH-ID", and "1001" is set to "FRAME-ID" by referring to "LAST-FRAME-ID" and adding 1 to "LAST-FRAME-ID". Then, these values are set to "LAST-CH-ID" and "LAST-FRAME-ID" respectively as new values.

FIG. 44 shows values of the variables obtained by the data signal extraction process shown in FIG. 43. The viewer apparatus accesses a related information content providing server related to broadcast on the basis of "CH-ID" that is obtained by the process flow, and sends "FRAME-ID" one by one.

The related information content providing server sends, to the service terminal, character data, voice data, image data or URL in which related information exists associated with "FRAME-ID". The service terminal displays or reproduces the data, or draws a picture of the data, or opens the URL by using a browser.

For example, the program is on English conversation, character data as text can be displayed in synchronization with text that a personality speaks in the broadcast, in addition, an underline is provided to important text. Such change of the related information can be taken as an example.

In the above explanation, a case where voice and video are broadcast at the same time such as a case of television broadcasting is described. However, the present invention is also effective to a case where only voice is broadcast like radio. In this case, since the image frame does not exist, voice frame ID is used instead of the image frame ID. The voice frame ID is an identifier uniquely assigned to each time interval of the voice which is divided into constant time intervals.

In addition, in the above-mentioned description, the viewer apparatus receives voice output from a speaker of the broadcast receiving apparatus such as television receiver by using a microphone and converts the voice into an electrical signal, then, the viewer apparatus extracts the image frame ID and the voice frame ID as the data signal from the electrical signal. However, when a voice electrical signal can be directly extracted from the broadcast receiving apparatus, the microphone is not necessary, and the system can be configured such that the superimposed data signal is extracted directly from the voice electrical signal.

Also according to this embodiment, different related information can be provided for each viewer and each viewer apparatus on the basis of the viewer information and the terminal information of the viewer apparatus. For example, in the same way as the method described in the example 4-2, when the viewer apparatus requests related information to the related information content providing server, the viewer apparatus sends the viewer information and the terminal information with the frame ID and the like. The related information content providing server selects related information related to the viewer information and the terminal information, and provides to the viewer apparatus.

(Effects)

According to the invention of this embodiment, even if a viewer apparatus does not have communication means such as a communication line for performing digital signal communication with a television receiver or a broadcast receiving apparatus for receiving radio and the like, the viewer apparatus can extract data signal superimposed on the voice of broadcast information, and identifies the channel ID and the image frame ID, or the voice frame ID, so that it becomes possible to recognize a broadcast channel and an image frame that are currently watched. Thus, a service that requires accurate synchronization between broadcast contents and related information contents on the network can be realized.

In addition, even in a system configured such that broadcast information is not watched in real time, that is, even in a system configured such that broadcast voice/voice is recorded beforehand, and is viewed whenever the viewer likes, by connecting a means for recording and reproducing broadcast information to the system and by reproducing video and voice by using the means, it becomes possible to recognize a broadcast channel and an image frame or a voice frame ID. Thus, the same service as that in the case the broadcast is viewed in real time can be provided.

In addition, when the viewer apparatus collects reproduced voice from the broadcast receiving apparatus by using a microphone, even if the viewer apparatus can not correctly extract the data signal from the voice due to noise and the like, so that the frame ID is not recognized temporarily, the missing image frame ID or voice frame ID can be interpolated. Thus, the service can continues to be provided without interruption, in which the service requires accurate synchronization between broadcast information and the related information.

That is, as mentioned above, according to the present embodiment, the service for providing related information accurately in synchronization with changes of the broadcast program contents that is currently viewed can be received by the viewer apparatus that is provided separately from the broadcast video viewing apparatus, in which the viewer apparatus does not have a function for directly receiving the data signal superimposed on broadcast information from the broadcast receiving apparatus. That is, even though the user does not operate the viewer apparatus in synchronization with broadcast video, the related information can be automatically and timely updated, so that operability of the broadcast synchronization type service can be improved.

In addition, according to the broadcast synchronization type service providing method of the present embodiment, since the image frame ID is set to be a serial number, the image frame ID can be interpolated and used by using time differences even when extraction of the image frame ID from voice is failed. In addition, even for recorded video that is recorded by a recording apparatus, by using a fact that voice is also recorded in the recorded video, the above-mentioned broadcast synchronization type service can be received whenever the user likes.

Each of the viewer apparatus and the related information providing server and the like of the present invention in each of the above-mentioned embodiments can be formed by using a computer that includes a CPU, a memory, a hard disk, CD-ROM and the like. Functions in each of the viewer apparatus and the related information providing server and the like can be realized programs installed in the apparatus or the server. The programs can be installed in the computer from a recording medium such as a CD-ROM and the like, and the program can be downloaded in the computer via a network.

As mentioned above, according to the present invention, it becomes possible that a viewer of broadcast information or recorded information can easily obtain information or contents related to the broadcast information or the recorded information from a server and the like connected to a network.

The present invention is not limited to the specifically disclosed embodiments, and variations and modifications may be made without departing from the scope of the invention.

The invention claimed is:

1. A broadcast synchronization type service providing method where a broadcasting station or a broadcast information storing server sends broadcast information including voice and video and performs a method comprising:
   superimposing a data signal on voice at a same rate as a video frame rate of the video by deleting specific frequency components of the voice in response to a low or a high signal of binary data from said data signal; and
   sending said broadcast information including said voice that includes said data signal, said data signal including a channel identifier uniquely assigned to a broadcast channel and an image frame identifier uniquely assigned to an image frame in video, said data signal does not include a voice frame identifier;
   in a receiving side, a viewer apparatus performs a method comprising,
   collecting broadcast voice output from a speaker of a broadcast receiving apparatus, that receives said broadcast information, by using a microphone, and converting said broadcast voice into an electrical signal;
   extracting said data signal superimposed on said electrical signal continuously one after another by detecting the deleted frequency components of said voice and reproducing said binary data of said data signal; extracting said channel identifier and said image frame identifier from said data signal;
   obtaining related information corresponding to said channel identifier and said image frame identifier via a network;
   sending the image frame identifier as a time-series continuous number by said broadcasting station or said broadcast information storing server;
   using the image frame identifier by the viewer apparatus as an image frame identifier of an image that is currently reproduced by the broadcast receiving apparatus, when said viewer apparatus continuously extracts said data signal superimposed on said voice from said voice output from said speaker of said broadcast receiving apparatus, if said data signal is correctly extracted from said voice so that said image frame identifier is recognized; and
   generating and using an image frame identifier by the viewer apparatus on the basis of a value of an image frame identifier that is most recently recognized, and on the basis of a difference between a time when said most recently recognized image frame identifier is recognized and a current time, if said data signal is not correctly extracted from said voice so that said image frame identifier is not recognized.

2. The broadcast synchronization type service providing method as claimed in claim 1, further comprising:
   obtaining said related information from a related information providing server connected to said network by the viewer apparatus, said related information is stored in a broadcast information database managed by said related information providing server, in which said related information is associated with said channel identifier and said image frame identifier.

3. The broadcast synchronization type service providing method as claimed in claim 2, further comprising:
   storing, in said broadcast information database, viewer information indicating characteristics of a viewer by the related information providing server to which said related information is provided, and viewer apparatus information indicating characteristics of a terminal to which said related information is provided;
   sending, in addition to said channel identifier and said image frame identifier, viewer information or viewer apparatus information specific for said viewer apparatus to said related information providing server by the viewer apparatus; and
   obtaining related information by the related information providing server, and selecting related information on the basis of said viewer information or viewer apparatus information specific for said viewer apparatus, and sending selected related information to said viewer apparatus.

4. A broadcast synchronization type service providing system comprising a broadcasting station or a broadcast information storing server for sending broadcast information including voice and video, and a viewer apparatus in a receiving side, wherein
   said broadcasting station or said broadcast information storing server comprising means for superimposing a data signal on voice at a same frame rate as a video frame rate of the video by deleting specific frequency components of the voice in response to a low or a high signal of binary data from said data signal, and sends said data signal, said data signal including a channel identifier uniquely assigned to a broadcast channel and an image frame identifier uniquely assigned to an image frame in video, said data signal does not include a voice frame identifier;
   said viewer apparatus comprising:
   a microphone for collecting broadcast voice output from a speaker of a broadcast receiving apparatus that receives the broadcast information, and converting said broadcast voice into an electrical signal;
   data signal extraction means for extracting said data signal superimposed on said electrical signal continuously one after another by detecting the deleted frequency components of said voice and reproducing said binary data of said data signal, and extracting said channel identifier and said image frame identifier from said data signal; and
   means for obtaining related information corresponding to said channel identifier and said image frame identifier via a network.

5. The broadcast synchronization type service providing system as claimed in claim 4, wherein
said viewer apparatus obtains said related information from a related information providing server connected to said network, in which said related information is stored in a broadcast information database managed by said related information providing server, which said related information being associated with said channel identifier and said image frame identifier.

6. The broadcast synchronization type service providing system as claimed in claim 5, wherein
said related information providing server stores, in said broadcast information database, viewer information indicating characteristics of a viewer to which said related information is provided, and viewer apparatus information indicating characteristics of a terminal to which said related information is provided;
said viewer apparatus sends, in addition to said channel identifier and said image frame identifier, viewer information or viewer apparatus information specific for said viewer apparatus to said related information providing server;
said related information providing server obtains related information, and selects related information on the basis of said viewer information or viewer apparatus information specific for said viewer apparatus, and sends selected related information to said viewer apparatus.

7. A viewer apparatus for receiving voice output from a broadcast receiving apparatus receiving broadcast information including voice and video sent from a broadcasting station or a broadcast information storing server, wherein
a data signal is superimposed on said voice of the broadcast information at a same rate as a video frame rate of the video by deleting specific frequency components of the voice in response to a low or a high signal of binary data from said data signal, said data signal including a channel identifier uniquely assigned to a broadcast channel and an image frame identifier uniquely assigned to an image frame in video, the data signal does not include a voice frame identifier;
said viewer apparatus comprising:
a microphone for collecting broadcast voice output from a speaker of a broadcast receiving apparatus and converting said broadcast voice in to an electrical signal;
data signal extraction means for extracting said data signal superimposed on said electrical signal continuously one after another by detecting the deleted frequency components of said voice and reproducing said binary data of said data signal, and extracting said channel identifier and said image frame identifier from said data signal;
means for obtaining related information corresponding to said channel identifier and said image frame identifier via a network;
when said data signal extraction means of said viewer apparatus continuously extracts said data signal superimposed on said voice from said voice output from said speaker of said broadcast receiving apparatus, if said data signal is correctly extracted from said voice so that said image frame identifier is recognized, said viewer apparatus uses said image frame identifier as an image frame identifier of an image that is currently reproduced by said broadcast receiving apparatus; and
if said data signal is not correctly extracted from said voice so that said image frame identifier is not recognized, said viewer apparatus generates and uses an image frame identifier on the basis of a value of an image frame identifier that is most recently recognized, and a difference between a time when said most recently recognized image frame identifier is recognized and a current time.

8. The viewer apparatus as claimed in claim 7, said viewer apparatus further comprising:
means for sending, in addition to said channel identifier and said image frame identifier, viewer information or viewer apparatus information specific for said viewer apparatus to a related information providing server connected to a network.

9. A computer readable medium storing program code for causing a viewer apparatus, and a broadcasting station or a broadcast information storing server to perform a method, said viewer apparatus receiving voice output from a broadcast receiving apparatus receiving broadcast information including voice and video sent from the broadcasting station or the broadcast information storing server, the viewer apparatus includes a microphone for collecting broadcast voice output from a speaker of the broadcast receiving apparatus and converting said broadcast voice into an electrical signal, said method comprising:
superimposing a data signal on said voice of the broadcast information by deleting specific frequency components of the voice in response to a low or a high signal of binary data from said data signal, said data signal including a channel identifier uniquely assigned to a broadcast channel and an image frame identifier uniquely assigned to an image frame in the video, the data signal not including a voice frame identifier;
extracting said data signal superimposed on said electrical signal, obtained from broadcast voice output from a speaker of a broadcast receiving apparatus, continuously one after another by detecting the deleted frequency components of said voice and reproducing said binary data of said data signal, and extracting said channel identifier and said image frame identifier from said data signal;
obtaining related information corresponding to said channel identifier and said image frame identifier, or said voice frame identifier via a network;
using the image frame identifier by the viewer apparatus as an image frame identifier of an image that is currently reproduced by the broadcast receiving apparatus, when said viewer apparatus continuously extracts said data signal superimposed on said voice from said voice output from said speaker of said broadcast receiving apparatus by said data signal extraction program code means, if said data signal is correctly extracted from said voice so that said image frame identifier is recognized; and
generating and using an image frame identifier by the viewer apparatus on the basis of a value of an image frame identifier that is most recently recognized, and on the basis of a difference between a time when said most recently recognized image frame identifier is recognized and a current time, if said data signal is not correctly extracted from said voice so that said image frame identifier is not recognized.

10. The computer readable medium as claimed in claim 9, said method further comprising:
sending, in addition to said channel identifier and said image frame identifier, viewer information or viewer apparatus information specific for said viewer apparatus to a related information providing server connected to a network.

* * * * *